(12) United States Patent
Korjus et al.

(10) Patent No.: US 12,282,330 B2
(45) Date of Patent: Apr. 22, 2025

(54) AUTONOMOUS VEHICLE WITH A PLURALITY OF LIGHT SOURCES ARRANGED THEREON

(71) Applicant: Starship Technologies OÜ, Tallinn (EE)

(72) Inventors: Kristjan Korjus, Tallinn (EE); Markus Zimmermann, Helsinki (FI); Ahti Heinla, Tallinn (EE); Rao Pärnpuu, Tabasalu (EE)

(73) Assignee: Starship Technologies OÜ, Tallinn (EE)

( * ) Notice: Subject to any disclaimer, the term of this patent is extended or adjusted under 35 U.S.C. 154(b) by 878 days.

(21) Appl. No.: 17/057,647

(22) PCT Filed: May 20, 2019

(86) PCT No.: PCT/EP2019/062999
§ 371 (c)(1),
(2) Date: Nov. 21, 2020

(87) PCT Pub. No.: WO2019/224161
PCT Pub. Date: Nov. 28, 2019

(65) Prior Publication Data
US 2021/0197712 A1    Jul. 1, 2021

(30) Foreign Application Priority Data
May 22, 2018   (EP) ..................................... 18173530

(51) Int. Cl.
*B60Q 1/28*    (2006.01)
*B60P 3/00*    (2006.01)
(Continued)

(52) U.S. Cl.
CPC ............ *G05D 1/0246* (2013.01); *B60P 3/007* (2013.01); *B60Q 1/28* (2013.01); *B60Q 1/32* (2013.01);
(Continued)

(58) Field of Classification Search
CPC ..... F21Y 2115/10; B60Q 1/507; B60Q 1/503; B60Q 1/5035; B60Q 1/5037; B60Q 3/326; B60Q 2800/10
See application file for complete search history.

(56) References Cited

U.S. PATENT DOCUMENTS 4,549,841 A    10/1985 Ishige
5,664,928 A    9/1997 Stauber
(Continued)

FOREIGN PATENT DOCUMENTS

DE    102018215461 A1 *  3/2020
KR    10-2013-0112507 A    10/2013
(Continued)

OTHER PUBLICATIONS

Robinson, Melia, "Tiny self-driving robots have started delivering food on-demand in Silicon Valley—take a look", Apr. 30, 2018, 18 pages.
(Continued)

*Primary Examiner* — Robert J May
(74) *Attorney, Agent, or Firm* — Siritzky Law, PLLC

(57) ABSTRACT

A mobile robot has a body having at least one item space; a lid constructed and adapted to assume at least an open position and a closed position, wherein the lid is to fit on top of the body in the closed position, so as to cover the item space, and the lid is to be lifted to the open position, so as to allow access to the item space; at least four wheels; and a plurality of light sources arranged as at least one row of lights.

31 Claims, 12 Drawing Sheets

(51) Int. Cl.
    *B60Q 1/32*     (2006.01)
    *B60Q 1/50*     (2006.01)
    *G05D 1/00*     (2006.01)
    *B60Q 1/34*     (2006.01)

(52) U.S. Cl.
    CPC ......... *B60Q 1/5035* (2022.05); *B60Q 1/5037* (2022.05); *B60Q 1/507* (2022.05); *B60Q 1/547* (2022.05); *B60Q 1/34* (2013.01); *G05D 1/021* (2013.01)

(56) References Cited

U.S. PATENT DOCUMENTS

| | | | |
|---|---|---|---|
| 5,942,869 | A | 8/1999 | Katou et al. |
| 6,467,293 | B1 | 10/2002 | Goosman |
| 6,602,037 | B2 | 8/2003 | Winkler |
| 7,073,634 | B2 | 7/2006 | Mitchell et al. |
| 7,320,289 | B1 | 1/2008 | Clarke et al. |
| 7,894,939 | B2 | 2/2011 | Zini et al. |
| 7,931,431 | B2 | 4/2011 | Benedict et al. |
| 8,010,230 | B2 | 8/2011 | Zini et al. |
| 8,104,601 | B2 | 1/2012 | Hayduchok et al. |
| 8,204,624 | B2 | 6/2012 | Zini et al. |
| 8,485,285 | B2 | 7/2013 | Ferrigni |
| 8,874,360 | B2 | 10/2014 | Klinger et al. |
| 8,948,914 | B2 | 2/2015 | Zini et al. |
| 9,020,632 | B2 | 4/2015 | Naylor |
| 9,031,692 | B2 | 5/2015 | Zhu |
| 9,244,147 | B1 | 1/2016 | Soundararajan et al. |
| 9,256,852 | B1 | 2/2016 | Myllymaki |
| 9,266,675 | B2 | 2/2016 | Yamashita |
| 9,302,678 | B2 | 4/2016 | Murphy et al. |
| 9,373,149 | B2 | 6/2016 | Abhyanker |
| 9,557,740 | B2 | 1/2017 | Crawley |
| 9,561,941 | B1 | 2/2017 | Watts |
| 9,694,976 | B1 | 7/2017 | Wurman et al. |
| 9,741,010 | B1 | 8/2017 | Heinla |
| 9,844,879 | B1 | 12/2017 | Cousins et al. |
| 10,046,688 | B2 * | 8/2018 | Salter ................ B60Q 1/0035 |
| 10,470,274 | B2 * | 11/2019 | Masuda ............ B60Q 1/0035 |
| 2003/0165373 | A1 | 9/2003 | Felder et al. |
| 2005/0207876 | A1 | 9/2005 | Springwater |
| 2006/0237239 | A1 | 10/2006 | Bruner et al. |
| 2012/0090110 | A1 | 4/2012 | Van Den Berg et al. |
| 2013/0110281 | A1 | 5/2013 | Jones et al. |
| 2013/0240673 | A1 | 9/2013 | Schlosser et al. |
| 2013/0332021 | A1 | 12/2013 | Goren |
| 2014/0136414 | A1 | 5/2014 | Abhyanker |
| 2014/0254896 | A1 | 9/2014 | Zhou et al. |
| 2014/0365258 | A1 | 12/2014 | Vestal et al. |
| 2015/0006005 | A1 | 1/2015 | Yu et al. |
| 2015/0045945 | A1 | 2/2015 | Zini et al. |
| 2015/0100152 | A1 | 4/2015 | Barragán Treviño et al. |
| 2015/0183581 | A1 | 7/2015 | Worsley |
| 2015/0379468 | A1 | 12/2015 | Harvey |
| 2016/0185466 | A1 | 6/2016 | Dreano, Jr. |
| 2016/0188977 | A1 | 6/2016 | Kearns et al. |
| 2016/0207710 | A1 | 7/2016 | Conrad et al. |
| 2016/0325928 | A1 | 11/2016 | Lepek et al. |
| 2016/0355337 | A1 | 12/2016 | Lert et al. |
| 2016/0368464 | A1 | 12/2016 | Hassounah |
| 2017/0017237 | A1 | 1/2017 | Tokuyama et al. |
| 2017/0100837 | A1 | 4/2017 | Zevenbergen et al. |
| 2017/0185853 | A1 | 6/2017 | Yokota et al. |
| 2017/0220981 | A1 | 8/2017 | Shucker et al. |
| 2017/0267452 | A1 | 9/2017 | Goren et al. |
| 2017/0308098 | A1 * | 10/2017 | Yu ....................... G05D 1/0297 |
| 2017/0369051 | A1 | 12/2017 | Sakai et al. |
| 2018/0020896 | A1 | 1/2018 | High et al. |
| 2018/0107216 | A1 | 4/2018 | Beaurepaire et al. |
| 2018/0349834 | A1 | 12/2018 | Heinla et al. |

FOREIGN PATENT DOCUMENTS

| | | |
|---|---|---|
| WO | 2011/035839 A2 | 3/2011 |
| WO | 2017/064202 A1 | 4/2017 |
| WO | 2017/076929 A1 | 5/2017 |

OTHER PUBLICATIONS

Radwan, Noha et al., "Why did the robot cross the road?—Learning from multi-modal sensor data for autonomous road crossing", 2017 IEEE/RSJ International Conference on Intelligent Robots and Systems (IROS), Sep. 24-28, 2017, Vancouver, BC, Canada, 6 pages.
Hsu, Tsung-Shiang et al., "An improvement stereo vision images processing for object distance measurement", International Journal of Automation and Smart Technology, AUSMT vol. 5, No. 2, 6 pages, Jun. 1, 2015, XP002793529.
Kang, Lei et al., "Augmenting Self-Driving with Remote Control: Challenges and Directions", 2018 Association for Computing Machinery, HotMobile '18, Feb. 12-13, 2018, Tempe, AZ, 6 pages, XP002793539.
Li, Sugang et al., "Auto++ : Detecting Cars Using Embedded Microphones in Real-Time", Proceedings of the ACM on Interactive, Mobile, Wearable and Ubiquitous Technologies, vol. 1, No. 3, Article 70, 20 pages, Sep. 2017.
Baker, Michael et al., "Automated Street Crossing for Assistive Robots", Proceedings of the 2005 IEEE, http://citeseerx.ist.psu.edu/viewdoc/download?doi=10.1.1.124.2156&rep=rep1&type=pdf, Jun. 28, Jul. 1, 2005, 6 pages.
Pettitt, Jeniece, "Forget delivery drones, meet your new delivery robot", Retrieved from the Internet: URL: https://www.cnbc.com/2015/11/02/forget-delivery-drones-meet-your-new-delivery-robot.html, Nov. 2, 2015, 4 pages.
Jacobs, Stefan, "Klauen würde ich ihn nicht" ("I wouldn't steal him"), Retrieved from the Internet: URL: http://www.tagesspiegel.de/mobil/lieferroboter-starship-klauen-wuerde-ich-ihn-nicht/12647114.html, Nov. 29, 2015, 4 pages, English translation provided herewith.
WIPO, International Search Report for International Application No. PCT/EP2019/063003, mailed Aug. 27, 2019, 4 pages.
WIPO, Written Opinion for International Application No. PCT/EP2019/063003, mailed Aug. 27, 2019, 4 pages.
WIPO, International Search Report for International Application No. PCT/EP2019/062999, mailed Jul. 30, 2019, 4 pages.
WIPO, Written Opinion for International Application No. PCT/EP2019/062999, mailed Jul. 30, 2019, 8 pages.
EPO, Examination Report for European Application No. 19724219.1, Dec. 8, 2021. (9 pages).

\* cited by examiner (a)

(b)

(a)

(b)

(c)

(d)

(a)

(b)

AUTONOMOUS VEHICLE WITH A PLURALITY OF LIGHT SOURCES ARRANGED THEREON

RELATED APPLICATIONS

This application is a 371 of International application PCT/EP2019/062999, filed May 20, 2019, the entire contents of which are hereby fully incorporated herein by reference for all purposes. PCT/EP2019/062999 claims the priority benefit of European patent application EP 18173530.9, filed May 22, 2018, the entire contents of which are hereby fully incorporated herein by reference for all purposes.

The invention relates to an autonomous or semi-autonomous robot.

Autonomous and semi-autonomous robots travelling on the sidewalks and other pedestrian walkways are known in the art. Such robots may need to cross vehicle roads to get to their destination. Vehicle roads can refer to traffic roads such as public roads, driveways and other roads where cars and other vehicles may be encountered. The robots can comprise a plurality of sensors to generate a synthetic worldview. Some of these sensors can be used previously and during road crossing to verify that the way is clear and that the road crossing is safe to perform. Sidewalk robots comprising such sensors are disclosed for example in US 2014/0136414 A1 "Autonomous neighborhood vehicle commerce network community".

It is generally desirable that such a robot travels autonomously (i.e., without an operator interacting with the robot) and safely to a great extent, i.e., in a number of different situations. This is also an object of the present invention. In other words, it is an object of the present invention to enable a robot to operate autonomously and safely in many situations. This object is met by the present invention.

In a first embodiment a method comprising a data processing device determining whether a mobile robot road crossing is performed automatically and autonomously by the mobile robot or operator based is disclosed. Thus, the present technology provides a method of determining whether a mobile robot crosses a road automatically and autonomously (i.e. without the control of a human operator) or in an operator-based manner (i.e. with the control of a human operator). That is, the present invention provides a technology to determine whether or not an input of an operator is needed so cross a road. In case such an input is needed, an operator may communicate with the mobile robot, and the robot may cross the road in an operator-controlled manner. If, conversely, no such input is needed to cross the road, the robot may cross the road without an operator intervening. Thus, the road crossing may be performed without an operator intervening in many instances, thereby increasing the percentage of automatic and autonomous operation vis-à-vis the situation in which all road crossings would be performed operator-based. Further, the present technology may be safer than a technology where all road crossings are performed automatically and autonomously, as an operator may control the robot crossing in certain (e.g., particularly dangerous or non-standard) situations. Thus, the present technology arrives at a high percentage of autonomous and automatic operation, while also accounting for a safe operation.

That is, a mobile robot may travel outside, e.g. on sidewalks from an origin location to a destination location. The mobile robot can be configured to drive autonomously (i.e. without a human operator controlling it) or partially autonomously (i.e. with a human operator controlling it during part of travelling time). During the travel, the mobile robot may be required to cross roads. Crossing roads generally can impose a more dangerous scenario, since traffic participants moving on roads usually can be faster than the traffic participants on the sidewalks. In some instances, the mobile robot may require assistance from an operator, such as a human operator (operator-based road crossing can be performed) or in some other instance the mobile robot may cross the road automatically (i.e. the mobile robot determines when to cross the road) and autonomously (i.e. the mobile robot drives autonomously while crossing the road). To put it simply, a decision can be made for each (or at least some) of the road crossings whether it can be automatic and autonomous or operator-based. Thus, the present technology may be advantageous as it provides a method of taking such a decision, that is, determining whether a mobile robot road crossing can be performed automatically and autonomously by the mobile robot or operator-based. In other words, instead of having a human operator evaluating the situation on a road crossing and then taking decisions regarding the road crossing procedure, the present technology allows for a data processing device to determine how the road crossing will be performed (automatically and autonomously or operator-based). The data processing device may be part of the mobile robot, or may be communicatively connected to the robot.

In some embodiments, the method can comprise sending data to an operator terminal, if the road crossing is determined for operator-based road crossing. That is, in such embodiments, whenever the road crossing is determined to be performed in an operator-based manner, data can be sent to an operator terminal. Such data may indicate one or any combination of the following: the road crossing is determined for operator-based road crossing, assistance for crossing the road is required, assistance for determining when to cross the road is required, assistance for determining whether to cross the road is required. Such data may be sent from the mobile robot to the operator terminal, wherein the mobile robot and the operator terminal can be communicatively connected with each-other. Additionally or alternatively, a human operator can have access and/or operate the operator terminal which can allow the human operator to assist or control the mobile robot road crossing. Sending data to the operator terminal when a road crossing is determined for operator-based road crossing can be advantageous as it may allow a human operator to assist or control the mobile robot for crossing the road. Thus, sending data to an operator terminal may facilitate the road crossing in instances when the mobile robot cannot cross the road automatically and autonomously (i.e. operator-based road crossing is determined) and thus can require assistance for the road crossing.

In some embodiments, the method can comprise the mobile robot crossing the road automatically and autonomously, if the road crossing is determined for automatic and autonomous road crossing. That is, a road crossing (such as the road crossing that the mobile robot is required to cross) can be determined by the data processing device for automatic and autonomous road crossing. In other words, assistance from an operator cannot be required for crossing the road. Thus, the mobile robot can cross the road automatically (that is, the mobile robot can determine to cross the road) and autonomously, that is, the mobile robot can drive autonomously while crossing the road. To put it simply, in such embodiments, whenever the method can determine for an automatic and autonomous road crossing, the mobile robot can initiate the road crossing automatically and can cross the road autonomously. This can provide an efficient manner for crossing the roads, as it can reduce or avoid the assistance of an operator while crossing the roads, particularly, when it can be determined for automatic and autonomous road crossing. Wherein otherwise any road crossing would be performed with the assistance or involvement of an operator, embodiments of the present technology can provide a method that can allow a mobile robot to perform some road crossing (i.e. the road crossings that can be determined for automatic and autonomous road crossing) automatically and autonomously without requiring assistance from an operator.

In some embodiments, the method can comprise the mobile robot approaching the road to be crossed. That is, the mobile robot may be configured to travel outside, e.g. on the sidewalks. It may be required, for the mobile robot to arrive at its destination, that the mobile robot crosses a road. Thus, the mobile robot can approach the road crossing. In some embodiments, the mobile robot may be configured to localize itself, for example, the mobile robot can have access to a map and can localize itself on the map. Thus, the mobile robot can "know" its relative position between its own location relative to objects of the surrounding environment. In other words, the mobile robot can "know" the position of the road, and particularly of the road crossing, relative to its own position. This can allow the mobile robot to detect the presence of a road crossing (i.e. the mobile robot can determine that it is about to cross a road) and/or the position of the road crossing. In some embodiments the method of determining whether to cross the road automatically and autonomously or operator-based may initiate when the robot approaches a road crossing.

In some embodiments, the method can comprise determining whether a road is a public road or a driveway. The distinction between public roads and driveways can be advantageous for determining whether the road crossing can be performed automatically and autonomously or operator based. Usually public roads and driveways can provide different scenarios and different aspects that need to be addressed before determining for the type of the road crossing. For example, it can be often the case that public roads comprise more lanes, heavier traffic and cars can move faster compared to driveways. Furthermore, usually occluding obstacles can be present in the roadsides of public roads that can obstruct the view of the mobile robot to the road. Driveways, on the other hand, can comprise fewer lanes (usually one lane), very few traffic (it is usually used by one or two vehicles) and cars can move very slowly as they may have just started moving or they are about to enter a public road. However, it can be often the case that vehicles can be parked on the driveway and they may start moving after the mobile robot detects them as being stationary and can start crossing the road, thus, obstructing the vehicles trajectory of movement. Thus, it can be advantageous that the public roads and driveways can be distinguished from one-another and addressed differently. This can provide a more efficient manner for accurately determining whether assistance can be required from an operator for crossing the road or whether it can be performed automatically and autonomously, as the method can adapt to the type of road, i.e. can address the public road and the driveways in different manners that can be optimized for the respective type of the road. Additionally or alternatively, determining whether the road to be crossed is a public road or a driveway can be advantageous as it can provide a faster algorithm for determining how the road crossing can be performed. For example, detecting that the road to be crossed is a public road allows for neglecting aspects related to driveway crossing, thus, considering only aspects regarding public road crossing which may provide a faster manner of determining whether the road crossing can be performed automatically and autonomously or operator-based.

In some embodiments, the data processing device can access a map and the map can facilitate the determination of a road as a public road or a driveway. That is, the mobile robot can access a map. It can be a map of the surrounding of the mobile robot, a map of a city or a larger map (such as map of a country or map of the world) or smaller map (a map of the road to be crossed). The mobile robot can use the map for localization and navigation. At the same time, the map can be used for determining that a road is a public road or a driveway. The map facilitating the determination of a road as a public road or a driveway can be an overlay or extension of a map used for navigation (i.e. a map comprising information regarding roads, buildings and other elements of an environment) or it can be a separate map used, among others, for the determination of a road as a public road or a driveway. Such a map can be advantageous as it can provide information about the road, e.g. the type of the road, size of the road, position of the road and/or other information that can facilitate the determination of a road as a public road or a driveway.

In some embodiments, the map that the data processing device can have access to can comprise information whether a road is a public road or a driveway, such as the map comprising a tag that classifies a road as public road or driveway. That is, the mobile robot can be configured to determine if a road can be a public road or a driveway. Furthermore, the mobile robot can access a map and the map may facilitate the determination of a road as a public road or a driveway. Thus, it can be advantageous for the map to comprise information whether a road is a public road or a driveway. The map can comprise a tag, such as, a tag for each road, that can classify the road as public road or driveway. Associating each (or at least some) of the roads in the map with such a tag can provide an efficient manner for determining if the road is a public road or a driveway. That is, the determination can be instantly (or very fast) done by just reading and deciphering the tag. For example, the tag can be stored, as a data structure, within the data of the map in a memory that the mobile robot can have access to. In a simple example, the tag can be an information bit that can indicate to the mobile robot the type of the road. The mobile robot can read such a tag (or data structure, a bit) and can decipher such a tag to determine if the road is a public road or a driveway (e.g. a road type tag bit with a value 1 can indicate a public road and a road type tag bit with a value 0 can indicate a driveway).

In some embodiments, the tags that classify a road as a public road or a driveway can be added manually by an operator. That is, the tags that can be comprised in a map that the mobile robot can access, said tags configured to indicate whether the road is a public road or a driveway, can be added to the map or to a memory that the mobile robot can access by an operator, such as a human operator. This can be advantageous, as the classification of the roads as public roads or driveways can be done or refined by the operator, such as the human operator. That is, the decision-making capabilities of the operator, such as the human operator, may facilitate the process of classifying the roads as public roads or driveways, which may result in a more accurate classification.

In some embodiments, the determination of a road as a public road or a driveway can be facilitated by the topology of the road. That is, characteristics of the environment can be used to determine the type of the road. For example, if a public road ends at a certain point then the continuation can probably be a parking place or a driveway. Or, if a public map does not include the respective road, then it can probably be a driveway (based on the rationale that usually driveways are private roads and may not be included in public maps). Further hints from the environment can be used to determine the type of the road. For example, if the road is fully equipped with traffic signs, e.g. with traffic lights, or if the road comprises multiple cars driving on it, then it can probably be a public road. In yet another example, if the road can lead towards a house or a building, then it can probably be a driveway. The above-mentioned, as well as other topological characteristics, can be used alone or in combination with each-other to facilitate the determination of a road as a public road or a driveway. Using the topology of the road can be advantageous as it can be performed by the mobile robot (i.e. by some data processing device and/or sensors comprised by the mobile robot). For example, the mobile robot can use the data from a map, or data from its sensors, such as cameras, to analyze the topology of the road, in order to determine the type of the road. Thus, the determination of the road as a public road or a driveway can be automated—i.e. can be achieved by the mobile robot without or very little human assistance. Furthermore, the determination of a road as a public road or a driveway using the topology of the road can be advantageous as it can allow to determine the type of the road in cases where no previous classification is done for the road, e.g. the road is not tagged as being a public road or a driveway. It can also be advantageous, as it can allow for on-the-spot determination of the type of the road. The determination of the type of the road based on topological characteristics can serve as a main mechanism for classifying the road as a public road or a driveway, or can be a back-up mechanism for classifying the roads as driveways or public roads in cases where the mobile robot comprises no information regarding the type of the road.

In some embodiments, the method can comprise determining whether a public road is safe to cross automatically and autonomously. That is, a distinction can be made between public roads that can be safe to cross automatically and autonomously and public roads that cannot be safe to cross automatically and autonomously. Such a distinction can be made based on the level of difficulty they impose on crossing the road. For example, a road with 4 lanes, 80 km/h speed limit, and with a heavy traffic may be more difficult to cross than a single lane road with a maximum speed limit of 30 km/h. Thus, a distinction between public roads that are safe to cross automatically and autonomously and public roads that are not safe can be made and can provide a more efficient manner for determining for autonomous and automatic road crossing or for operator-based. The classification of the public roads as safe or not safe for automatic and autonomous road crossing can be advantageous as it can allow the method to adapt to the respective type of the road. That is, the method can consider different aspects for each of the public road types, that are suitable for the respective public road type. For example, the efficiency of the method can be increased by determining for operator-based road crossing whenever the road to be crossed is classified as an "unsafe" road crossing (i.e. the road is not safe for automatic and autonomous crossing), thus skipping further checks that most probably can result in the decision of operator-based road crossing. Furthermore, such a classification can be advantageous as it can increase the safety of the traffic participants and mobile robot. By classifying the roads that can impose a more dangerous scenario for crossing as not safe for automatic and autonomous crossing, extra attention can be paid by either the mobile robot or the operator for crossing the roads which can reduce the number of accidents that can happen.

In some embodiments, information related to whether a public road is safe to cross automatically and autonomously can be stored on a map that the mobile robot can access. That is, the mobile robot can be configured to determine if a public road can be safe for automatic and autonomous road crossing. Furthermore, the mobile robot can access a map and the map can facilitate the determination of a public road as safe or not safe for automatic and autonomous road crossing. Thus, it can be advantageous that the map comprises information whether a public road is safe. The map can comprise a tag, such as, a tag for each public road, that classifies the public road as safe or not safe. Associating each or at least some of the public roads in the map with such a tag can provide an efficient manner for determining if the public road is safe or not safe. That is, the determination can be instantly (or very fast) done by just reading and deciphering the tag (or the information that is stored on the map for classifying the public road as safe or not safe). For example, the information can be a data structure stored within the data of the map in a memory that the mobile robot can have access to. In a simple example, the tag can be an information bit that can indicate to the mobile robot whether the public road associated with the bit can be safe or not safe for autonomous road crossing. The mobile robot can read such a tag (or data structure, or bit) and can decipher such a tag to determine if the public road can be safe to cross automatically and autonomously or not (for example a tag bit with a value 1 can indicate that a public road is safe to cross automatically and autonomously and a tag bit with a value 0 can indicate a public road that is not safe to cross automatically and autonomously).

In some embodiments, information related to whether a public road can be safe to cross automatically and autonomously can be added manually to the map by an operator. That is, the information that can be comprised in a map that the data processing device can access, said information configured to indicate whether a public road can be safe or not safe for automatic and autonomous road crossing, can be added to the map or to a memory that the mobile robot can access by a human operator. This can be advantageous, as the classification of the public roads as safe or not safe to cross automatically and autonomously can be done or refined by an operator, such as a human operator. That is, the decision-making capabilities of the human operator may facilitate the process of classifying the public roads as safe or not safe to cross automatically and autonomously, which may result in a more accurate classification.

In some embodiments, information related to whether a public road can be safe to cross automatically and autonomously can be added to the map on a robot run. That is, the mobile robot can travel from a first location, such as the starting point, to a second location, such as the destination. Such a travelling can also be referred as a robot run. During the travelling (i.e. the robot run) the mobile robot may be required to cross a public road. A determination whether the public road is safe to cross automatically and autonomously can be done by the mobile robot, or a human operator or both the mobile robot and the human operator. Based on the determination, the public road can be marked or tagged as safe or not safe. Such information can be stored in a memory, such as within the data of a map that the mobile robot (e.g., the data processing device) can access, for further use. When the mobile robot is required to cross the same public road, it can use a previous determination (i.e. a determination taken in the past) to determine whether the public road can be safe to cross automatically and autonomously. This can provide an efficient manner for determining if a public road is safe, as the mobile robot and/or the human operator do not have to take such a decision every time the mobile robot crosses a public road. If the decision is taken once, then it can be used in future crossings of the public road.

In some embodiments, a public road is classified as safe to cross automatically and autonomously if it comprises at least one of the following characteristics: low maximum speed limit, light traffic, few lanes, statistics indicating a small likelihood for accidents.

In some embodiments, a public road is classified as not safe to cross automatically and autonomously if it comprises at least one of high maximum speed limit, heavy traffic, many lanes, statistics indicating a high likelihood for accidents.

In some embodiments, the road crossing can be determined as operator-based road crossing if the public road can be determined as not safe to cross automatically and autonomously. That is, a public road can be classified as safe or not safe to cross automatically and autonomously. Such a classification can be done in various manners. In some embodiments, information regarding the classification of a public road as safe or not safe to cross automatically and autonomously can be stored on a map either manually by a human operator or by the mobile robot or a combination of both the human operator and the mobile robot. A public road can be classified as safe and not safe based on different characteristics of the road such as number of lanes, speed limits, amount of traffic, accident statistics and/or position of the public road. In some embodiments, if a road is determined as not safe to cross automatically and autonomously the road crossing can be determined as operator-based. That is, a human operator can assist the mobile robot for crossing public roads that cannot be safe for automatic and autonomous road crossing. The assistance of the mobile robot by the human operator can comprise the human operator deciding when the road crossing can initiate and transmitting such information to the mobile robot. That is, the human operator can see the public road either directly by being on the scene or by live video streaming provided by the mobile robot and can determine when to start the road crossing. For example, the human operator can check the traffic light and/or if there are any vehicles or other traffic participants approaching the road crossing. Additionally or alternatively, the human operator can control the mobile robot driving, while crossing the road. For example, the human operator can decide (and communicate to the robot) when the robot should accelerate, decelerate, turn left, turn right, move backward.

An operator, such as a human operator, assisting the mobile robot during the crossing of not safe public roads can be advantageous as it can increase the safety of the traffic participants and mobile robot. Usually, roads classified as not safe for automatic and autonomous road crossing can impose a higher level of difficulty and can be more dangerous to cross. For example, they can comprise fast moving cars or can comprise many lanes and thus cannot be crossed quickly. Thus, assistance from a human operator in such cases can be advantageous as it can allow for a more secure road crossing.

In some embodiments, the method can comprise determining whether there are any occluding obstacles that can occlude the vision of the mobile robot to the road. Occluding obstacles can be obstacles such as parked cars on the roadsides, trees, traffic signs, buildings, traffic participants that can be positioned between the mobile robot and the road, thus occluding the mobile robot's vision to the road or part of the road. It can be advantageous for the mobile robot to "see" the road, or a substantial part of the road, for determining to cross the road automatically and autonomously or operator-based. For example, the information whether there is a car driving on the road can facilitate the determination of how to cross the road. However, there can be present occluding obstacles, that can occlude part of the robot's vision, to the road. Due to occluding obstacles, the mobile robot cannot observe the true state (e.g. presence of a driving car) of the road, or part of the road. Thus, it can be advantageous to determine whether there are any occluding obstacles occluding the vision of the mobile robot to the road. It can allow the mobile robot to determine whether it can observe the true state of the road (i.e. no obstacles are present) or whether its view to the road is occluded. Such determination can be advantageous as it can increase safety. For example, it can reduce or eliminate the error of inferring that there are no moving cars on the road when there can actually be moving cars on the road. Such an error can be mostly caused because the view of the mobile robot to the road can be obstructed.

In some embodiments, the determination whether there are any occluding obstacles occluding the vision of the mobile robot to a road is facilitated by the determination of the position of the mobile robot relative to the road. The mobile robot can use a map and/or its localization features to localize itself or to find its relative position to the road. The relative position between the road and the mobile robot can be advantageous as it can allow the mobile robot to determine whether an obstacle in the surrounding occludes the vision of the mobile robot to the road. It can be understood that not all the objects detected on the surrounding of the mobile robot occlude the vision of the mobile robot to the road. Rather, only obstacles positioned between the mobile robot and the road can occlude vision of the mobile robot to part of the road. Thus, for a more accurate determination whether there are any occluding obstacles occluding the vision of the mobile robot to a road, it can be advantageous to determine the relative position between the mobile robot and the road.

In some embodiments, the determination whether there are any occluding obstacles occluding the vision of the mobile robot to a road can be facilitated by the relative position between the mobile robot, the road and the occluding obstacle. That is, the mobile robot can know its relative position to the road. For example, the mobile robot can use its localization features and/or a map to determine its relative position to the road. Furthermore, the mobile robot can be configured to detect objects positioned in the surroundings of the mobile robot, such as in all the directions or only in the directions towards the road to be crossed by the mobile robot. Further, the mobile robot can determine the position of the object relative to the mobile robot and/or to the road. The relative position of the object relative to the mobile robot can facilitate the determination whether such an object occludes vision of the mobile robot to the road or not. It can be understood that not all the objects detected on the surrounding of the mobile robot can occlude the vision of the mobile robot to the road. Rather, only obstacles positioned between the mobile robot and the road can occlude the vision of the mobile robot to part of the road. Thus, for a more accurate determination whether there are any occluding obstacles occluding the vision of the mobile robot to a road, it can be advantageous to determine the relative position between an obstacle, that can potentially occlude the vision of the mobile robot to the road, the mobile robot and the road to be crossed.

In some embodiments, a map can be used for determining the relative position between the mobile robot and the road. The map can be advantageous as it can facilitate the mobile robot's localization. Furthermore, the map can provide to the mobile robot information regarding the position of roads. Thus, the mobile robot using the map and/or its localization features can localize itself on the map and thus can calculate the relative position between itself and the road. Furthermore, using the map to determine the relative position between the mobile robot and the road can be efficient, as usually the mobile robot can have access to the map for the purpose of localization and the same map (and/or localization process) can be used to also determine the relative position between the road and the mobile robot.

In some embodiments, the method can comprise the mobile robot localizing itself. Thus, the mobile robot can determine its own position. The mobile robot's position can be advantageous as the mobile robot can further infer the relative position between the robot and the road and/or an occluding obstacle. Furthermore, being able to localize itself can facilitate the mobile robot navigation and autonomous driving. In some embodiments, the mobile robot may localize itself by means of a localization algorithm described in WO 2017/076929 A1.

In some embodiments, the determination whether there are any occluding obstacles occluding the vision of the mobile robot to the road can be facilitated by an image of the surrounding of the mobile robot. For example, the mobile robot can take images of the surroundings and can identify shape patterns on such images that can be similar with potential occluding obstacles such as parked vehicles, trees, traffic signs, traffic participants and/or buildings. The pattern recognition may be facilitated by neural network algorithms. Thus, using images of the surrounding, the mobile robot can determine the presence (or absence) and/or the position on the image of a potential occluding obstacle. For example, images can be taken only in the direction towards the road, and if obstacles are detected on such images the mobile robot can infer the presence of occluding obstacles that occlude robot's vision to the road. In another example, the mobile robot can take images on different directions, such as all the directions, and based on a known relative position between the mobile robot and the road, the mobile robot can infer which of the obstacles that can be detected on the captured images can obstruct mobile robot's view to the road.

In some embodiments, the determination whether there are any occluding obstacles blocking the vision of the mobile robot to the road can be facilitated by any of the detection and localization of the road on the image. That is, the mobile robot can capture an image of the surrounding. Furthermore, the mobile robot can detect the presence and/or detection of the road on the image. For example, the mobile robot can search for shape patterns on the image similar to the shape of a road (e.g. two parallel lines). Upon detection of the road on the image, the mobile robot can determine if there are any obstacles that obstruct its view to the road. For example, the mobile robot can detect that the two lines (or the shapes that represent the road) are not continuous (e.g. they are interrupted at some point and resume at a distant point), it can infer that part of the view of the mobile robot to the road is obstructed. Thus, detecting the presence and/or position of a road on the image can be advantageous as it can provide hints to the mobile robot whether the view of the robot to the road can be obstructed. Such a detection can also be advantageous as it can facilitate the localization of the mobile robot. Said detection can also allow the mobile robot to determine a relative position of the mobile robot to the road.

In some embodiments, the determination whether there are any occluding obstacles occluding the vision of the mobile robot to the road can be facilitated by any of the detection and localization of the obstacle on the image. That is, the mobile robot can capture an image of the surrounding. Furthermore, the mobile robot can detect the presence (or absence) and/or position of an obstacle on the image. For example, the mobile robot can search for shape patterns on the image that can belong to occluding obstacles such as parked vehicles, trees, traffic signs, buildings or traffic participants. The detection of the obstacles on the images can be facilitated by neural networks algorithm. Taking images of the surrounding and detecting obstacles on the images can be advantageous as it can provide an efficient manner for detecting if there can be any obstacle that can occlude the mobile robot's vision to the road. Furthermore, the detection of the obstacle on the image and the position of the obstacle on the image can allow the mobile robot to infer the relative position between the obstacle and the mobile robot. Thus, the mobile robot can determine if the obstacle occludes the mobile robot's vision to the road or not.

In some embodiments, stereo cameras can be used for detecting occluding obstacles occluding the vision of the mobile robot to the road.

In some embodiments, time-of-flight (TOF) cameras can be used for detecting occluding obstacles occluding the vision of the mobile robot to the road.

In some embodiments, ultrasonic cameras can be used for detecting occluding obstacles occluding the vision of the mobile robot to the road.

That is, a variety of sensors, such as stereo cameras, TOF cameras and/or ultrasonic cameras, can be used for detecting occluding obstacles that occlude the vision of the mobile robot to the road. The use of said sensors (alone or in combination with each-other) can provide more accurate information regarding the presence of an obstacle and the position of the obstacle relative to the mobile robot (or the respective sensors). Thus, the use of said sensors can facilitate the determination of whether there are any occluding obstacles that can occlude the vision of the mobile robot to the road.

In some embodiments, all the directions can be searched for detecting occluding obstacles occluding the vision of the mobile robot to the road.

In some embodiments, only the directions towards roads surrounding the mobile robot can be searched for detecting occluding obstacles occluding the vision of the mobile robot to the road. That is, the mobile robot can "know" the directions towards the road, e.g. the mobile robot comprises information regarding the relative position of the mobile robot to the road. Based on the rationale that the view of the mobile robot to the road can only be obstructed by obstacles positioned between the mobile robot and the road, it can be efficient that only the directions toward the road are searched for detecting occluding obstacles. This may result in a faster determination of whether the view of the mobile robot to the road is obstructed.

In some embodiments, the determination whether there are any occluding obstacles occluding the vision of the mobile robot to a road can be facilitated by the size of the obstacle. That is, a threshold can be defined that indicates the maximum size of an obstacle that can be tolerated (i.e. that can allow the mobile robot to gain the true state of the road even if the obstacle is present). For example, thin objects, such as sign posts, can obstruct only a small part of the road and can allow the mobile robot to "see" the road. The mobile robot can for example detect a car moving on the road even if a sign post is positioned between the mobile robot and the road. However larger obstacles such as cars parked on the roadside or group of people walking on the roadside or sidewalk, may block a relatively big part of the road and may not allow the mobile robot to detect the true state of the road, e.g. a car driving on the road. Thus, it can be advantageous to determine, among others, the size of the obstacle.

In some embodiments, the road crossing can be determined as operator-based road crossing if it is determined that there exist occluding obstacles occluding the vision of the mobile robot to the road and the size of the occluding obstacle exceeds a certain threshold. That is, if an obstacle exceeding a certain threshold value can be present, it may not allow the mobile robot to "see" part of the road. Thus, it may not be completely safe for the mobile robot to cross the road automatically and autonomously. As a result, it may be advantageous for safety reasons, to perform an operator-based road crossing when there are occluding obstacles occluding the vision of the mobile robot to the road and the size of the occluding obstacle exceeds a certain threshold.

In some embodiments, wherein the road can be determined to be a driveway, the method further can comprise determining the presence of a car in a driveway. That is, in some embodiments, the mobile robot can determine the type of the road to be crossed. If it can be determined that the road to be crossed is a driveway, further the presence or absence of a car in a driveway can be determined. To do that, the robot may capture an image and perform a pattern recognition algorithm (e.g. based on neural networks) on the image. It may be advantageous to check if there can be a car parked in the driveway as usually there are no cars parked on the driveway and thus the driveway cross can be performed automatically and autonomously. On the other hand, if a car is parked on the driveway it may not be safe for the mobile robot to cross the driveway automatically and autonomously as the car may start moving while the robot is crossing the driveway. Thus, it can be advantageous for the mobile robot to "know" whether there is a car parked on the driveway or not.

In some embodiments, the road crossing can be determined as automatic and autonomous road crossing if no car can be detected on the driveway. In other words, the road crossing can be determined to be safe for automatic and autonomous road crossing if no car can be detected on the driveway. Since no car can be detected in the driveway, there cannot be any car present on the driveway (or, at least, it is unlikely that there is a car in the driveway), meaning that the mobile robot cannot obstruct the trajectory of movement of any car while crossing the driveway. This can impose an easy scenario for the mobile robot and thus the mobile robot can safely cross the road automatically and autonomously. Thus, the percentage of autonomous driving of the mobile robot can be increased (i.e. the time the mobile robot drives autonomously can be increased) and also the need for operator assistance can be reduced. Otherwise the operator would assist the mobile robot to cross driveways even when no cars are present on the driveway. However, in the present embodiment the mobile robot can cross the driveway without human assistance when no cars are present on the driveway.

In some embodiments, the road crossing can be determined as automatic and autonomous road crossing if a car can be detected on the driveway and it is unlikely that the mobile robot obstructs the car's trajectory. As discussed, in some embodiments, the road crossing can be determined as automatic and autonomous road-crossing if no car can be detected on the driveway. However, in some embodiments, the mobile robot can still cross the driveway automatically and autonomously even if a car can be detected on the driveway. However, in such embodiments, it is advantageous to predict (i.e. assign a likelihood) that the mobile robot cannot obstruct the car's trajectory if the car may start to move or may be moving. If it can be determined that the likelihood that the mobile robot can obstruct the car's trajectory is small (or below a threshold value), the mobile robot can safely cross the driveway automatically and autonomously. Thus, the autonomous level of the mobile robot can be increased (i.e. the time the mobile robot drives autonomously can be increased) and also the need for operator assistance can be reduced. Otherwise, the operator would assist the mobile robot to cross driveways when a car is present on the driveway. In the discussed embodiment the mobile robot can cross the driveway without human assistance even if the car is present on the driveway but it is unlikely that the trajectory of movement of the car and trajectory of movement of the mobile robot intersect eachother while the mobile robot crosses the driveway.

In some embodiments, the road crossing can be determined as automatic and autonomous road crossing if a car can be detected on the driveway and it is unlikely that the car will move on the driveway while the robot is crossing the driveway. That is, if it can be determined that the car will stay stationary while the robot crosses the driveway the mobile robot can perform the road crossing automatically and autonomously. This can be advantageous, as it can often be the case that when cars can be parked on the driveway they rarely start to move. Usually cars can be parked on the driveways for a relatively long time and they may move very unfrequently. Thus, it can be efficient to consider not only the presence of the car on a driveway but also the likelihood that the car can move on the subsequent moments that the robot will cross the driveway. If the likelihood is low, the car though present on the driveway, may not impose any danger to the mobile robot. Thus, the mobile robot can automatically and autonomously cross the driveway. This can increase the autonomous level of the mobile robot (i.e. the time the mobile robot drives autonomously can be increased) and also the need for operator assistance can be reduced. Otherwise the operator would assist the mobile robot to cross driveways when a car can be present on the driveway. In the discussed embodiment the mobile robot can cross the driveway without human assistance even if the car can be present on the driveway but it can be determined that is can be unlikely that the car can start to move while the robot crosses the driveway.

In some embodiments, a moving object detector can be used to determine the likelihood that the car can move while the robot is crossing the driveway. The moving object detector can be configured to determine movements of a target, such as a car parked on the driveway. Thus, the moving object detector can be advantageous as it can allow the mobile robot to know if a target, such as a car, can be stationary or moving.

In some embodiments, the detection of the sound produced by the car when the car can be turned-on can be used to determine the likelihood that the car can move while the robot is crossing the driveway. The robot can be configured to detect the sound produced while a car is turned-on, such as the sound of the engine of the car. Logically, a car that is turned-on is expected to start moving. In contrary, if a car is turned off it can be unlikely that the car will start moving, at least in the subsequent moments while the robot crosses the driveway. Thus, if the robot cannot detect any car sound, such as engine sound, the mobile robot can infer the absence of the car on the driveway or the car is stationary, and thus can automatically and autonomously cross the road. This can increase the autonomous level of the mobile robot (i.e. the time the mobile robot can drive autonomously can be increased) and also the need for operator assistance can be reduced. While otherwise the operator would assist the mobile robot to cross driveways when a car can be present on the driveway, in such embodiments the mobile robot can cross the driveway without human assistance even if the car can be present on the driveway but no car sound can be detected (i.e. the car can be determined to be turned-off).

In some embodiments, the road crossing can be determined as operator-based road crossing if there is a car detected on the driveway. In some embodiments, wherein a car is detected on the driveway, it can be considered dangerous, i.e. it is more difficult for the mobile robot to cross the driveway automatically and autonomously. In some instances, the car can start moving and thus the robot can obstruct the car's way. Such scenarios may be prone to accidents, thus assistance from an operator, such as a human operator, can be advantageous. For safety reasons, it can be advantageous that when a car can be detected on the driveway the road crossing can be preformed operator-based.

In some embodiments, a road crossing can be determined as automatic and autonomous road crossing if a public road can be classified as safe for automatic and autonomous road crossing and no occluding obstacles, such as cars parked on the roadside, can obstruct the vision of the mobile robot to the road. That is, a mobile robot may be required to cross a public road. The mobile robot can cross the road automatically and autonomously (i.e. without human assistance) or operator-based (i.e. with human assistance). Further, the public road can be a safe road for automatic and autonomous road crossing, i.e. can impose a low level of difficulty for crossing the road and in some cases, can be crossed automatically and autonomously, or the public road can be an "unsafe" road, i.e. can impose a high level of difficulty for crossing the road and cannot be crossed automatically and autonomously. Furthermore, occluding obstacles that can occlude the vision of the mobile robot to the road can be detected. In such embodiments, the mobile robot performs the road crossing automatically and autonomously if the public road that needs to be crossed can be classified as safe and if there are no occluding obstacles that obstruct the vision of the mobile robot to the road.

In such scenarios, wherein the road can be classified as safe and the vision of the mobile robot to the road cannot obstructed, it can be advantageous to cross the road automatically and autonomously for various reasons. Firstly, the road can be classified as safe, thus imposes a lower level of difficulty for being crossed, e.g. cars can drive with low speed (e.g. 0-30 km/h), the road can comprise few lanes (e.g. 1-2 lanes), statistics indicating a low number of accidents, that can infer that the road fulfills several safety standards. Secondly, the mobile's robot vision to the road is not occluded, thus the robot can gain the full state of the road, e.g. the robot can determine if there are cars moving on the road. Thus, it can be more efficient (as there is no need for human intervention) and at the same time safely (as the road is classified as safe and the robot has a full view to the road) to cross the road automatically and autonomously.

In some embodiments, wherein a road crossing can be determined as automatic and autonomous road crossing if a public road can be classified as safe for automatic and autonomous road crossing and an obstacle with a size below a threshold is detected. As discussed, it can be advantageous for the mobile robot to cross a public road if it can be classified as safe for automatic and autonomous road crossing and no occluding obstacle that can occlude mobile robot's vision to the road can be detected. However, in some instances even when an occluding obstacle may be present between the mobile robot and the road to be crossed, the occluding obstacle cannot significantly obstruct the vision of the mobile robot to the road. For example, a road sign post is very thin and thus even though it may be present between the mobile robot and the road it cannot obstruct the vision of the mobile robot to the road or the obstruction area is negligible. Thus, a threshold can be defined regarding size of an occluding obstacle. Obstacles that can exceed such a threshold can significantly occlude vision of the mobile robot to the road, that is, they can prevent the mobile robot from gaining the true state of the road. Obstacles that can be below such a threshold, even if present, can still allow the mobile robot to gain the true state of the road, such as, the robot can determine if there can be moving vehicles on the road. Thus, it can be advantageous that when a public road can be classified as safe and an occluding obstacle can be detected, the road crossing can be performed automatically and autonomously if the occluding obstacle can comprise a size smaller than the threshold.

In some embodiments, sending data to an operator, if the road crossing can be determined for operator-based road crossing, can be done by a communication device that can be comprised by the mobile robot. That is, in some embodiments, the road crossing can be performed automatically and autonomously by the mobile robot without any operator assistance, i.e. can be performed operator-based. In such instances, assistance from an operator can be required by the mobile robot in order to cross the road. That is, the mobile robot indicates to the operator that it cannot cross the road automatically and autonomously and it can require assistance. Thus, it can be advantageous for the mobile robot to comprise a communication device. The communication device can be configured to send data to an operator, for example through a network such as the internet or the wireless communication networks for mobile devices and data terminals. Thus, the communication device can be advantageous as it can allow the mobile robot to send data to an operator, particularly for requiring assistance for the road crossing in cases the road crossing can be determined for operator based road crossing.

In some embodiments, the communication device can be configured to send a message to an external device, such as an operator terminal, for requiring assistance for the road crossing. As discussed, the mobile robot can comprise a communication device configured to send data to an operator if the road crossing can be determined for operator-based road crossing. Such data can be sent by the communication device to an external device that can be an operator terminal, such as a system-on-chip or a computer. The data can comprise a message indicating that the mobile robot requires assistance for the road crossing. This can be advantageous, particularly when a road crossing can be determined for operator-based road crossing, as it can allow the mobile robot to notify the operator, e.g. a human operator or an operator terminal, that assistance is required for the road crossing. Furthermore, communicating such a message using the communication device can allow the mobile robot to be operated or assisted remotely by the operator.

In some embodiments, sensor data can be sent from the communication device to the operator terminal. The sensor data can comprise images, such as live images, taken from the surroundings of the robot. That is, the mobile robot can comprise a communication device for sending data to an operator, such as an operator terminal. Particularly, such data can be sent for requiring assistance for a road crossing when the road crossing can be determined for operator-based. Furthermore, sensor data can be sent from the communication device to the operator terminal. That is, the mobile robot can comprise sensors that it can use for its operations, such as cameras, stereo cameras, time-of-flight cameras, ultrasonic cameras, LIDAR, doppler radar, gyroscope, GPS and/or odometer. Data from one or more of the sensors comprised by the mobile robot can be sent to the operator terminal, such as images of the surroundings of the robot. The sensor data can be advantageous as they can provide more insight regarding the surrounding of the mobile robot to the operator. Furthermore, the sensor data can ease the efforts of the operator while assisting the mobile robot for the road crossing. The sensor data, such as live images (or live video), can allow an operator, such as a human operator, to remotely assist the mobile robot without being near to the mobile robot. The sensor data can allow or facilitate the operator to analyze the surrounding of the robot, such as the road to be crossed, and decide when and how the mobile robot can cross the road. For example, through live sensor data sent from the mobile robot to the operator, the operator can determine when the road is empty (i.e. no cars are moving) and/or when the traffic light is opened for the mobile robot. When the road is empty and/or the traffic light goes green for the mobile robot, then the operator can indicate to the mobile robot to cross the road. In another example, live sensor data, such as live images or videos, sent from the communication device to the operator can allow the operator to control the mobile robot driving while crossing the road.

In some embodiments, the message and/or the sensor data can be displayed on the operator terminal. This can be advantageous as it can allow a human operator to see the data sent from the communication device to the operator terminal. The display of the message and/or sensor data can be an efficient manner for indicating the data to a human operator that can operate the operator terminal, as it can be easier for a human operator to receive such data and to analyze them. Furthermore, the display of the data can be particularly efficient when visual data, such as images or videos, are sent from the communication device of the mobile robot to the operator terminal.

In some embodiments, the operator terminal can be configured to receive instructions from a human operator. In some embodiments, an operator interface device, such as mouse, keyboard, joystick, touch panel, microphone, camera, can be used by the human operator to transfer instructions to the operator terminal. As discussed, the operator terminal can receive data from the communication device of the mobile robot. Such data can comprise a message for requiring assistance for the road crossing (in case of operator-based road crossing) and/or sensor data that provides information regarding the surroundings of the mobile robot and/or robot data. That is, in cases the road crossing can be determined for operator-based road crossing the mobile robot may wait for an input (assistance) from the operator terminal and/or human operator. In order for the human operator to provide assistance to the mobile robot it can be advantageous that the human operator can control or provide commands or instructions to the operator terminal. Thus, it can be advantageous for the operator terminal to receive instructions from the human operator. Furthermore, to facilitate the transfer of instructions from the human operator to the operator terminal, an operator interface device can be provided. The operator interface device can be a mouse, keyboard, joystick, touch panel, microphone, camera. For example, the human operator can use the operator interface device (e.g. a keyboard) to write an instruction or message that can indicate to the mobile robot when and how to cross the road. In yet another example, the human operator can use the operator interface device (e.g. a joystick) to control the mobile robot driving while crossing the road, i.e. the human operator can provide instructions such as accelerate, decelerate, turn left, turn right, go backwards to the mobile robot.

In some embodiments, instructions can be sent from the operator terminal to the communication device. As discussed, the operator terminal can be configured to receive instructions from a human operator. Such instructions (such as cross the road, accelerate, decelerate, turn left, turn right) can be sent from the operator terminal to the communication device. Thus, a communication from the human operator to the communication device can be established through the operator terminal. This can allow the human operator to send instructions to the mobile robot. Furthermore, it can allow the human operator to remotely control the mobile robot.

In some embodiments, the instructions can indicate to the mobile robot to cross the road. In some embodiments, the robot can receive an instruction indicating to cross the road and the robot can cross the road autonomously without the operator controlling it. One non-limiting example of such an instruction could be: "cross the road now". In such an example, the robot can receive the instruction and then autonomously cross the road. Thus, this example may also be referred to as operator-triggered autonomous road crossing. This can be advantageous, as in instances wherein the road crossing can be determined for operator-based road crossing, it can be a human operator that can decide when the mobile robot can cross the road. This can provide a safe manner of crossing roads that the mobile robot cannot cross automatically and autonomously. In some embodiments, the robot can continue driving autonomously while crossing the road once it has received the instruction for crossing the road. Thus, the human operator can intervene only for deciding when to cross the road, or for initiating the road crossing and the robot can autonomously cross the road.

In some embodiments, instructions to the robot can include at least one of accelerate, decelerate, turn left, turn right, go backwards. In some embodiments, the mobile robot receives the instructions and the crossing of the road by the mobile robot is manually controlled by the human operator. That is, in such embodiments the instructions that the mobile robot can receive can be more detailed. E.g., the remote operator terminal can send instructions like accelerate, decelerate, go left, go right, to the robot, and more particularly to the communication device of the robot. That is, the whole process of crossing the road can be manually controlled. This is why this example may also be referred to as operator-controlled road crossing. Sending such (detailed) instructions to the mobile robot can be advantageous in some situations as it can allow the human operator to control the mobile robot. It can be advantageous, particularly for safety reasons, for the road crossing to be performed manually by the human operator, in some instances that can impose a dangerous scenario for the road crossing, e.g. roads with high speed limits or heavy traffic.

In some embodiments, the method can comprise determining whether a driveway is safe to cross automatically and autonomously. That is, a distinction can be made between driveways that are safe to cross automatically and autonomously and driveways that are not safe to cross automatically and autonomously. Such a distinction can be made based on the level of difficulty they can impose on crossing the road. For example, a driveway offering low visibility to either the driver of the car or the mobile robot can impose a high level of difficulty to cross. Thus, a distinction between driveways that are safe to cross automatically and autonomously and driveways that are not can be made and can provide a more efficient manner for determining for autonomous and automatic road crossing or for operator-based road crossing. The classification of driveways as safe or not safe for automatic and autonomous road crossing can be advantageous as it can allow the method to adapt to the respective type of the road. That is, the method can consider different aspects for each of the driveway types, that can be suitable for the respective driveway type. For example, the efficiency of the method can be increased by determining for operator-based road crossing whenever the driveway to be crossed can be classified as an "unsafe" road crossing (i.e. the driveway cannot be safe for automatic and autonomous crossing). Furthermore, such a classification can be advantageous as it can increase the safety of the mobile robot and the other traffic participants. By classifying the driveways that can impose a more dangerous scenario for crossing as not safe for automatic and autonomous crossing, extra attention can be paid by either the mobile robot or the operator for crossing the driveway which can reduce the number of accidents or incidents that can happen.

In some embodiments, information related to whether a driveway is safe to cross automatically and autonomously can be stored on a map that the data processing device can have access to. That is, the mobile robot can be configured to determine if a driveway can be safe for automatic and autonomous road crossing. Furthermore, the mobile robot can access a map and the map may facilitate the determination of a driveway as safe or not safe for automatic and autonomous road crossing. Thus, it can be advantageous that the map can comprise information whether a driveway can be safe. The map can comprise a tag, such as a tag for each driveway, that can classify the driveway as safe or not safe. Associating each or at least some of the driveways in the map with such a tag can provide an efficient manner for determining if the driveway can be safe or not safe to cross. That is, the determination can be done by just reading and deciphering the tag (or the information that is stored on the map for classifying the driveways as safe or not safe). For example, the information can be a data structure stored within the data of the map in a memory that the mobile robot can have access to. In a simple example, the tag can be an information bit that can indicate to the mobile robot whether the driveway associated with the bit can be safe or not safe for autonomous road crossing. The mobile robot can read such a tag (or data structure, or bit) and can decipher such a tag to determine if the driveway can be safe to cross automatically and autonomously or not (for example a tag bit with a value 1 can indicate that a driveway is safe to cross automatically and autonomously and a tag bit with a value 0 can indicate a driveway that is not safe to cross automatically and autonomously).

In some embodiments, information related to whether a driveway can be safe to cross automatically and autonomously can be added manually to the map by an operator. That is, the information that can be comprised in a map that the mobile robot can access, said information configured to indicate whether a driveway can be safe or not safe for automatic and autonomous road crossing, can be added to the map or to a memory that the mobile robot can access by a human operator. This can be advantageous, as the classification of the driveway as safe or not safe to cross automatically and autonomously can be done or refined by a human operator. That is, the decision-making capabilities of the human operator may facilitate the process of classifying the driveways as safe or not safe to cross automatically and autonomously, which may result in a more accurate classification.

In some embodiments, information related to whether a driveway can be safe to cross automatically and autonomously can be added to the map on a robot run. That is, the mobile robot can travel from a first location, such as the starting point, to a second location, such as the destination. Such a travelling can also be referred to as a robot run. During the travelling (i.e. the robot run) the mobile robot may be required to cross a driveway. A determination whether the driveway can be safe to cross automatically and autonomously can be done by the mobile robot, or a human operator or both the mobile robot and the human operator. Based on the determination, the driveway can be marked or tagged as safe and not safe. Such information can be stored in a memory, such as within the data of a map that the mobile robot (or data processing device) can access, for further use. When the mobile robot can be required to cross the same driveway, it can use a previous determination for the public road to determine whether the driveway can be safe to cross automatically and autonomously. This can provide an efficient manner of determining if a driveway can be safe as the mobile robot and/or the human operator do not have to take such a decision every time they cross a driveway. If the decision can be taken once, then it can be used in future crossing of the driveway.

In some embodiments, the road crossing can be determined as operator-based road crossing if the driveway can be determined as not safe to cross automatically and autonomously. That is, the mobile robot can be required to cross a driveway. Further, the driveway can be determined as safe or not safe to cross automatically and autonomously.

If the driveway can be determined as not safe for automatic and autonomous road crossing the road crossing can be performed operator-based. That is, a human operator can assist the mobile robot for crossing driveways that cannot be safe for automatic and autonomous road crossing. The assistance of the mobile robot by the human operator can comprise the human operator deciding when the road crossing should initiate and transmitting such an information to the mobile robot. That is, the human operator can see the driveway either directly by being on the scene or by live video streaming provided by the mobile robot and can decide when to start the road crossing. For example, the human operator can determine if there is any vehicle or other traffic participants on the driveway. Additionally, or alternatively, the human operator can control the mobile robot driving while crossing the driveway. For example, the human operator can decide (and communicate to the robot) when the robot can accelerate, decelerate, turn left, turn right. The human operator assisting the mobile robot during the crossing of not safe driveways can be advantageous as it can increase the safety of the other traffic participants and mobile robot. Usually, driveways classified as not safe for automatic and autonomous road crossing can impose a higher level of difficulty and can be more dangerous to cross. Thus, assistance from a human operator in such cases can be advantageous as it can allow for a more secure driveway crossing.

In a second embodiment, a data processing device configured to execute the method disclosed in the first embodiment is disclosed. The data processing device can be a system-on-chip that can be programmable or configured to execute a program. That is, according to the method disclosed in the first embodiment, a program (set of instructions, source code) can be implemented using a programming language. The program can be executed by the data processing device, e.g. the data processing device can read and/or decode the instructions comprised in the program and perform respective actions as instructed by the instructions. The data processing device can comprise a processor or a microcontroller for performing calculations and a memory for storing the program, or part of the program. The data processing device can be advantageous as it can allow for a fast execution of the method. It can also be more efficient to analyze data, particularly large amounts of data, such as sensor data, using the data processing device. The data processing device executing the method can be comprised by the mobile robot or can be communicatively connected to the mobile robot. The data processing device configured to execute the method of the first embodiment can allow for an autonomous execution of the method (i.e. without human intervention).

In some embodiments, the data processing device can be configured to access information on a map for determining whether a road can be classified as a public road or a driveway. That is, in some embodiments, a map comprising information regarding the classification of a road as a public road or driveway may be provided. For example, in such a map the roads may be associated with a tag that indicates the type of the road: public road or driveway. The tag, for example, may be constructed as a data structure or a single bit of information. The data processing device can be configured to access such information or tag or data structure or bit. It can further decode the information for determining type of the road. This can be particularly advantage as it may result in a fast determination of the type of the road (i.e. the time required to access the memory location wherein the information can be stored, the time to decipher the information and the time to output the result).

In some embodiments, the data processing device can be configured to evaluate topology parameters of the road for determining whether a road can be classified as a public road or a driveway. That is, the data processing device may be provided with an input comprising at least one topology parameter. The topology parameters may be created by the sensors, such as cameras, or may be found on a map. The data processing device may analyze such parameters to determine the type of the road. For example, this can be achieved through a set of conditional statements, often referred as if . . . else statements, wherein the parameters are compared with threshold values to produce a result. Thus, different combinations of the parameter values (relative to the respective threshold) may produce different results and may represent different real-world scenarios. For example, sensor data, e.g. from a camera, may provide topology parameters such as the existence of traffic signs, and/or lanes and/or length of road. If number of traffic lights, for example, is higher than 0 (0 being the threshold in this example) the data processing device can determine that the road can be a public road. Otherwise it may continue comparing other parameters or can determine the road to be a driveway.

In some embodiments, the data processing device can be configured to access information on a map to determine if a road can be classified as a safe road to cross automatically and autonomously. That is, in some embodiments, a map comprising information regarding the classification of a public road as safe or not safe for automatic and autonomous road crossing may be provided. For example, in such a map the public roads may be associated with a tag that indicates the type of the public road: safe or not safe. The tag, for example, may be constructed as a data structure or a single bit of information. The data processing device can be configured to access such information or tag or data structure or bit. It can further decode the information for determining the type of the public road. This can be particularly advantageous as it may result in a fast determination of the type of the public road (i.e. the time required to access the memory location wherein the information can be stored, the time to decipher the information and the time to output the result).

In some embodiments, the data processing device can be configured to evaluate at least one of the parameters related to speed limits, traffic density, number of lanes and accident statistics to determine if a road can be classified as a safe road to cross automatically and autonomously. That is, the data processing device may be provided with an input comprising at least one of such parameters. The parameters may be created by the sensors, such as cameras, or may be found on a map or may be stored in a memory location that can be accessed by the data processing device. The data processing device may analyze such parameters to determine the type of the public road (i.e. safe or not safe for automatic and autonomous road crossing). For example, this can be achieved through a set of conditional statements, often referred as if . . . else statements, wherein the parameters are compared with threshold values to produce a result. Thus, different combinations of the parameter values (relative to the respective threshold) may produce different results and may represent different real-world scenarios.

In some embodiments, the data processing device can be configured for localization. The data processing device may use sensor data from at least one sensor such as GPS, gyroscope, odometer, cameras to determine the location of the place where such data were produced by the sensors. In some embodiments, the data processing device may localize by means of localization algorithm described in WO 2017/076929 A1.

In some embodiments, the data processing device can be configured to process an image for detecting any of the presence and position of at least one road on the image. That is, an image may be provided to the data processing device. The image may be captured, for example, by the cameras of a mobile robot. The data processing device can analyze such images to detect at least one road on the image. For example, the data processing device may execute a pattern recognition algorithm, wherein patterns on the image that are similar to a road are looked for (e.g. two lines with similar curvature and a specific distance from each-other). Detecting the presence and the position of at least one road on the image, may facilitate the execution of the method of the first embodiment. For example, presence of a road may indicate the data processing device to initiate the execution of the method. Furthermore, the detection of the presence and the position of at least one road on the image may facilitate the localization features of the data processing device.

In some embodiments, the data processing device can be configured to process an image for detecting any of the presence and position of at least one car, such as a parked car, on the image. That is, an image may be provided to the data processing device. The image may be captured, for example, by the cameras of a mobile robot. The data processing device can analyze such images to detect at least one car, such as a parked car, on the image. For example, the data processing device may execute a pattern recognition algorithm, wherein patterns on the image that are similar to a car are looked for. Detecting the presence and the position of at least one car, such as parked cars, on the image, may facilitate the execution of the method of the first embodiment. For example, it may allow the detection of roadside parked cars, facilitating the determination of whether there exists an occluding obstacle that can occlude the vision of the mobile robot to the road. Or, it may facilitate the road crossing by detecting cars driving on the road. Furthermore, detecting cars on an image may facilitate the detection of parked cars on a driveway.

In some embodiments, the data processing device can be configured to perform a pattern recognition algorithm on an image. This can be advantageous, as it can allow the data processing device to detect patterns on an image. For example, the data processing device can be configured to detect the presence of a road on an image. Additionally or alternatively, the data processing device can be configured to detect the presence of a vehicle on an image or an occluding obstacle. Thus, the data processing device configured to perform pattern recognition algorithms can facilitate the execution of the method according to the first embodiment, by detecting presence of a road and/or vehicle and/or occluding obstacle on an image.

In some embodiments, the data processing device can be configured to detect on an image an occluding obstacle that can obstruct the view of a part of the road by the camera that took the image, and to determine whether the part corresponding to the obstructed view exceeds a threshold. In some embodiments, the data processing device can be configured to detect the size of the detected occluding obstacle. That is, the data processing device can detect on an image an occluding obstacle, such as a parked car, a tree, a traffic sign, a building, a traffic participant, a group of traffic participants. The occluding obstacle may be present between the camera that captured the image and the road, thus part of the view of the camera to the road can be obstructed. Furthermore, the data processing device can determine the size of the obstructed view and/or the occluding obstacle and/or whether the size exceeds a threshold or not. This can be particularly advantageous as it can facilitate the method of the first embodiment, by determining whether an occluding obstacle exceeding a threshold value can be present.

In some embodiments, the data processing device can be configured to execute a moving object detection algorithm. This can be advantageous when, for example, a mobile robot can be crossing roads. The detection of moving cars on the road by the data processing device can provide information to the mobile robot (or to the operator of the mobile robot) whether the road can be free or whether there can be cars moving on the road. This information can facilitate the mobile robot's (or operator's) decision to whether the mobile robot should cross the road or not. Thus, safety of crossing a road can be increased by the data processing device executing a moving object algorithm.

In some embodiments, the moving object detection algorithm can be performed on at least two images and wherein preferably a time delay exists between the at least two images, such as at most 10 seconds, preferably at most 5 second, such as at most 3 seconds. This can be advantageous, as it can facilitate the detection of moving objects on an image. For example, the position of an object on the first and second image may be determined. Then, the positions can be compared. If the positions are different, this can indicate that the object can be moving. The number of images and the time delay between the images can be adjusted. A smaller time delay between the images and a higher number of images may provide more accurate results.

In some embodiments, the data processing device can be configured to detect a moving car on a road, such a moving car on a driveway. This can be advantageous when, for example, a mobile robot can be crossing the driveway. The detection of moving cars on the driveway by the data processing device can provide information to the mobile robot (or to the operator of the mobile robot) whether the road can be free or whether there can be cars moving on the driveway. This information can facilitate the mobile robot's (or operator's) decision to whether the mobile robot can cross the driveway or not. Thus, safety of crossing a driveway can be increased by the data processing device executing a moving object algorithm.

In some embodiments, the data processing device can be configured to execute a sound recognition algorithm. Thus, the data processing device can provide information regarding the presence of particular sound on an environment. This can be advantageous as it can provide more insight into the environment.

In some embodiments, the data processing device can recognize the sound of a turned-on car. That is, the data processing device may use the pattern recognition algorithm to detect the presence of the sound produced by a car being turned-on, e.g., the sound produced by the engine of the car. The sound detection can be used to infer the presence of a turned-on car and/or a car that is moving or is about to move in the environment. Thus, the method of determining for automatic and autonomous road crossing or operator-based road crossing can be facilitated.

In some embodiments, the data processing device can be part of a mobile robot. That is, the data processing device is embedded in the robot. For example, the data processing device can be part of the main chip controlling the mobile robot. This can be advantageous as the data processing device can receive input data, such as sensor data, from the mobile robot, can execute the method for the mobile robot, and provide the results to the mobile robot. That is, the data processing device can determine whether the mobile robot can cross the road automatically and autonomously or operator-based. Furthermore, integrating or embedding the data processing device in the mobile robot can be advantageous as it can provide easier manners for the communication between them, e.g. the controllers of the robot and the data processing device can be implemented on the same chip or board of the mobile robot.

In some embodiments, the data processing device can be configured for communicating with a mobile robot. In some embodiments, the data processing device can be part of a mobile robot. That is, the data processing device is embedded in the robot. For example, the data processing device can be part of the main chip controlling the mobile robot. This can be advantageous as the data processing device can receive input data, such as sensor data, from the mobile robot, can execute the method for the mobile robot, and provide the results to the mobile robot. That is, the data processing device can determine whether the mobile robot can cross the road automatically and autonomously or operator-based. In such embodiments, a communication between the mobile robot and the data processing device needs to be established. The data processing device may not be integrated in the mobile robot but can be distal to the mobile robot. It can be advantageous not integrating the data processing device in the mobile robot, particularly in cases when either the data processing device or the mobile robot comprise complex architectures that make it difficult for integration.

In a third embodiment a system configured to perform the method according to the first embodiment is disclosed. The system comprises a mobile robot. Thus, the present technology provides a system comprising a mobile robot, that is configured to determine whether a mobile robot crosses a road automatically and autonomously (i.e. without the control of a human operator) or in an operator-based manner (i.e. the mobile robot requests assistance for crossing the road, e.g. from a human operator or operator terminal).

That is, a mobile robot may travel outside, e.g. on sidewalks from an origin location to a destination location. The mobile robot can be configured to drive autonomously (i.e. without a human operator controlling it) or partially autonomously (i.e. with a human operator controlling it during part of travelling time). During the travel, the mobile robot may be required to cross roads. Crossing roads generally can impose a more dangerous scenario, since traffic participants moving on roads usually can be faster than the traffic participants on the sidewalks. In some instances, the mobile robot may require assistance from an operator, such as a human operator (operator-based road crossing can be performed) or in some other instance the mobile robot may cross the road automatically (i.e. the mobile robot determines when to cross the road) and autonomously (i.e. the mobile robot drives autonomously while crossing the road). To put it simply, a decision can be made for each (or at least some) of the road crossings whether it can be automatic and autonomous or operator-based. Thus, the present technology may be advantageous as it provides a system configured to perform the method disclosed in the first embodiment for taking such a decision, that is, determining whether a mobile robot road crossing can be performed automatically and autonomously by the mobile robot or operator-based. In other words, instead of having a human operator evaluating the situation on a road crossing and then taking decisions regarding the road crossing procedure, the present technology allows for the system comprising the mobile robot to determine how the road crossing will be performed (automatically and autonomously or operator-based).

In some embodiments, the mobile robot can comprise a data processing device according to the second embodiment. As discussed, the data processing device is configured for executing the method of the first embodiment. The data processing device can be integrated in the mobile robot, for example, can be part of the controllers of the mobile robot. The data processing device can be communicatively connected to the mobile robot. The mobile robot can use the data processing device for the execution of the method disclosed in the first embodiment, particularly when crossing roads. That is, the mobile robot, using the data processing device, can determine whether to perform the road crossing automatically and autonomously or operator based. Thus, the data processing device can be advantageous as it can provide a manner of executing the method. For example, the data processing device can provide to the mobile robot the necessary hardware and/or software and/or computing power for executing the method. In another embodiment, the data processing device can be advantageous as it may be optimized for executing the method disclosed in the first embodiment, thus providing an efficient (e.g. fast) execution of the method.

In some embodiments, the mobile robot can comprise at least one camera for capturing an image of the surroundings of the robot. In some of such embodiments, the mobile robot can comprise any of stereo cameras, time-of-flight (TOF) cameras and/or ultrasonic cameras. The cameras can provide to the mobile robot visual data from the surrounding of the mobile robot. To put it simply, the mobile robot can use the cameras to "see" the surrounding environment, that is they provide vision to the mobile robot. Furthermore, the images can be processed by the mobile robot (e.g. by the data processing device) for gaining insights on the surrounding environment. For example, the presence of a road or road crossing near the mobile robot or ahead of the mobile robot can be detected by analyzing the images captured by the cameras. In another example, an occluding obstacle, such as a car parked on the roadside, occluding the mobile robot's vision to the road can be detected by analyzing images captured on the direction where the road is. In yet another example, images captured by the cameras near a driveway can be processed for detecting the presence of a car on the driveway. A pattern recognition algorithm (e.g. based on neural networks) may be used for detecting different patterns on an image (e.g. roads, vehicles, obstacles). Furthermore, the cameras may facilitate the navigation and/or localization of the mobile robot (e.g. visual navigation and localization algorithms can be used). Thus, cameras can be advantageous as they provide visual data of the surroundings of the mobile robot to the mobile robot. The visual data can facilitate the execution of the method and/or the localization and navigation of the mobile robot.

In some embodiments, the mobile robot can have access to a map. The map can comprise information regarding the position of any of roads, buildings, sidewalks in an environment. Thus, the map can facilitate the mobile robot's navigation and localization. The map can also comprise further information, such as classification of roads, in public roads or driveways, or the classification of roads as safe or not safe for automatic and autonomous road crossing. Thus, information comprised on the map can facilitate the determination of the type of the road and whether it is safe to cross automatically and autonomously.

In some embodiments, the mobile robot can comprise at least one of at least one GPS sensor, at least one dead-reckoning sensor, at least one accelerometer, at least one gyroscope, at least one time of flight camera, at least one Lidar sensor, at least one odometer, at least one magnetometer, and at least one altitude sensor. The sensors can provide sensor data comprising information regarding the surrounding of the mobile robot. The sensors can facilitate the mobile robot's navigation and localization.

In some embodiments, the mobile robot is a land-based robot. For example, the mobile robot can be a delivery robot configured to transport deliveries from a first location, such as a store, to a destination, such as the customer, or house of the customer. Such robots can be configured to drive autonomously (i.e. without human operator assistance) or partly-autonomously (i.e. with the human operator assisting only during part of travel). Since such robots may need to cross roads during their travelling, it can be advantageous for them to comprise a manner of determining whether to cross a road automatically and autonomously or operator-based. Thus, it can be advantageous for land-based mobile robots, such as delivery robots, to be configured for performing the method of the first embodiment.

In some embodiments, the mobile robot can be configured not to travel with a speed exceeding 10 km/h. The mobile robot can be configured to drive generally on sidewalks. Thus, it can be safely for the mobile robot and other traffic participants that the mobile robot drives with low speed, such as not exceeding 10 km/h.

In some embodiments, the mobile robot can be an autonomous or partly autonomous robot. That is, the mobile robot can be configured to drive autonomously without any assistance from an operator, such as human operator. For example, the mobile robot, among others, can be configured to localize itself, to navigate (i.e. find routes) and to control its driving, such that, the mobile robot can travel from a first location to a second location. However, in some instances, it can be more difficult for the mobile robot to drive autonomously. For safety reasons, it can be advantageous to configure the mobile robot to drive partly autonomously. That is, in some parts of the travelling the robot can drive autonomously and in some other parts of the travelling the robot can be assisted by an operator, such as a human operator. For example, the mobile robot can be configured to drive autonomously on sidewalks and can cross autonomously some road crossings, however, while some road crossings (or instances) that can be more dangerous the mobile robot can be assisted by an operator.

In some embodiments, the system further comprises an operator terminal. Such an operator terminal may allow a (human) operator to receive data from the mobile robot and to instruct the mobile robot. Thus, the mobile robot may be controlled remotely in some instances.

In some embodiments, the mobile robot can comprise a communication device configured to send data to and receive data from the operator terminal. The communication device can be advantageous as it can allow the mobile robot to send data to an operator terminal, particularly for requiring assistance for the road crossing, when the road crossing is determined for operator-based road crossing. The communication device can also be advantageous as it can allow the mobile robot to receive data from the operator terminal, such as instructions for the road crossing particularly when the road crossing is determined for operator-based road crossing.

In some embodiments, the robot can be configured to send a message to the operator terminal for requiring assistance for the road crossing. That is, the mobile robot can use the communication device for sending data to the operator terminal, wherein the data can comprise a message indicating that the robot requires assistance for the road crossing. It can be particularly advantageous, when the mobile robot approached a road crossing and the road crossing is determined for operator-based road crossing (i.e. the mobile robot cannot cross the road automatically and autonomously). In order to cross the road, the mobile robot needs assistance from an operator terminal or human operator. Thus, the mobile robot can require for such assistance using the communication device for communicating a message to the operator terminal.

In some embodiments, the mobile robot can be configured to send sensor data, such as images, to the operator terminal. That is, the mobile robot can use the communication device for sending data to the operator terminal, wherein the data can comprise sensor data. The sensor data may have been obtained by the sensors of the mobile robot, such as the cameras of the mobile robot. It can be particularly advantageous to send sensor data to the operator terminal, when the mobile robot can approach a road crossing and the road crossing is determined for operator-based road crossing (i.e. the mobile robot cannot cross the road automatically and autonomously). Thus, the sensor data can provide to the operator terminal (or a human operator controlling the operator terminal) information regarding the surroundings of the mobile robot.

In some embodiments, the operator terminal can be a computer.

In some embodiments, the operator terminal can be configured to send data to and receive data from the mobile robot. That is, a bidirectional communication link can be established between the mobile robot and the operator terminal. The communication link can allow the mobile robot and the operator terminal to send and receive data from each-other.

In some embodiments, the operator terminal can be operated by a human operator. In some embodiments, the human operator can operate the operator terminal to send instructions to the mobile robot. The human operator, through the operator terminal, can receive data from the mobile robot, such as, a message requiring for assistance for road crossing and/or sensor data (e.g. images). Upon receiving such data, the human operator can assist the mobile robot for the road crossing through the operator terminal. The human operator can operate the operator terminal for viewing data sent by the mobile robot (e.g. images, live images or videos) and can send instruction to the mobile robot such as: cross the road, cross the road after 3 (or any number of) seconds, move forwards, accelerate, move backward, decelerate, turn left, turn right, angle of turning left or right, speed, traveling distance or other control data. This can be advantageous, as it can allow a human operator to assist the mobile robot while crossing roads, particularly while crossing roads determined for operator-based crossing. Road-crossings determined for operator-based road crossing may impose more danger and cannot be crossed automatically and autonomously by the mobile robot. Thus, it can be safe if such road crossings are performed with the assistance of a human operator.

In some embodiments, the operator terminal can comprise an operator interface device, such as mouse, keyboard, joystick, touch panel, microphone, camera. The operator interface device can facilitate the operation of the operator terminal by the human operator. Thus, it can be easier for the human operator to send instructions to the mobile robot.

In some embodiments, instructions sent from the human operator to the mobile robot through the operator terminal can indicate to the mobile robot to cross the road. That is, the human operator determines the time when the mobile robot can cross the road. For example, the human operator can observe a traffic light or the state of the road and can thus determined when it can be safe for the mobile robot to cross the road. When the mobile robot receives such a message it can initiate crossing the road. In some embodiments, the robot can receive the instruction indicating to cross the road and can cross the road autonomously without the operator controlling it. That is, in such embodiments, the human operator can only trigger the road crossing and the crossing of the road is performed autonomously by the mobile robot.

In some embodiments, instructions sent from the human operator to the mobile robot through the operator terminal can indicate to the mobile robot to perform at least one of accelerate, decelerate, turn left, turn right, and go backwards. That is, the human operator can send data to the mobile robot that can control the mobile robot driving. For example, the human operator can set the speed and/or direction of movement of the mobile robot. In some embodiments, the mobile robot can receive the instructions and the crossing of the road by the mobile robot can be manually controlled by the human operator.

In some embodiments, the mobile robot can be configured to determine if a road is a public road or a driveway. The distinction between public roads and driveways can be advantageous for determining whether the road crossing can be performed automatically and autonomously or operator based. Usually public roads and driveways can provide different scenarios and different aspects that need to be addressed before determining for the type of the road crossing. For example, it can be often the case that public roads comprise more lanes, heavier traffic and cars can move faster compared to driveways. Furthermore, usually occluding obstacles can be present in the roadsides of public roads that can obstruct the view of the mobile robot to the road. Driveways, on the other hand, can comprise fewer lane (usually one lane), very little traffic (it is usually used by one or two vehicles) and cars can move very slowly as they may have just started moving or they are about to enter a public road. However, it can be often the case that vehicles can be parked on the driveway and they may start moving after the mobile robot detects them as being stationary and can start crossing the road, thus, obstructing the vehicles trajectory of movement. Thus, it can be advantageous that the public roads and driveways can be distinguished from one another and addressed differently. This can provide a more efficient manner for accurately determining whether assistance can be required from an operator for crossing the road or whether it can be performed automatically and autonomously, as the method can adapt to the type of road, i.e. can address the public road and the driveways in different manners that can be optimized for the respective type of the road. Additionally or alternatively, determining whether the road to be crossed can be a public road or a driveway can be advantageous as it can provide a faster algorithm for determining how the road crossing can be performed. For example, detecting that the road to be crossed is a public road allows for neglecting aspects related to driveway crossing, thus, considering only aspects regarding public road crossing which may provide a faster manner of determining whether the road crossing can be performed automatically and autonomously or operator-based.

In some embodiments, the mobile robot can be configured to detect if a road is a public road or a driveway.

In some embodiments, the mobile robot can be configured to classify a public road as safe for automatic and autonomous road crossing or not safe for automatic and autonomous road crossing. That is, a distinction can be made between public roads that can be safe to cross automatically and autonomously and public roads that cannot be safe to cross automatically and autonomously. Such a distinction can be made based on the level of difficulty they impose on crossing the road. For example, a road with 4 lanes, 80 km/h speed limit, and with a heavy traffic may be more difficult to cross than a single lane road with a maximum speed limit of 30 km/h. Thus, a distinction between public roads that are safe to cross automatically and autonomously and public roads that are not safe can be made and can provide a more efficient manner for determining for autonomous and automatic road crossing or for operator-based. The classification of the public roads as safe or not safe for automatic and autonomous road crossing can be advantageous as it can allow the method to adapt to the respective type of the road. That is, the method can consider different aspects for each of the public road types, that are suitable for the respective public road type. For example, the efficiency of the method can be increased by determining for operator-based road crossing whenever the road to be crossed is classified as an "unsafe" road crossing (i.e. the road is not safe for automatic and autonomous crossing), thus skipping further checks that most probably can result in the decision of operator-based road crossing. Furthermore, such a classification can be advantageous as it can increase the safety of the traffic participants and mobile robot. By classifying the roads that can impose a more dangerous scenario for crossing as not safe for automatic and autonomous crossing, extra attention can be paid by either the mobile robot or the operator for crossing the roads which can reduce the number of accidents that can happen.

In some embodiments, the mobile robot is configured to request assistance for crossing a public road that is classified as not safe for automatic and autonomous road crossing. That is, a public road can be classified as safe or not safe to cross automatically and autonomously. Such a classification can be done in various manners. In some embodiments, information regarding the classification of a public road as safe or not safe to cross automatically and autonomously can be stored on a map either manually by a human operator or by the mobile robot or a combination of both the human operator and the mobile robot. A public road can be classified as safe and not safe based on different characteristics of the road such as number of lanes, speed limits, amount of traffic, accident statistics and/or position of the public road. In some embodiments, if a road is determined as not safe to cross automatically and autonomously the road crossing can be determined as operator-based. That is, a human operator can assist the mobile robot for crossing public roads that cannot be safe for automatic and autonomous road crossing. The assistance of the mobile robot by the human operator can comprise the human operator deciding when the road crossing can initiate and transmitting such information to the mobile robot. That is, the human operator can see the public road either directly by being on the scene or by live video streaming provided by the mobile robot and can determine when to start the road crossing. For example, the human operator can check the traffic light and/or if there are any vehicles or other traffic participants approaching the road crossing. Additionally or alternatively, the human operator can control the mobile robot driving, while crossing the road. For example, the human operator can decide (and communicate to the robot) when the robot should accelerate, decelerate, turn left, turn right, move backward.

An operator, such as a human operator, assisting the mobile robot during the crossing of not safe public roads can be advantageous as it can increase the safety of the traffic participants and mobile robot. Usually, roads classified as not safe for automatic and autonomous road crossing can impose a higher level of difficulty and can be more dangerous to cross. For example, they can comprise fast moving cars or can comprise many lanes and thus cannot be crossed quickly. Thus, assistance from a human operator in such cases can be advantageous as it can allow for a more secure road crossing.

In some embodiments, the mobile robot can be configured to detect occluding obstacles, such as cars, that obstruct the view of the robot's view to the road. Occluding obstacles can be obstacles such as parked cars on the roadsides, trees, traffic signs, buildings, traffic participants that can be positioned between the mobile robot and the road, thus occluding the mobile robot's vision to the road or part of the road. It can be advantageous for the mobile robot to "see" the road, or a substantial part of the road, for determining to cross the road automatically and autonomously or operator-based. For example, the information whether there can be a car driving on the road can facilitate the determination of how to cross the road. However, there can be present occluding obstacles, that can occlude part of the robot's vision, to the road. Due to occluding obstacles, the mobile robot cannot observe the true state (e.g. presence of a driving car) of the road, or part of the road. Thus, it can be advantageous to determine whether there are any occluding obstacles occluding the vision of the mobile robot to the road. It can allow the mobile robot to determine whether it can observe the true state of the road (i.e. no obstacles are present) or whether its view to the road is occluded. Such determination can be advantageous as it can increase safety. For example, it can reduce or eliminate the error of inferring that there are no moving cars on the road when there can actually be moving cars on the road. Such an error can be mostly caused because the view of the mobile robot to the road can be obstructed.

In some embodiments, the mobile robot can be configured to request assistance from the operator for crossing the road if the robot's view to the road is obstructed. That is, if an obstacle exceeding a certain threshold value is present, it may not allow the mobile robot to "see" part of the road. Thus, it may not be completely safe for the mobile robot to cross the road automatically and autonomously. As a result, it may be advantageous for safety reasons, to perform an operator-based road crossing when there exist occluding obstacles occluding the vision of the mobile robot to the road and the size of the occluding obstacle exceeds a certain threshold.

In some embodiments, the mobile robot can cross the road automatically and autonomously if a public road is classified as safe for automatic and autonomous road crossing and no occluding obstacles, such as cars parked on the roadside, obstruct the vision of the mobile robot to the road.

In some embodiments, the mobile robot can cross the road automatically and autonomously if a public road is classified as safe for automatic and autonomous road crossing and an obstacle with a size below a threshold is detected.

That is, a mobile robot may be required to cross a public road. The mobile robot can cross the road automatically and autonomously, i.e. without human assistance, or operator-based, i.e. with human assistance. Further, the public road can be a safe road for automatic and autonomous road crossing, i.e. imposes a low level of difficulty for crossing the road and in some cases, can be crossed automatically and autonomously, or the public road can be an "unsafe" road, i.e. imposes a high level of difficulty for crossing the road and cannot be crossed automatically and autonomously. Furthermore, occluding obstacles that can occlude the vision of the mobile robot to the road can be detected. In such embodiments, the mobile robot performs the road crossing automatically and autonomously if the public road that needs to be crossed can be classified as safe and if there are no occluding obstacles that obstruct the vision of the mobile robot to the road.

In such scenarios, wherein the road is classified as safe and the vision of the mobile robot to the road is not obstructed, it can be advantageous to cross the road automatically and autonomously for various reasons. Firstly, the road is classified as safe, thus imposes a lower level of difficulty for being crossed, e.g. cars drive with low speed (e.g. 0-30 km/h), the road comprises few lanes (e.g. 1-2 lanes), statistics indicate a low number of accidents. Thus, one can infer that the road fulfills several safety standards.

Secondly, the mobile's robot vision to the road is not occluded, thus the robot can gain the full state of the road, e.g. are there any cars moving on the road. Thus, it can be more efficient (as there is no need for human intervention) and at the same time safe (as the road is classified as safe and the robot has a full view to the road) to cross the road automatically and autonomously.

In some embodiments, the mobile robot can be configured to detect the presence of a car in a driveway. That is, in some embodiments, the mobile robot can determine the type of the road to be crossed. If it is determined that the road to be crossed is a driveway, further the presence or absence of a car in a driveway can be determined. To do that, the robot may capture an image and perform a pattern recognition algorithm (e.g. based on neural networks) on the image. It may be advantageous to check if there is a car parked in the driveway as usually there are no cars parked on the driveway and thus the driveway cross can be performed automatically and autonomously. On the other hand, if a car is parked on the driveway it may not be safe for the mobile robot to cross the driveway automatically and autonomously as the car may start moving while the robot is crossing the driveway. Thus, it can be advantageous for the mobile robot to "know" whether there is a car parked on the driveway or not.

In some embodiments, the robot can cross the road automatically and autonomously when no car is detected on the driveway. Since no car can be detected in the driveway, there cannot be any car present on the driveway, meaning that the mobile robot cannot obstruct the trajectory of movement of any car while crossing the driveway. This can impose an easy scenario for the mobile robot and thus the mobile robot can safely cross the road automatically and autonomously. Thus, the autonomous level of the mobile robot can be increased (i.e. the time the mobile robot drives autonomously can be increased) and also the need for operator assistance can be reduced. While otherwise the operator would assist the mobile robot to cross driveways even when no cars are present on the driveway, in such embodiments the mobile robot can cross the driveway without human assistance when no cars are present on the driveway.

In some embodiments, the robot can comprise a moving object detector configured to detect if a car is moving or not. The moving object detector can be configured to determine movements of a target, such as a car parked on the driveway. Thus, the moving object detector can be advantageous as it can allow the mobile robot to know if a target, such as a car, can be stationary or moving.

In some embodiments, the robot can cross the driveway automatically and autonomously if the car is detected as stationary. That is, the mobile robot can detect the presence of a car in a driveway, e.g. using a pattern recognition algorithm on an image taken at the driveway. The presence of the car on the driveway may make it not completely safe for the mobile robot to cross the driveway automatically and autonomously, e.g. the car can be moving on the driveway and thus the robot can obstruct the car's trajectory. However, if the car is stationary, e.g. it is parked on the driveway and it is not about to start moving, then the road can be crossed without any danger. Thus, in such embodiments wherein the robot detects the car as stationary the robot can cross the driveway automatically and autonomously.

In some embodiments, the robot can be configured to detect the sound of the car when the car is turned on. In some embodiments, the robot can cross the road automatically and autonomously if it does not detect the sound of a car. The robot can be configured to detect the sound produced while a car is turned-on, such as the sound of the engine of the car. Logically, a car that is turned-on is expected to start moving. In contrary, if a car is turned-off it can be unlikely that the car will start moving, at least in the subsequent moments while the robot crosses the driveway. Thus, if the robot cannot detect any car sound, such as engine sound, the mobile robot can infer the absence of the car on the driveway or the car is stationary, and thus can automatically and autonomously cross the road. This can increase the autonomous level of the mobile robot (i.e. the time the mobile robot can drive autonomously can be increase) and also the need for operator assistance can be reduced. While otherwise the operator would assist the mobile robot to cross driveways when a car can be present on the driveway, in such embodiments the mobile robot can cross the driveway without human assistance even if the car can be present on the driveway but no car sound can be detected (i.e. the car can be determined to be turned-of).

In a forth embodiment, the use of the system for a mobile robot road crossing is disclosed.

In some embodiments, the use comprises delivering at least one item from a first location to at least one delivery location by the mobile robot.

That is, the mobile robot can be a delivery robot configured to transport deliveries from a first location, such as a store, to a destination, such as the customer, or house of the customer. Such robots can be configured to drive autonomously (i.e. without human operator assistance) or partly-autonomously (i.e. with the human operator assisting only during part of travel). Since such robots may need to cross roads during their travelling, it can be advantageous for them to comprise a manner of determining whether to cross a road automatically and autonomously or operator-based. Thus, the use of the system for delivering items from a first location to at least one delivery location can be advantageous. It can facilitate the automation of item delivery.

In a fifth embodiment, a method comprising indicating a mobile robot's behavior at a road crossing is disclosed. That is, this method refers to a mobile robot that is required to cross a road, i.e., the mobile robot is intended to cross the road. For example, the mobile robot may be a land based robot, configured to usually drive on sidewalks. However, in order to travel from a first location to a destination location, it may be required for the mobile robot to cross roads. The mobile robot may travel autonomously or partially autonomously. The mobile robot may perform the road crossing automatically and autonomously (i.e. without an operator assisting it during the road crossing) or operator based (i.e. an operator assists the mobile robot during the road crossing e.g. by determining if and when to cross the road and/or by controlling the mobile robot driving during the road crossing). As the road crossing usually imposes a more dangerous scenario, it can be advantageous that the mobile robot indicates when it is about to cross a road, i.e. to indicate or signal its intention for crossing the road, and/or its intention not to cross the road and/or while it is determining whether to cross the road. Thus, other traffic participants such as vehicles, pedestrians, cyclers can be indicated that the mobile robot is about to cross the road or will not cross the road or is determining whether to cross the road or not. It will be understood that this embodiment may also be combined with the first embodiment, i.e., the present technology is also directed to a method comprising both the determination of how the road is crossed (i.e., automatically and autonomously or operator-based) and the robot indicating that it will cross a road. This may further enhance safe operation of the robot.

Thus, the mobile robot can indicate a mobile robot's behavior at a road crossing, such as but not limited to: the mobile robot deciding whether to cross the road or not, the mobile robot determining to cross the road and/or crossing the road, the mobile robot determining not to cross the road and/or not crossing the road (the mobile robot is waiting). Indicating or signaling that the mobile robot is determining to cross the road can be advantageous as it can allow other traffic participants, such as the drivers, to perceive that the mobile robot has not decided yet whether to cross the road or not. Thus, the other traffic participants can focus the attention on the mobile robot and can anticipate a state change of the mobile robot motion—i.e. can anticipate the mobile robot to start moving. Indicating mobile robot's intention to cross the road can be advantageous as it can alert other traffic participants that the mobile robot will cross the road. Indicating the mobile robot's intent not to cross the road can assure other traffic participants, such as the drivers, that the mobile robot will not cross the road and thus, they do not have to wait for the mobile robot.

The mobile robot's behavior at a road crossing can be indicating using at least one of the sensory modalities, such as, visual (e.g., emitting light to signal intent), auditory (e.g., emitting sound to signal intent), kinesthetic via position and/or motion (e.g., placing the robot near the curb—i.e. the end of sidewalk towards the road, or moving the robot towards the road to signal intent).

Thus, in some embodiments of the fifth embodiment, the method can further comprise emitting sound from at least one speaker unit prior, such as 1 to 10 seconds, e.g., 1 second, 3 seconds, or 10 seconds, before crossing the road. For example, a recorded or automated speech can be played by the mobile robot to indicate that the mobile robot's behavior at a road crossing, e.g. "Crossing the road", "Waiting", "Not crossing the road", "Moving forward". Additionally or alternatively beeping sounds or alarm sounds can be used to indicate mobile robot's behavior at a road crossing In some embodiments of the fifth embodiment, the method can further comprise indicating that a mobile robot will cross a road through robot motion and/or position. For example, moving the robot toward the road can indicate the mobile robot intention to cross the road. In another example, positioning the mobile robot near the curb, i.e. near the edge wherein the sidewalk meets the street, can indicate a robot's intention to cross the road. In yet another example, positioning the mobile robot away from the curb can indicate the mobile robot's intention not to cross the road.

In some embodiments of the fifth embodiment, the method can further comprise emitting light from at least one light source prior to the mobile robot crossing the road and/or during the road crossing. Thus, the mobile robot can comprise at least one light source. The mobile robot is configured to turn on the at least one light source some moments, such as 1 to 10 seconds, e.g., 1 second, 3 seconds, or 10 seconds, before crossing the road. Thus, the mobile robot can indicate its "intention" for crossing the road before the initiation of the road crossing. This can be advantageous as it can allow traffic participants to anticipate in advance that the mobile robot is about to cross the road. It can also allow other traffic participants to predict mobile robot's trajectory of movement (i.e., one can predict that the mobile robot will traverse the road if the mobile robot indicates its intention to cross the road), thus avoiding any collision with the mobile robot. The mobile robot can additionally or alternatively be configured to turn on the at least one light emitting source while it is crossing the road. This can be advantageous as it can increase the salience of mobile robot while crossing the road and at the same time indicate the mobile robot intention of crossing the road. In such embodiments, the at least one light source can be configured to indicate the mobile robot intention for crossing the road. For example, the light source may comprise a cover which when illuminated by the light source shows a message, such as a text message, or image, or sign or any combination of those, that can indicate the mobile robot's intention to cross the road.

In some embodiments of the fifth embodiment, the method can further comprise emitting light patterns from at least one light source prior to the mobile robot crossing the road (e.g. at least 1 second, at least 3 seconds, or at least 10 seconds prior to the robot crossing the road) and/or during the road crossing. The patterns may be created by having at least one light source blink periodically or in a predetermined pattern. The patterns may be created by arranging the lights in a predetermined shape, e.g. an arrow or chevron pointing towards the front of the mobile robot that can indicate that the mobile robot is about to move in the direction pointed by the arrow. The light patterns can be advantageous as they can provide visual information configured to indicate the mobile robot's intention to cross the road. The light patterns can also be advantageous as they indicate a direction and allow the anticipation of the robot's trajectory. The light patterns can also be advantageous as they can be easily seen, particularly, in low light conditions. Moreover, light patterns, such as for example text or shapes (e.g. arrow), may provide an easy to understand signaling manner that indicates the mobile robot's intention to cross the road.

In some embodiments of the fifth embodiment, a plurality of light sources can be arranged in a single-row manner. That is, the light sources are mounted on a mounting device or on the mobile robot such that they can form a line, e.g. a straight line surrounding the robot (i.e. a straight line can pass through all of them). In general, the light sources can be arranged in an arrangement such that any of the light sources in the arrangement can comprise neighboring light sources in only two opposing sides. This can be advantageous as it allows for the creation of one dimensional shapes, such as dots or lines. For example, dots can be created by turning-on one light source and a line can be created by turning-on at least two consecutive light sources. The plurality of light sources arranged in a single-row manner can be advantageous as it can allow for the creation of one dimensional animations, such as a dot or group of dots moving in a direction as defined by the plurality of light sources arranged in a single-row manner, e.g. linear manner. For example, by turning-on the light sources in succession, the animation of a point moving in a direction can be formed. In one embodiment, the lights may be turned on and off from a back of the robot to a front of the robot. Specifically, the lights furthest from the road to be crossed are turned on first, and the lights closest to the road to be crossed are turned on later. This may provide the impression of lights "moving from back to front", and may be a particularly easy-to-understand pattern to notify other traffic participants of the mobile robot "intending" to cross a road. Moreover, the plurality of light sources arranged in a single-row manner can be advantageous as it can facilitate the manufacturing of the light sources. For example, the light sources can be produced or manufactured together as a strip of light sources.

In some embodiments of the fifth embodiment, the method can further comprise activating the light sources such that to create light animations. As discussed, the mobile robot can comprise a plurality of light sources arranged in a single-row manner. The plurality of light sources can be controlled such that to create animations of a dot (i.e. created by a turned on light source) or a line (i.e. created by a group of consecutive turned on light sources). Animations of a dot or a line can create the perception of a dot or a line respectively moving in a certain direction. In some of such embodiments, the method can further comprise activating and deactivating the light sources in succession. That is, the light sources are controlled in a consecutive manner. This can facilitate the creation of animations of a dot or a line to depict a direction. Such animations can be advantageous as they can indicate the direction of movement of the mobile robot before and/or while crossing the road. For example, the light sources arranged in a straight line can be arranged linearly in a direction from the rear of the mobile robot to the front of the mobile robot. Starting from the light sources most near to the rear of the mobile robot, activating a light source (or a group of light sources) and then deactivating them while activating the neighboring light source (or neighboring group of light sources) the perception of a dot (or a group of dots) moving from the back to the front of the mobile robot can be created. This can be advantageous as it can provide an easy-to-understand and visible signaling for indicating the mobile robot's intention to cross the road. Additionally, the animation (i.e. "the moving light dots") can facilitate the indication of the mobile robot's intention to cross the road as "the moving lights" can more easily get the attention of traffic participants.

That is, the mobile robot can comprise a plurality of light sources arranged in a single-row manner, which can also be referred as a strip of lights or light strips. The strip of lights can comprise 30-150 light sources per meter, preferably 30-60, light sources per meter. The strip of lights can be configured to display at least one one-dimensional shape, such as, dot, line or segment. Furthermore, the displayed one-dimensional shape can be animated. The animations can comprise the displayed one-dimensional shape blinking and/or moving in a certain direction along the strip of light. The strip of lights can be placed on the lateral surfaces of a mobile robot, such as, can be wrapped around the whole mobile robot or can be wrapped around three sides of the mobile robot excluding the front of the mobile robot or can be positioned on two sides of the mobile robot excluding the front side and the rear side of the mobile robot. In general, the strip of light can be positioned in at least one of the sides of the mobile robot. An animation of at least one dot, line or segment moving from the rear of the mobile robot to the front of the mobile robot can indicate a forward movement of the mobile robot. An animation of at least one dot, line or segment moving from the front of the mobile robot to the rear of the mobile robot can indicate a backward movement of the mobile robot. An animation of at least one dot, line or segment moving back-and-forth between the rear and the front of the mobile robot can indicate that the mobile robot is waiting, i.e. is stationary.

In some embodiments, the light sources may be activated and deactivated from a back of the robot to a front of the robot.

In some embodiments of the fifth embodiment, the method can further comprise dispersing a plurality of light sources in an area of the mobile robot to form therein a displaying area. That is, a plurality of light sources (e.g. 10 to 200 per meter, such as 30-144 light sources per meter, preferably 30-60 light sources per meter), can be switched on in an area of the mobile robot, e.g. on part of the body, wheels or lateral sides of the mobile robot. Thus, a displaying area can be formed on the area wherein the light sources are switched on. In some embodiments, a plurality of light sources can be arranged to form a display area comprising a plurality of parallel lines, formed by light sources arranged in a linear manner, such as 2 to 16 parallel lines, i.e. 2-16 strips of lights can be positioned parallel with each-other, such that, a density of 900 to 22500, preferably 900 to 3600 light sources per square meter can be created. That is, a plurality of light sources can be arranged in a linear manner (i.e. a straight line can pass through all of them). Further, a plurality of such lines can be formed parallel to each other. Thus, a display area, wherein light sources can be positioned in a grid manner, can be created. The display area can be advantageous as it can allow for the creation and animation of two dimensional shapes. It can facilitate the indication of mobile robot's intention to cross a road by providing easy-to-understand signaling, such as text or shapes (e.g. arrows, chevrons, cross, throbber, etc.). At the same time the displaying area may improve the visibility of the signaling that indicates the mobile robot's intention to cross the road as well as the visibility of the mobile robot.

In some of such embodiments, the method can further comprise displaying on the display area at least one of the shapes—preferably signs, such as arrows, chevrons, crosses, throbbers—and text. That is, by turning-on some of the lights on the displaying area shapes and/or text can be displayed on the displaying area. For example, the letter "I" can be displayed by turning-on a plurality of consecutive light sources that lie on a straight vertical line. In a similar manner other letters as well as shapes can be displayed on the display area. The shapes and/or text, such as, the arrow and the chevron, can be used to signal direction of movement of the mobile robot. For example, when the mobile robot can be driving forward, at least one chevron and/or arrow pointing toward the front of the mobile robot can be displayed in the displaying area. Similarly, when the mobile robot can be driving backwards, at least one chevron and/or arrow pointing toward the rear of the mobile robot can be displayed in the displaying area. Similarly, when the mobile robot can be stationary, e.g. while determining whether to cross a road or not, at least one chevron and/or arrow pointing toward the ground (i.e. downwards) can be displayed in the displaying area. For the latter scenario, alternatively or additionally a throbber can be displayed in the displaying area The method can further comprise animating the shapes (arrow, chevron, cross, throbber) and/or text displayed in the display area, such as, displaying the shapes and/or the text moving in a direction from the back of the robot to the front of the robot and/or from the back of the robot to the front of the robot. For example, the animated movement of at least one chevron sign, arrow and/or segment toward the front of the mobile robot, can indicate a forward movement of the mobile robot. Thus, when the mobile robot can be driving forward, an animation of the chevron signs, arrow and/or segment moving toward the front of the mobile robot can be displayed in the displaying area. Similarly, when the mobile robot can be driving backwards, an animation of at least one chevron sign, chevron sign, arrow and/or segment moving toward the rear of the mobile robot can be displayed in the displaying area. Similarly, when the mobile robot can be stationary, e.g. while determining whether to cross a road or not, an animation of the chevrons and/or arrows pointing and/or moving toward the ground (i.e. downwards) can be displayed in the displaying area. For the latter scenario, alternatively or additionally the animation of a rotating throbber can be displayed in the displaying area.

Displaying and/or animating different shapes and/or text on the displaying area can be advantageous as it can facilitate the indication of mobile robot's intention for crossing the road by providing visible and easy-to-understand signaling.

In some embodiments of the fifth embodiment, the method can further comprise positioning at least one light source on a body of the mobile robot. In some embodiments the method can comprise positioning at least one light source on the wheels of the mobile robot. In some embodiments the method can comprise positioning the light sources on at least one of the lateral sides of the mobile robot. In general, at least one light source can be positioned on different parts of the mobile robot, preferably on visible parts of the mobile robot that can be the body of the robot, the wheels and/or the lateral sides of the mobile robot (i.e. the front, the rear, the left and the right side). Such positions can be advantageous as they can provide a better visibility of the light sources that indicate the intention of the mobile robot to cross the road. They can also be advantageous as they can increase the visibility of the mobile robot when the mobile robot is just about to cross the road and/or while crossing the road.

In some embodiments of the fifth embodiment, the light source is a light emitting diode (LED). The use of the LEDs as light sources can be advantageous due to their power efficiency and small size. Additionally, LEDs can be easy to manufacture in strips (i.e. plurality of LEDs arranged in a linear manner) or in two dimensional areas forming display screens. LEDs can be easy to control, e.g., for creating different light patterns or animations.

In some embodiments of the fifth embodiment, the road crossing can be performed autonomously. That is, the mobile robot can be configured to drive autonomously, i.e. without an operator such as a human operator controlling its driving. In such embodiments the mobile robot can drive autonomously. Thus, it can be advantageous for safety issues, for the mobile robot to indicate its intention to cross the road.

In some embodiments of the fifth embodiment, the road crossing is performed automatically and autonomously. That is, in such embodiments the mobile robot is not assisted by an operator such as a human operator for the road crossing. The mobile robot determines itself if and when to cross the road as well as the mobile robot crosses the road autonomously. As the road crossing is performed by the mobile robot, it can be advantageous for the mobile robot to indicate its intention for crossing the road. This can allow other traffic participants to be aware for the mobile robot's decision and intention and thus can avoid colliding with the mobile robot.

In some embodiments of the fifth embodiment, the road crossing is assisted by an operator, such as a human operator. In such embodiments, the operator can be in a communicative connection with the mobile robot. The operator can determine, instead of the mobile robot, if and when to cross the road. The road crossing can then be performed autonomously by the mobile robot or the operator can assist the mobile robot during the road crossing. In some embodiments, when the operator determines that the mobile robot can cross the road, the mobile robot can indicate the intention of the mobile robot crossing the road. In other words, the operator can determine either to cross the road or not and the mobile robot can determine on its own to indicate the intention of the mobile robot road crossing. In some embodiments, the operator can determine that the mobile robot can cross the road and the operator can provide the instruction to the mobile robot to indicate the road crossing intention. In other words, in the latter embodiment, the operator can determine either to cross the road or not and either to provide indication or not.

In some embodiments, the mobile robot may indicate intent of crossing the road while the operator decides to cross the road. That is, in such embodiments the operator can determine either to cross the road or not. It can be understood that it may take some time for the operator to decide whether to cross the road or not—e.g. there is a delay between the time the operator gets notified (e.g. by the mobile robot) that a road crossing should be performed, the time the operator initiates and completes deciding whether to cross the road and the time the operator actually starts assisting or controlling the robot to cross the road (if or when decided for the road crossing). In other words, the time between the instance when the robot communicates its intent to cross the road (and the other traffic participants get notified) and the time the robot can actually start crossing the road (controlled or assisted by the operator) can be longer when the robot communicated such intent while the operator is deciding for a road crossing. If in contrary, the robot notifies its intent for road crossing when or after the operator takes the decision, the time between the robot notifying the intent and the time the robot starts to be cross the road can be shorter by at least the amount of time it can take the operator to take the decision of road crossing. Thus, it can be advantageous and safer to indicate the robot's intent to cross the road while the operator is deciding whether to cross the road, as compared to the case when the robot indicates such intent after the decision is taken or the robot does not indicate road crossing intent at all, as the other traffic participants can get notified earlier for the road crossing intent of the mobile robot. In other words, in such embodiments, the road crossing indicator is put on when the robot requests assistance from an operator (as it may be likely that the robot will cross the road after requesting such assistance). Additionally in such embodiments, the operator may turn-off the indicator in case it is not appropriate or relevant. For example, if the operator decides not to cross the road, then it may be irrelevant to indicate the intent of the mobile robot to cross the road. Hence, the operator may turn the indicator off.

The present technology also relates to a combination of the first embodiment and the fifth embodiment. That is, the present technology also relates to a method comprising the method of the first embodiment and the method of the fifth embodiment. In other words, the present technology also relates to a method which comprises a data processing device determining whether a mobile robot road crossing is performed automatically and autonomously by the mobile robot or operator-based, and which comprises indicating that the mobile robot will cross a road. It will be understood that this may further increase the overall safety of operating the robot. As discussed, the method of the fifth embodiment can be used together with the method disclosed in the first embodiment. That is, in the first embodiment a method comprising a data processing device determining whether a mobile robot road crossing can be performed automatically and autonomously by the mobile robot or operator based is disclosed. It can be advantageous that such a method of the first embodiments be used together with the method of indicating the robot's intention to cross a road as disclosed in the fifth embodiment. The mobile robot can determine the type of the road crossing using the method of the first embodiment and can indicate its intention to cross the road using the method of the fifth embodiment. Thus, in such embodiments a method for determining the type of the road crossing (i.e. operator based or automatic and autonomous) and indicating the mobile robot's intention to cross the road is disclosed.

In a sixth embodiment, a mobile robot configured to perform the method according to the fifth embodiment is disclosed. The mobile robot may be a land based robot, configured to usually drive on sidewalks. However, in order to travel from a first location to a destination location, it may be required for the mobile robot to cross roads. The mobile robot may travel autonomously or partially autonomously. The mobile robot may perform the road crossing automatically and autonomously or operator based. As the road crossing usually imposes a more dangerous scenario, it can be advantageous that the mobile robot indicates when it is about to cross a road, i.e. to indicate or signal its intention for crossing the road. Thus, other traffic participants such as vehicles, pedestrians, cyclers can be indicated that the mobile robot is about to cross the road. Thus, the mobile robot is configured to indicate when it intends to cross a road.

In some embodiments, the mobile robot can comprise at least one light source. The light source can allow the mobile robot to emit light signals when it is about to cross a road. That is, the mobile robot can emit light signals to indicate its intention for crossing the road, as discussed above. The light signals may differ in patterns, frequency, and intensity; depending on whether the robot "decides", signals "intent" to cross, increases "salience" during crossing, or "warns" of crucial situations. The light source can also be advantageous as it can increase the visibility of mobile robot before and during the road crossing, when activated.

In some embodiments, the mobile robot can comprise a plurality of light sources arranged in a single-row manner. That is, the mobile robot can comprise at least two light sources. The light sources can be arranged in a single-row, such that any light source in the arraignment can comprise neighboring light source only on two opposing sides. For example, the light sources can be arranged in a linear manner, i.e. a straight line can pass through all of them. The plurality of light sources arranged in a single-row manner can be advantageous as it can allow the creation and/or animation of one dimensional shapes that can facilitate the indication of the mobile robot's intention to cross the road.

In some embodiments, the mobile robot can comprise a plurality of light sources switched on in an area of the mobile robot to form therein a displaying area. The light sources can be switched on to form rectangular patterns, i.e. any combination of four light sources wherein a straight line can pass on at most two of them, can be vertices of a rectangle. The light sources can be switched-on randomly (i.e. in a non-determined pattern) on the display area with a constant density. The light sources can be switched-on on the display area to form shapes, such as rectangles, arrows, text. In general, the light sources can be switched-on in any manner such that the intention of the mobile robot to cross the road can be indicated. The displaying area can be advantageous as it can allow the creation and/or animation of one and/or two-dimensional shapes that can facilitate the indication of the mobile robot's intention to cross the road.

In some embodiments, the display area can comprise a plurality of parallel lines formed by light source arranged in a linear manner, such as 2 to 16 parallel lines. That is, the light sources can be arranged such that any combination of four light sources chosen such that a straight line can pass on at most two of them, form the vertices of a rectangle. This can be advantageous as it can facilitate the displaying of straight lines and/or shapes that comprise straight lines (e.g. rectangles, chevrons, or arrows).

In some embodiments, the mobile robot can comprise wheels, such as 3 to 6 wheels, wherein at least one light source is positioned on at least one wheel.

In some embodiments, the mobile robot can comprise at least one light source on at least one lateral surface of the mobile robot.

In some other embodiments the mobile robot can comprise a lid and a body, the body having a top opening that is enclosed by the lid and at least one light source that is positioned between the lid and the body.

In general, at least one light source can be positioned on different parts of the mobile robot, preferably on visible parts of the mobile robot that can be the body of the robot, the wheels and/or the lateral sides of the mobile robot (i.e. the front, the rear, the left and the right side). Such positions can be advantageous as they can provide a better visibility of the light sources that indicate the intention of the mobile robot to cross the road. They can also be advantageous as they can increase the visibility of the mobile robot when the mobile robot is just about to cross the road and/or while crossing the road.

In some embodiments, the mobile robot can comprise a controller that can be configured to control at least one light source of the mobile robot. The controller can further be configured to activate at least one light source to indicate that the mobile robot will cross a road. Additionally, or alternatively the controller can be configured to activate and deactivate at least one light source in a predetermined pattern. In some embodiments, the controller can be configured to control a plurality of light sources to display a shape, preferably a sign, such as an arrow. In some embodiments, the controller can be configured to control a plurality of light sources to create a light animation, such as lights moving from the back to the front of the mobile robot. The controller can be programmable.

That is, the mobile robot can comprise at least one light source. Further, in such embodiments, the mobile robot can comprise a controller. The controller can be connected (e.g. by wiring) with the light sources and can control the light sources (i.e. can turn them on and off). This can allow the controller to create different light patterns on one or a plurality of light sources. For example, the controller can make a light source blink with a certain frequency. The controller can combine different sequences of turning a plurality of light sources on and off to create shapes and/or animations using the light sources. In some embodiments, the controller can be programmable. Thus, a user can write a computer program using a programming language to determine different ways the controller can control the light sources. Thus, the controller controlling a plurality of light sources can be advantageous as it can provide an efficient manner of indicating the mobile robot's intention to cross a road.

In some embodiments, the light source is a light emitting diode (LED). The use of the LEDs as light sources can be advantageous due to their power efficiency and small size. Additionally, LEDs can be easy to manufacture in strips (i.e. plurality of LEDs arranged in a single-row manner) or in two dimensional areas forming display screens. LEDs can be easy to control, e.g. for creating different light patterns or animations.

In some embodiments, the mobile robot is a land-based robot.

In some embodiments, the mobile robot is a delivery robot.

In some embodiments, the mobile robot is an autonomous or partly autonomous robot. That is, the mobile robot can be configured to drive autonomously without any assistance from an operator, such as human operator. For example, the mobile robot, among others, can be configured to localize itself, to navigate (i.e. find routes) and to control its driving, such that, the mobile robot can travel from a first location to a second location. However, in some instances, it can be more difficult for the mobile robot to drive autonomously. For safety reasons, it can be advantageous to configure the mobile robot to drive partly autonomously. That is, in some parts of the travelling the robot can drive autonomously and in some other parts of the travelling the robot can be assisted by an operator, such as, a human operator. For example, the mobile robot can be configured to drive autonomously on sidewalks and can cross autonomously some road crossings, however, while some road crossings (or instances) that can be more dangerous the mobile robot can be assisted by an operator.

In some embodiments, the mobile robot is configured to perform the method according to the first embodiment. That is, in the first embodiment a method comprising a data processing device determining whether a mobile robot road crossing can be performed automatically and autonomously by the mobile robot or operator based is disclosed. It can be advantageous that the mobile robot is configured to perform the method of the first embodiment and the method of the fifth embodiment. The mobile robot can determine the type of the road crossing (i.e. operator based or automatic and autonomous) using the method disclosed in the first embodiment and can indicate its intention to cross the road using the method disclosed in the sixth embodiment.

It will be understood that the sixth embodiment may also be combined with the second embodiment. I.e., the present technology also relates to a mobile robot according to the sixth embodiment and further comprising the data processing device according to the second embodiment. Such an embodiment may provide a robot safely crossing roads, and also having an increased autonomous operation vis-à-vis robots always requiring assistance for crossing a road.

Furthermore, it should also be understood that the mobile robot of the system of the third embodiment may also have any of the features discussed in conjunction with the sixth embodiment, and that the discussed use according to the fourth embodiment may also use this system.

Generally, it should be understood that different features described for any one embodiments above (e.g., method, device, system, use) may also be used in connection with any of the other embodiments described above. E.g., the system described above may be configured to execute any of the steps described in conjunction with the method embodiment. Further, any of the features described in conjunction with the device or system may also be employed by the described method.

The present technology is also defined by the following numbered embodiments.

Below, method embodiments will be discussed. These embodiments are abbreviated by the letter M followed by a number. Whenever reference is herein made to method embodiments, these embodiments are meant.

M1. A method comprising:
a data processing device determining whether a mobile robot road crossing is performed automatically and autonomously by the mobile robot or operator-based.

M2. A method according to the preceding embodiment, wherein the method comprises sending data to an operator terminal, if the road crossing is determined for operator-based road crossing.

M3. A method according to any of the preceding embodiments, wherein the method comprises the mobile robot crossing the road automatically and autonomously, if the road crossing is determined for automatic and autonomous road crossing.

M4. A method according to the preceding embodiment, wherein the method comprises the mobile robot approaching the road to be crossed.

M5. A method according to any of the preceding method embodiments, wherein the method comprises determining whether a road is a public road or a driveway.

M6. A method according to the preceding embodiment, wherein the data processing device accesses a map and wherein the map facilitates the determination of a road as a public road or a driveway.

M7. A method according to the preceding embodiment, wherein the map that the data processing device has access to comprises information whether a road is a public road or a driveway, such as the map comprises a tag that classifies a road as public road or driveway.

M8. A method according to the preceding embodiment, wherein the tags that classify a road as a public road or a driveway are added manually by an operator.

M9. A method according to any of the preceding method embodiments and with the features of embodiment M5, wherein the determination of a road as a public road or a driveway is facilitated by the topology of the road.

M10. A method according to any of the preceding method embodiments, wherein the method comprises determining whether a public road is safe to cross automatically and autonomously.

M11. A method according to the preceding embodiment, wherein information related to whether a public road is safe to cross automatically and autonomously is stored on a map that the mobile robot has access to.

M12. A method according to the preceding embodiment, wherein information related to whether a public road is safe to cross automatically and autonomously is added manually to the map.

M13. A method according to any of the preceding embodiments and with the features of embodiment M11, wherein information related to whether a public road is safe to cross automatically and autonomously is added to the map on a robot run.

M14. A method according to any of the preceding embodiments and with the features of embodiment M10, wherein the classification of a public road as safe to cross or not safe to cross is done based on at least one of: speed limits, traffic density, number of lanes and accident statistics of the public road.

M15. A method according to the preceding embodiment and with the features of embodiment M10, wherein a public road is classified as safe to cross automatically and autonomously if it comprises at least one of the following characteristics: low maximum speed limit, light traffic, few lanes, statistics indicating a small likelihood for accidents.

M16. A method according to any of the preceding method embodiments and with the features of embodiment M10, wherein a public road is classified as not safe to cross automatically and autonomously if it comprises at least one of high maximum speed limit, heavy traffic, many lanes, statistics indicating a high likelihood for accidents.

M17. A method according to any of the preceding method embodiments and with the features of embodiment M10, wherein the road crossing is determined as operator-based road crossing if the public road is determined as not safe to cross automatically and autonomously.

M18. A method according to any of the preceding method embodiments, wherein the method further comprises determining whether there are any occluding obstacles occluding the vision of the mobile robot to the road.

M19. A method according to the preceding embodiment, wherein the determination whether there are any occluding obstacles occluding the vision of the mobile robot to a road is facilitated by the determination of the position of the mobile robot relative to the road.

M20. A method according to any of the preceding method embodiments and with the features of embodiment M18, wherein the determination whether there are any occluding obstacles occluding the vision of the mobile robot to a road is facilitated by the relative position between the mobile robot, the road and the occluding obstacle.

M21. A method according to any of the preceding method embodiments and with the features of embodiment M18, wherein a map is used for determining the relative position between the mobile robot and the road.

M22. A method according to any of the three preceding method embodiments, wherein the method comprises the mobile robot localizing itself.

M23. A method according to any of the preceding method embodiments and with the features of embodiment M18, wherein the determination whether there are any occluding obstacles occluding the vision of the mobile robot to the road is facilitated by an image of the surrounding of the mobile robot.

M24. A method according to the preceding embodiment, wherein the determination whether there are any occluding obstacles occluding the vision of the mobile robot to the road is facilitated by any of the detection and localization of the road on the image.

M25. A method according to any of the preceding two embodiments, wherein the determination whether there are any occluding obstacles occluding the vision of the mobile robot to the road is facilitated by any of the detection and localization of the obstacle on the image.

M26. A method according to any of the preceding method embodiments and with the features of embodiment M18, wherein stereo cameras are used for detecting occluding obstacles occluding the vision of the mobile robot to the road.

M27. A method according to any of the preceding method embodiments and with the features of embodiment M18, wherein time-of-flight (TOF) cameras are used for detecting occluding obstacles occluding the vision of the mobile robot to the road.

M28. A method according to any of the preceding method embodiments and with the features of embodiment M18, wherein ultrasonic cameras are used for detecting occluding obstacles occluding the vision of the mobile robot to the road.

M29. A method according to any of the preceding method embodiments and with the features of embodiment M18, wherein all the directions are searched for detecting occluding obstacles occluding the vision of the mobile robot to the road.

M30. A method according to any of the embodiments M1 to M28 and with the features of embodiment M18, wherein only the directions towards roads surrounding the mobile robot are searched for detecting occluding obstacles occluding the vision of the mobile robot to the road.

M31. A method according to any of the preceding method embodiments and with the features of embodiment M18, wherein the determination whether there are any occluding obstacles occluding the vision of the mobile robot to a road is facilitated by the determination of the size of the obstacle.

M32. A method according to any of the preceding method embodiments and with the features of embodiment M18, wherein the road crossing is determined as operator-based road crossing if it is determined that there exist occluding obstacles occluding the vision of the mobile robot to the road and the size of the occluding obstacle exceeds a certain threshold.

M33. A method according to any of the preceding method embodiments and with the features of M5, wherein the road is determined to be a driveway, the method further comprising determining the presence of a car in a driveway.

M34. A method according to the preceding embodiment, wherein the road crossing is determined as automatic and autonomous road-crossing if no car is detected on the driveway.

M35. A method according to any of the preceding method embodiments and with the features of embodiment M33, wherein the road crossing is determined as automatic and autonomous road crossing if a car is detected on the driveway and it is unlikely that the mobile robot obstructs the car's trajectory.

M36. A method according to any of the preceding method embodiments and with the features of embodiment M33, wherein the road crossing is determined as automatic and autonomous road crossing if a car is detected on the driveway and it is unlikely that the car will move on the driveway while the robot is crossing the driveway.

M37. A method according to the preceding embodiment, wherein a moving object detector is used to determine the likelihood that the car will move while the robot is crossing the driveway.

M38. A method according to any of the preceding method embodiments and with the features of embodiment M36, wherein the detection of the sound produced by the car when the car is turned-on is used to determine the likelihood that the car will move while the robot is crossing the driveway.

M39. A method according to any of the preceding method embodiments M1 to M34 and with the features of embodiment M33, wherein the road crossing is determined as operator-based road crossing if there is a car detected on the driveway.

M40. A method according to any of the preceding method embodiments, wherein a road crossing is determined as automatic and autonomous road crossing if a public road is classified as safe for automatic and autonomous road crossing and no occluding obstacles, such as cars parked on the roadside, obstruct the vision of the mobile robot to the road.

M41. A method according to any of the preceding method embodiments, wherein a road crossing is determined as automatic and autonomous road crossing if a public road is classified as safe for automatic and autonomous road crossing and an obstacle with a size below a threshold is detected.

M42. A method according to any of the preceding method embodiments and with the features of embodiment M2, wherein sending data to an operator, if the road crossing is determined for operator-based road crossing, is done by a communication device comprised by the mobile robot.

M43. A method according to the preceding embodiment, wherein the communication device is configured to send a message to an external device, such as an operator terminal, for requiring assistance for the road crossing.

M44. A method according to any of the two preceding embodiments, wherein sensor data is sent from the communication device to the operator terminal.

M45. A method according to any of the two preceding embodiments, wherein the message and/or the sensor data are displayed on the operator terminal.

M46. A method according to any of the preceding embodiments and with the features of embodiment M44, wherein the sensor data comprise images, such as live images, taken from the surroundings of the robot.

M47. A method according to any of the preceding method embodiments and with the features of embodiment M2, wherein the operator terminal is configured to receive instructions from a human operator.

M48. A method according to the preceding embodiment, wherein an operator interface device, such as mouse, keyboard, joystick, touch panel, microphone, camera, is used by the human operator to transfer instructions to the operator terminal.

M49. A method according to any of the preceding method embodiments, and with the features of embodiment M47, wherein said instructions are sent from the operator terminal to the communication device.

M50. A method according to the preceding embodiment, wherein said instructions indicate to the mobile robot to cross the road.

M51. A method according to the preceding embodiment, wherein the robot receives an instruction indicating to cross the road and crosses the road autonomously without the operator controlling it.

M52. A method according to any of the preceding method embodiments and with the features of embodiment M49, wherein said instructions to the robot include at least one of accelerate, decelerate, turn left, turn right, go backwards.

M53. A method according to the preceding embodiment, wherein the mobile robot receives the instructions and the crossing of the road by the mobile robot is manually controlled by the human operator.

M54. A method according to any of the preceding method embodiments and with the features of M5, wherein the road is determined to be a driveway and it is determined whether the driveway is safe to cross automatically and autonomously.

M55. A method according to the preceding embodiment, wherein information related to whether a driveway is safe to cross automatically and autonomously is stored on a map that the data processing device has access to.

M56. A method according to the preceding embodiment, wherein information related to whether a driveway is safe to cross automatically and autonomously is added manually to the map.

M57. A method according to any of the preceding embodiments and with the features of embodiment M55, wherein information related to whether a driveway is safe to cross automatically and autonomously is added to the map on a robot run.

M58. A method according to any of the preceding method embodiments and with the features of embodiment M55, wherein the road crossing is determined as operator-based road crossing if the driveway is determined as not safe to cross automatically and autonomously.

Below, data processing device embodiments will be discussed. These embodiments are abbreviated by the letter P followed by a number. Whenever reference is herein made to data processing device embodiments, these embodiments are meant.

P1. A data processing device configured to execute the method according to any of the preceding method embodiments.

P2. A data processing device according to the preceding embodiment, wherein the data processing device is configured to access information on a map for determining whether a road is classified as a public road or a driveway.

P3. A data processing device according to any of the preceding data processing device embodiments, wherein the data processing device is configured to evaluate topology parameters of the road for determining whether a road is classified as a public road or a driveway.

P4. A data processing device according to any of the preceding data processing device embodiments, wherein the data processing device is configured to access information on a map to determine if a road is classified as a safe road to cross automatically and autonomously.

P5. A data processing device according to any of the preceding data processing device embodiments, wherein the data processing device is configured to evaluate at least one of the parameters related to speed limits, traffic density, number of lanes and accident statistics to determine if a road is classified as a safe road to cross automatically and autonomously.

P6. A data processing device according to any of the preceding data processing device embodiments, wherein the data processing device is configured for localization.

P7. A data processing device according to any of the preceding data processing device embodiments, wherein the data processing device is configured to process an image for detecting any of the presence and position of at least one road on the image.

P8. A data processing device according to any of the preceding data processing device embodiments, wherein the data processing device is configured to process an image for detecting any of the presence and position of at least one car, such as a parked car, on the image.

P9. A data processing device according to any of the preceding two data processing device embodiments, wherein the data processing device is configured to perform a pattern recognition algorithm on an image.

P10. A data processing device according to any of the preceding three data processing device embodiments, wherein the data processing device is configured to detect on an image an occluding obstacle that obstructs the view of a part of the road by the camera that took the image, and to determine whether the part corresponding to the obstructed view exceeds a threshold.

P11. A data processing device according to any of the preceding four data processing device embodiments, wherein the data processing device is configured to detect the size of the detected occluding obstacle.

P12. A data processing device according to any of the data processing device embodiments, wherein the data processing device is configured to execute a moving object detection algorithm.

P13. A data processing device according to the preceding embodiment, wherein the moving object detection algorithm is performed on at least two images and wherein preferably a time delay exists between the at least two images, the time delay not exceeding 10 seconds, preferably not exceeding 5 seconds, such as not exceeding 3 seconds.

P14. A data processing device according to any of the preceding embodiments and with the features of embodiment P12, wherein the data processing device is configured to detect a moving car on a road, such a moving car on a driveway.

P15. A data processing device according to any of the preceding data processing device embodiments, wherein the data processing device is configured to execute a sound recognition algorithm.

P16. A data processing device according to the preceding embodiment, wherein the data processing device is configured to recognize the sound of a turned-on car.

P17. A data processing device according to any of the preceding data processing device embodiments, wherein the data processing device is part of a mobile robot.

P18. A data processing device according to any of the preceding data processing device embodiments, wherein the data processing device is configured for communicating with a mobile robot.

Below, system embodiments will be discussed. These embodiments are abbreviated by the letter S followed by a number. Whenever reference is herein made to system embodiments, these embodiments are meant.

S1. A system configured for performing the method according to any of the preceding method embodiments, the system comprising a mobile robot.

S2. A system according to the preceding embodiment, wherein the mobile robot comprises a data processing device according to any of the preceding data processing device embodiments.

S3. A system according to any of the preceding system embodiments, wherein the mobile robot further comprises at least one camera for capturing an image of the surroundings of the robot.

S4. A system according to any of the preceding system embodiments, wherein the mobile robot comprises any of stereo cameras, time-of-flight (TOF) cameras and ultrasonic cameras.

S5. A system according to any of the preceding system embodiments, wherein the mobile robot has access to a map.

S6. A system according to any of the preceding system embodiments, wherein the mobile robot is configured to localize itself.

S7. A system according to the preceding embodiment, wherein the mobile robot comprises at least one of at least one GPS sensor, at least one dead-reckoning sensor, at least one accelerometer, at least one gyroscope, at least one time of flight camera, at least one Lidar sensor, at least one odometer, at least one magnetometer, and at least one altitude sensor.

S8. A system according to any of the preceding system embodiments, wherein the mobile robot is a land-based robot.

S9. A system according to any of the preceding system embodiments, wherein the mobile robot is configured not to travel with a speed exceeding 10 km/h.

S10. A system according to any of the preceding system embodiments, wherein the mobile robot is an autonomous or partly autonomous robot.

S11. A system according to any of the preceding system embodiments, wherein the system further comprises an operator terminal.

S12. A system according to the preceding embodiment, wherein the mobile robot comprises a communication device configured to send data to and receive data from the operator terminal.

S13. A system according to any of the preceding system embodiment with the features of embodiments S11, wherein the robot is configured to send a message to the operator terminal for requiring assistance for the road crossing.

S14. A system according to any of the preceding system embodiment with the features of embodiments S11, wherein the robot is configured to send sensor data, such as images, to the operator terminal.

S15. A system according to any of the preceding system embodiments and with the features of embodiment S11, wherein the operator terminal is a computer.

S16. A system according to any of the preceding system embodiments and with the features of embodiment S11, wherein the operator terminal is configured to send data to and receive data from the mobile robot.

S17. A system according to any of the preceding system embodiments and with the features of embodiment S11, wherein the operator terminal can be operated by a human operator.

S18. A system according to the preceding system embodiment, wherein the human operator can operate the operator terminal to send instructions to the mobile robot.

S19. A system according to the preceding embodiment, wherein the operator terminal comprises an operator interface device, such as mouse, keyboard, joystick, touch panel, microphone, camera.

S20. A system according to any of the preceding system embodiments and with the features of embodiment S18, wherein said instructions indicate to the mobile robot to cross the road.

S21. A system according to the preceding embodiment, wherein the robot receives an instruction indicating to cross the road and crosses the road autonomously without the operator controlling it.

S22. A system according to any of the preceding system embodiments and with the features of embodiment S18, wherein said instructions indicate to the mobile robot to perform at least one of accelerate, decelerate, turn left, turn right, and go backwards.

S23. A system according to the preceding embodiment, wherein the mobile robot receives the instructions and the crossing of the road by the mobile robot is manually controlled by the human operator.

S24. A system according to any of the preceding system embodiments, wherein the mobile robot is configured to determine if a road is a public road or a driveway.

S25. A system according to the preceding embodiment, wherein the mobile robot is configured to detect if a road is a public road or a driveway.

S26. A system according to any of the preceding system embodiments, wherein the mobile robot is configured to classify a public road as safe for automatic and autonomous road crossing or not safe for automatic and autonomous road crossing.

S27. A system according to the preceding embodiment, wherein the mobile robot is configured to request assistance for crossing a public road that is classified as not safe for automatic and autonomous road crossing.

S28. A system according to any of the preceding system embodiments, wherein the mobile robot is configured to detect occluding obstacles, such as cars, that obstruct the view of the robot's view to the road.

S29. A system according to the preceding embodiment and with the features of embodiment S11, wherein the mobile robot is configured to request assistance from the operator for crossing the road if the robot's view to the road is obstructed.

S30. A system according to any of the preceding system embodiments, wherein the mobile robot crosses the road automatically and autonomously if a public road is classified as safe for automatic and autonomous road crossing and no occluding obstacles, such as cars parked on the roadside, obstruct the vision of the mobile robot to the road.

S31. A system according to any of the preceding system embodiments, wherein the mobile robot crosses the road automatically and autonomously if a public road is classified as safe for automatic and autonomous road crossing and an obstacle with a size below a threshold is detected.

S32. A system according to any of the preceding system embodiments, wherein the mobile robot is configured to detect the presence of a car in a driveway.

S33. A system according to the preceding embodiment, wherein the robot crosses the road automatically and autonomously when no car is detected on the driveway.

S34. A system according to any of the two preceding embodiments, wherein the robot comprises a moving object detector configured to detect if a car is moving or not.

S35. A system according to the preceding embodiment, wherein the robot crosses the driveway automatically and autonomously if the car is detected as stationary.

S36. A system according to any of the four preceding embodiments, wherein the robot is configured to detect the sound of the car when the car is turned on.

S37. A system according to the preceding embodiment, wherein the robot crosses the road automatically and autonomously if it does not detect the sound of a car.

Below, use embodiments will be discussed. These embodiments are abbreviated by the letter U followed by a number. Whenever reference is herein made to use embodiments, these embodiments are meant.

U1. Use of the system according to any of the preceding system embodiments for a mobile robot road crossing.

U2. Use according to the preceding embodiment, wherein the use comprises delivering at least one item from a first location to at least one delivery location by the mobile robot.

Below road crossing indication method embodiments will be discussed. These embodiments are abbreviated by the letter I followed by a number. Whenever reference is herein made to road crossing indication method embodiments these embodiments are meant.

I1. A method comprising:
indicating a mobile robot's behavior at a road crossing.

I2. A method according to the preceding embodiment, comprising emitting sound from at least one speaker unit for indicating the mobile robot's behavior at a road crossing.

I3. A method according to any of the preceding embodiments, comprising indicating the mobile robot's behavior through robot's motion and/or position.

I4. A method according to any of the preceding road crossing indication method embodiments, comprising emitting light from at least one light source prior to the mobile robot crossing the road and/or during the road crossing.

I5. A method according to any of the preceding road crossing indication method embodiments, comprising emitting light patterns from at least one light source prior to the mobile robot crossing the road and/or during the road crossing.

I6. A method according to any of the preceding road crossing indication method embodiments, wherein a plurality of light sources is arranged in single-row manner.

I7. A method according to the preceding embodiment, comprising activating the light sources such that to create light animations.

I8. A method according to the preceding embodiment, comprising activating and deactivating the light sources in succession.

I9. A method according to the preceding embodiment, wherein the light sources are activated and deactivated from a back of the robot to a front of the robot.

I10. A method according to any of the preceding road crossing indication method embodiments, comprising switching on a plurality of light sources in an area of the mobile robot to form therein a displaying area.

I11. A method according to the preceding embodiment, wherein the display area comprises a plurality of parallel lines formed by light sources arranged in a linear manner, such as 2 to 16 parallel lines.

I12. A method according to any of the preceding road crossing indication method embodiments and with the features of embodiment I10, comprising displaying on the display area at least one of shapes, preferably signs, such as arrows, chevrons, throbbers, crosses; and text.

I13. A method according to the preceding embodiment, comprising animating the shapes and/or text displayed in the display area, such as, displaying the shapes and/or the text moving in a direction from the back of the robot to the front of the robot and/or from the front of the robot to the back of the robot.

I14. A method according to any of the preceding road crossing indication method embodiments, comprising positioning at least one light source on a body of the mobile robot.

I15. A method according to any of the preceding road crossing indication method embodiments, comprising positioning at least one light source on the wheels of the mobile robot.

I16. A method according to any of the preceding road crossing indication method embodiments, comprising positioning the light sources on at least one of the lateral sides of the mobile robot.

I17. A method according to any of the preceding road crossing indication method embodiments and with the features of embodiment I4, wherein the light source is a light emitting diode (LED).

I18. A method according to any of the preceding road crossing indication method embodiments, wherein the road crossing is performed autonomously.

I19. A method according to any of the preceding road crossing indication method embodiments, wherein the road crossing is performed automatically and autonomously.

I20. A method according to embodiments I1 to I18, wherein the road crossing is assisted by an operator, such as a human operator.

I21. A method according the preceding embodiment, wherein the mobile robot indicates its intent to cross the road while the operator decides whether to cross the road or not.

I22. A method according to any of the preceding road crossing indication method embodiments with the features of embodiment I4 and/or I5, wherein the light and/or light patterns is/are emitted at least 1 second prior to the road crossing, preferably at least 3 seconds before the road crossing, further preferably at least 10 second prior to the road crossing.

I23. A method according to any of the preceding road crossing indication method embodiments, wherein the robot indicates that it is going to cross the road and/or that it is crossing the road.

I24. A method according to any of the preceding road crossing indication method embodiments, wherein the robot indicates that it is not going to cross the road.

I25. A method according to any of the preceding road crossing indication method embodiments, wherein the robot indicates that there is presently a decision making process as to whether or not to cross the road.

C1. A method comprising the method according to any of the above method embodiments M1 to M58 and the method of any of the above road crossing indicating embodiments I1 to I25.

Below mobile robot embodiments will be discussed. These embodiments are abbreviated by the letter R followed by a number. Whenever reference is herein made to mobile robot embodiments these embodiments are meant.

R1. A mobile robot configured to perform the method according to any of the embodiments I1 to I25.

R2. A mobile robot according to the preceding embodiment, comprising at least one light source.

R3. A mobile robot according to any of the preceding mobile robot embodiments, comprising a plurality of light sources arranged in single-row manner.

R4. A mobile robot according to any of the preceding mobile robot embodiments, comprising a plurality of light sources switched on in an area of the mobile robot to form therein a displaying area.

R5. A mobile robot according to the preceding embodiment, wherein the display area comprises a plurality of parallel lines formed by light source arranged in a linear manner, such as 2 to 20 parallel lines.

R6. A mobile robot according to any of the preceding mobile robot embodiments, comprising wheels, such as 3 to 6 wheels, wherein at least one light source is positioned on at least one wheel.

R7. A mobile robot according to any of the preceding mobile robot embodiments, comprising at least one light source on at least one lateral surface of the mobile robot.

R8. A mobile robot according to any of the preceding mobile robot embodiments, comprising a lid and a body, the body having a top opening that is enclosed by the lid and wherein at least one light source is positioned between the lid and the body.

R9. A mobile robot according to any of the preceding mobile robot embodiments, comprising a controller configured to control at least one light source of the mobile robot.

R10. A mobile robot according to the preceding embodiment wherein the controller is configured to activate at least one light source to indicate that the mobile robot will cross a road.

R11. A mobile robot according to any of the preceding mobile robot embodiments and with the features of embodiment R9, wherein the controller is configured to activate and deactivate at least one light source in a predetermined pattern.

R12. A mobile robot according to any of the preceding mobile robot embodiments and with the features of embodiments R4 and R9, wherein the controller is configured to control a plurality of light sources in the displaying area to display a shape, preferably a sign, such as an arrow.

R13. A mobile robot according to any of the preceding mobile robot embodiments and with the features of embodiments R3 and R9, wherein the controller is configured to control a plurality of light sources to create a light animation, such as, lights moving from the back to the front of the mobile robot.

R14. A mobile robot according to any of the preceding mobile robot embodiments and with the features of embodiments R9, wherein the controller is programmable.

R15. A mobile robot according to any of the preceding mobile robot embodiments and with the features of embodiments R1 to R14, wherein the light source is a light emitting diode (LED).

R16. A mobile robot according to any of the preceding mobile robot embodiments, wherein the mobile robot is a land-based robot.

R17. A mobile robot according to any of the preceding mobile robot embodiments, wherein the mobile robot is a delivery robot.

R18. A mobile robot according to any of the preceding mobile robot embodiments, wherein the mobile robot is an autonomous or partly autonomous robot.

R19. A mobile robot according to any of the preceding mobile robot embodiments, wherein the mobile robot comprises a data processing device according to any of the preceding data processing device embodiments.

S38. A system according to any of the preceding system embodiments, wherein the robot comprises the features of any of the preceding mobile robot embodiments.

U3. Use of the system according to the preceding embodiment, wherein the use may comprise any of the features of U1 or U2.

DETAILED DESCRIPTION OF THE FIGURES

Figure 1:
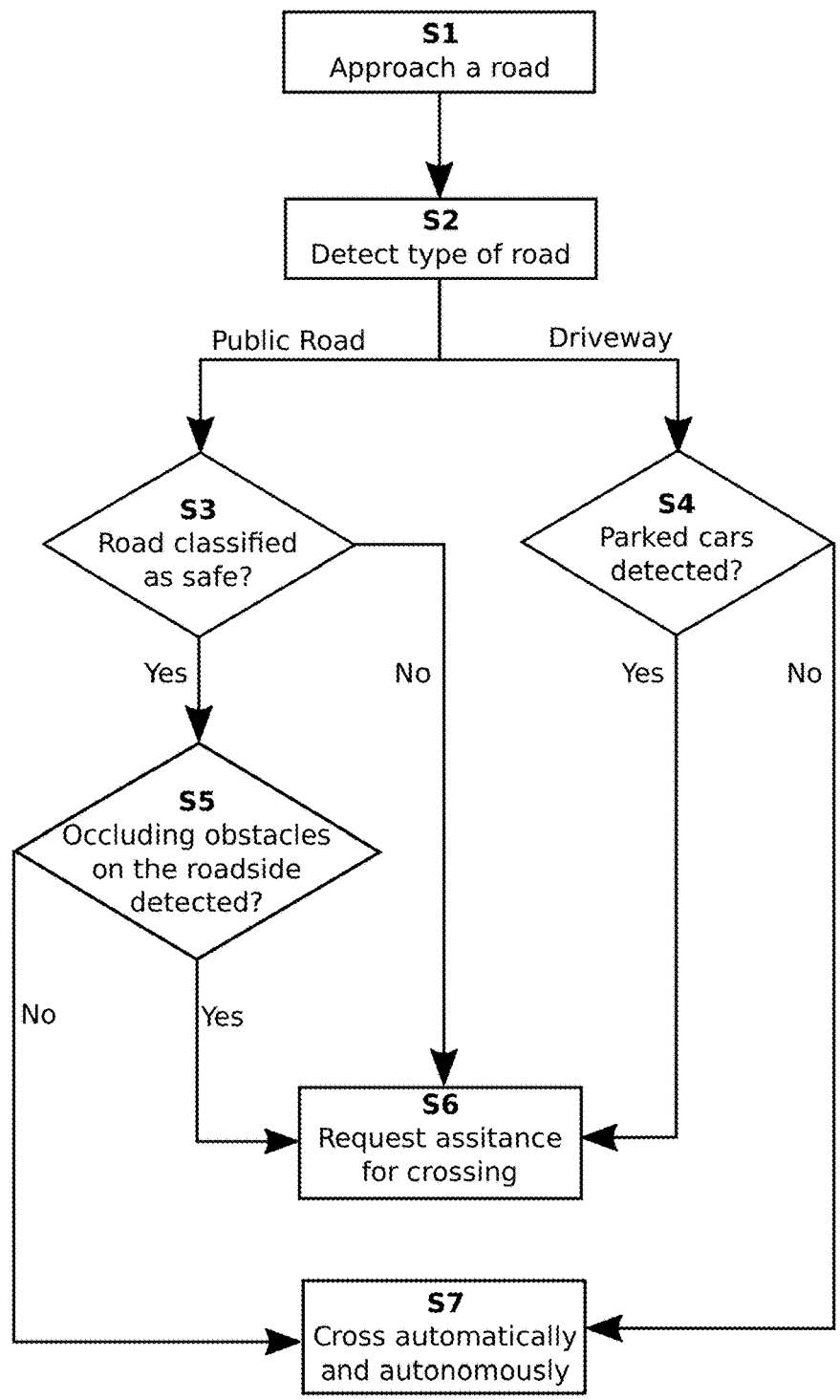
FIG. 1 shows a schematic flowchart of an autonomous and automatic road crossing method according to one embodiment.

In the following, exemplary embodiments of the invention will be described, referring to the figures. These examples are provided to provide further understanding of the invention, without limiting its scope.

In the following description, a series of features and/or steps are described. The skilled person will appreciate that unless required by the context, the order of features and steps is not critical for the resulting configuration and its effect. Further, it will be apparent to the skilled person that irrespective of the order of features and steps, the presence or absence of time delay between steps, can be present between some or all of the described steps.

The description of the figures first provides a general overview of embodiments of the present invention, before providing further details of more specific embodiments, features and steps of the exemplary embodiments of the present invention.

Embodiments of the present invention relate to methods and systems comprising a mobile robot 10 (see FIG. 1) that may travel autonomously (without a human operator controlling it) or semi-autonomously (with a human operator only controlling it at some times during its operation). Such a robot 10 may travel (i.e., drive) in public environments, e.g., on sidewalks. It may sometimes be required for the mobile robot 10 to cross roads.

The following distinction of different ways how the mobile robot 10 can cross a road can be made. A fully-assisted road crossing (or fully-assisted crossing) refers to the case when a human operator that can control the mobile robot 10, takes the decision to cross the road and also controls the mobile robot 10 while crossing the road. A semi-assisted road crossing (or semi-assisted crossing) refers to the case when a human operator that can exchange data with the mobile robot 10 takes the decision to cross the road and the mobile robot 10 can proceed crossing the road autonomously (i.e. without a human operator controlling it). Note that in the case of a semi-assisted crossing the requirement that a human operator being able to control the mobile robot driving is not required. An automatic and autonomous road crossing refers to the case when the mobile robot 10 takes the decision itself to cross a road (i.e. takes the decision automatically) and the crossing is done in an autonomous way (i.e. without a human operator controlling the mobile robot).

The invention concerns combining several parameters to verify that a road crossing is safe. In cases of safe road crossings, the mobile robot 10 can perform automatic and autonomous road crossing. The parameters that can be used to verify that a road crossing is safe can comprise checking historical data for the road to be crossed, detecting cars parked on the roadside (i.e. roadside cars 21), and/or checking for cars parked in the driveway.

Historical data can be data comprised in a memory that the mobile robot 10 can comprise or have access to wherein some roads can be classified as "safe". The term safe (or easy to cross) refers to a road, or road crossing, that the mobile robot 10 can cross automatically and autonomously. Historical data can be in the form of an extra map layer on the map data that the mobile robot 10 can comprise or have access to, classifying the roads as safe or not safe. The safe roads can comprise one-way roads, one lane roads, roads in suburban neighborhoods, rural roads, or driveways. If a road is not marked as "safe" (or "easy to cross") on the robot's map, the mobile robot will not attempt to cross it automatically and/or autonomously. An example of an unsafe road can be a road with heavy traffic. However, also particular driveways can be marked as unsafe.

Historical data can be obtained from a map (such as the OpenStreetMap by the OpenStreetMap Foundation, Sutton Coldfield, UK) or can be marked on a previous robot run. That is, a mobile robot 10 may have previously passed on this road and may have marked the road as safe or not safe. This decision may have been taken by a human operator having control on the mobile robot 10 or by the robot 10 itself by taking the decision based on the detected topology.

Then such a decision can be saved by the mobile robot 10 in a memory that the mobile robot 10 can comprise or have access to.

Occluding obstacles 21 (see FIG. 4) can comprise vehicles 21 parked on the side of the public roads. Since the robot 10 generally only looks for moving objects when deciding whether crossing a road will be safe, occluding obstacles 21, such as parked cars 21, can effectively prevent the robot 10 from assessing the true state of the road by blocking a part of the road. Therefore, before attempting automatic and autonomous crossing, the robot runs an "occluding obstacle scan" on the surroundings, that is, the mobile robot tries to detect if any occluding obstacle 21, such as parked cars 21, are positioned on the roadside and/or between the mobile robot 10 and the road. That is, any occlusion of the robot's vision may be detected. For example, stereo cameras may be used. Other sensors that may be used in that regard include TOF and/or ultrasonic sensors. Generally, all the surroundings may be detected. More specifically, all the directions that might occlude the vision of moving cars may be detected.

If a parked car (or another object occluding the robot's view onto the road) is detected, i.e., if an object is detected in a direction where the road is, the robot 10 may request an input from an operator, i.e., it may not cross the road automatically.

The vision of the mobile robot to the road may also be occluded by other objects or traffic participants as well, rather than the parked cars 21. In a similar scenario to the one depicted in FIG. 4, other objects and/or traffic participants may occlude the vision of the mobile robot 10 to the road, rather than a parked car 21. Such occlusions of the robot's vision may be caused by stationary and/or moving objects or traffic participants. For example, a tree may be positioned between the mobile robot 10 and the road thus occluding the vision of the mobile robot to the road. A group of people may be standing or walking on the road side and thus may occlude the vision of the robot to the road. Thus, occluding obstacles 21 (i.e. obstacles, such as objects or traffic participants, that occlude the robot's vision to the road) may comprise cars parked on the roadsides, traffic signs, trees, traffic participants (such as pedestrians, cyclers, etc.), buildings, etc. In general, any stationary and/or moving obstacle positioned on the road, roadside or sidewalk, particularly between the mobile robot 10 and the road, may occlude the vision of the mobile robot 10 to the road. In some instances, the detection of an occluding obstacle 21 may cause the mobile robot to request for assistance for crossing the road crossing.

With particular reference to driveways, cars parked in driveways can start moving suddenly when the robot has previously detected it as being stationary. In such cases the mobile robot 10 should not immediately cross the driveway as it can obstruct the car way. On the other hand, usually cars parked in driveways are stationary, thus do not impose any danger and the robot 10 should not stop when detecting them. This imposes an extra challenge for the mobile robot 10 when traversing the driveways as the mobile robot 10 needs to decide whether there is a car parked on the driveway, is this car stationary or is it about to start moving and should the mobile robot 10 initiate the driveway crossing itself or should it require assistance from the human operator. For this, extra data can be added to the maps that the mobile robot 10 can comprise or have access to wherein roads are classified as public roads or driveways (i.e. a tag can be attached to the data of each road indicating if it's a driveway or not).

In some embodiments, the mobile robot 10 can detect the driveways itself by analyzing the topology of the surrounding. For example, if on the map that the mobile robot 10 can comprise or have access to a public road ends at some point, this can indicate to the mobile robot 10 that the continuation after that point can be a parking place or a driveway. Further hints of the topology of the surroundings can be used and analyzed by the mobile robot to detect a driveway. In some embodiments, the mobile robot 10 can verify whether any cars are detected on the driveway and can cross the driveway automatically and autonomously only if no cars are detected. In some embodiments, the mobile robot can cross the driveway automatically and autonomously even when a car is detected in the driveway. For example, if the car is far enough for the robot 10 to pass the driveway even if the car instantly starts to move, then the mobile robot 10 can automatically and autonomously pass the driveway. In some embodiments, the mobile robot 10 can comprise a moving object detector. The mobile robot 10 can automatically and autonomously cross the driveway and if the moving object detector detects a car moving, or approaching the mobile robot, the mobile robot can stop and frees the driveway by going back or by continuing to pass the driveway. In some embodiments, the mobile robot 10 can comprise sensors configured to detect the sound of the motor of a vehicle. If no sound of motor is detected, this can indicate to the mobile robot 10 that no turned-on vehicle is in the vicinity of the mobile robot 10. Thus, the mobile robot 10 can safely cross the road.

FIG. 1 shows a schematic flowchart of an automatic and autonomous road crossing method. The method concerns a mobile robot 10 which is required to cross a road. Thus, in a first step S1 the method can initialize with a mobile robot 10 approaching a road for the purpose of crossing it. The mobile robot 10 can be a sidewalk robot, i.e. a mobile robot 10 that can be configured to drive on the sidewalks. The mobile robot 10 can be configured to drive autonomously (i.e. without a human operator controlling it) or semi-autonomously (i.e. with a human operator partially or fully controlling it). The mobile robot 10 can be configured to drive autonomously on the sidewalk. Crossing roads usually imposes a more dangerous scenario and thus more attention is required for the mobile robot 10 to cross the road. The mobile robot 10 can be configured to evaluate one or more parameters to arrive at a decision on requesting assistance for crossing the road (step S6) or automatically and autonomously crossing the road (step S7).

The method of FIG. 1 can further comprise step S2 wherein the mobile robot 10 can detect the type of the road. In step S2 the mobile robot 10 can decide if the road that it is about to cross is a public road or a driveway. In some embodiments, the mobile robot 10 can comprise or have access to data that indicate if a road is a public road or a driveway. Such data, for example, can be an extension of the map data that the mobile robot 10 can comprise or have access to. That is, each road or at least some of the roads on the map that the robot 10 can comprise or have access to can be marked with a tag indicating that the road is a driveway or not. The mobile robot 10 can be configured to read such a tag and make a decision about the type of the road.

In some embodiments, the driveways are added and/or tagged as driveways manually by a human operator on the map that the mobile robot 10 can comprise or have access to. In some further embodiments, the mobile robot 10 can be configured to detect a driveway based on the topology (i.e. if the road ends at a certain point then it probably is a parking place or a driveway). As an example, an initial 2D graph may be obtained from satellite images for approximate paths for robots. The mobile robot may at the locations corresponding to this first map and thus a more refined map may be created. In such a refined map, the 2D paths are adjusted and some path segments may be marked as driveway crossings by human operators. However, it will be understood that this process can also be done and/or assisted by data processing means, e.g., by machine learning algorithms.

In case the road to be crosses is a public road, the method of FIG. 1 further comprises step S3 wherein the mobile robot 10 can be configured to make a decision if the road can be classified as safe or not. The safe roads can comprise (but are not limited to) one-way roads, one lane roads, roads in suburban areas and rural roads. Such a decision can be taken based on historical data that the mobile robot can comprise or have access to. The historical data can be an overlay on the robot map wherein some roads are tagged as safe (i.e. easy to cross). In some embodiments, the mobile robot 10 can be configured to detect non-safe roads (i.e. roads that are not safe, not easy to cross). For example, if the mobile robot 10 detects multiple cars passing the road (i.e. heavy traffic) then the mobile robot 10 classifies the road as non-safe. In some embodiments, the mobile robot 10 can detect heavy traffic on the road and classify it as non-safe even if it may have been marked as safe based on the historical data. In some embodiments, the historical data (i.e. data that mark the safe roads) can be created and/or updated by the mobile robot 10. That is, when passing on a road and having classified it as safe or non-safe then such a decision can be saved on a memory by the mobile robot 10. In some embodiments, a human operator can classify the roads as safe or non-safe and the mobile robot 10 can save this decision on a memory. Next time the mobile robot passes on the same road it can use such a decision, previously taken, to facilitate the classification of the road as safe or non-safe at the moment of crossing.

If the mobile robot 10 classifies the road as non-safe (i.e. does not classify the road as safe for crossing) the mobile robot requests assistance for crossing. Step S6 of the method of FIG. 1 comprises the mobile robot 10 requiring assistance for crossing a road. In this step, the mobile robot 10 can request an input from a human operator, who can communicate with the mobile robot 10, indicating whether to cross the road or not. In some embodiments, when the human operator indicates (i.e. communicates) to the mobile robot 10 to cross the road then the mobile robot 10 can proceed crossing the road in an autonomous way (i.e. without the human operator controlling it). That is, the mobile robot 10 performs semi-assisted road crossing. In some other embodiments, the human operator maintains control of the robot during the crossing of the road. That is, fully-assisted road crossing is performed.

Figure 4:
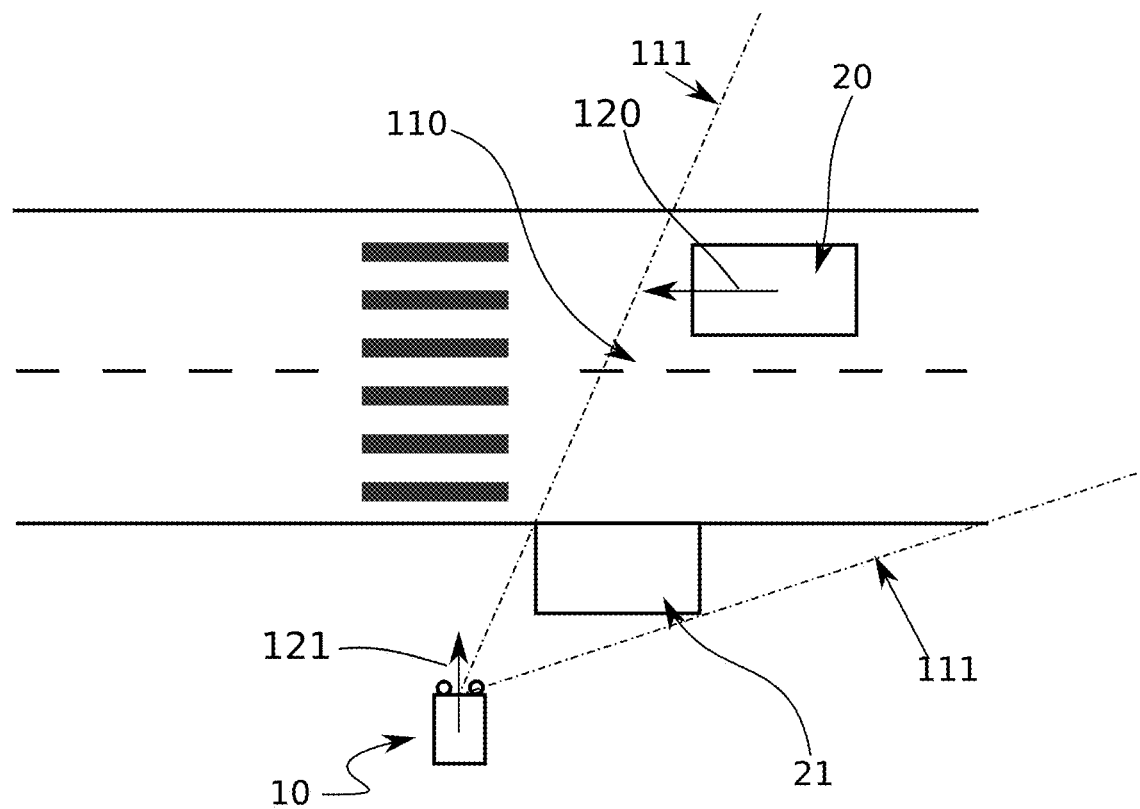
FIG. 4 shows a schematic representation of the roadside car problem.

If the mobile robot 10 classifies the road as safe for passing the mobile robot 10 can check if there are occluding obstacles on the roadside (refer to step S5 of FIG. 1). In FIG. 4 a detailed description of the scenario when there are occluding obstacles 21, such as parked cars 21, on the roadside is provided. If the mobile robot 10 can detect occluding obstacles positioned on the roadside then it requests assistance for crossing (step S6 of FIG. 1). Otherwise, if no occluding obstacle is detected then the mobile robot crosses the road automatically and autonomously (step S7 in FIG. 1). In other words, following the method of FIG. 1, the mobile robot 10 can automatically and autonomously cross a public road, classified as safe, with no cars detected on the roadside.

The occluding obstacle can comprise stationary obstacles such as: cars parked on the roadside, trees, traffic signs, buildings etc. Additionally, or alternatively the occluding obstacles can comprise moving obstacles or traffic participants, such as, pedestrians, cyclers, or other mobile robots etc. In general, any obstacle positioned between the mobile robot 10 and the road, such as on the road, roadside or sidewalk, may occlude the vision of the mobile robot 10 to the road. The mobile robot 10 can be configured to detect the occluding obstacles (or to detect if its vision to the road is occluded). If the mobile robot detects the presence of an occluding obstacle that occludes the mobile robots vision to the road, the mobile robot requests assistance for the road crossing (step S6). That is, since occluding obstacles are detected this means that the mobile robot cannot "see" part of the road. Thus, the mobile robot 10 cannot detect if there are cars driving toward the road crossing in the occluded part of the road. For this reason, it can be safer for the road crossing to be performed in operator based manner, i.e. assisted by a human operator wherein the human operator either takes the decision to cross the road and the mobile robot crosses the road autonomously or the operator takes the decision to cross the road and assists the mobiles robot driving while crossing the road.

If the mobile robot 10, does no detect any occluding obstacles, i.e. its vision to the road is not occluded, the mobile robot 10 crosses the road automatically and autonomously. As there are no obstacles between the mobile robot and the road, the mobile robot can "see" the road (i.e. part of the road around the road crossing) and can detect if there are cars driving towards the road crossing or not. This can be used by the mobile robot to decide when to cross the road in an automatic way and further cross the road by driving autonomously.

The method of FIG. 1, further comprises step S4, detecting if there are parked cars on a driveway. That is, if the mobile robot 10 is required to cross a driveway then the mobile robot 10 can check if there are parked cars detected on a driveway. Cars parked on driveway can start moving suddenly or after the mobile robot detected them as stationary objects or stationary cars. In such a scenario, the mobile robot 10 can obstruct the vehicle's path. Thus, in the embodiment of FIG. 1, the mobile robot 10 can directly require assistance for crossing the road when it can detect parked cars on the driveway. If no parked cars are detected on the driveway the mobile robot 10 can automatically and autonomously cross the driveway (step S7 in FIG. 1).

In some embodiments (not shown in FIG. 1), the mobile robot 10 can cross the driveway automatically and autonomously even when a car is detected on the driveway. For example, if the car is far enough for the robot 10 to pass the driveway even if the car instantly starts to move, then the mobile robot 10 can automatically and autonomously pass the driveway. In some embodiments (not shown in FIG. 1), the mobile robot 10 can comprise a moving object detector. The mobile robot 10 can automatically and autonomously cross the driveway and if the moving object detector detects a car moving, or approaching the mobile robot, the mobile robot can stop and frees the driveway by going back or by continuing to pass the driveway. In some embodiments (not shown in FIG. 1), the mobile robot 10 can comprise sensors configured to detect the sound of the motor of a vehicle. If no sound of motor is detected, this can indicate to the mobile robot 10 that no turned-on vehicle is in the vicinity of the mobile robot 10. Thus, the mobile robot 10 can safely cross the road.

Figure 2:
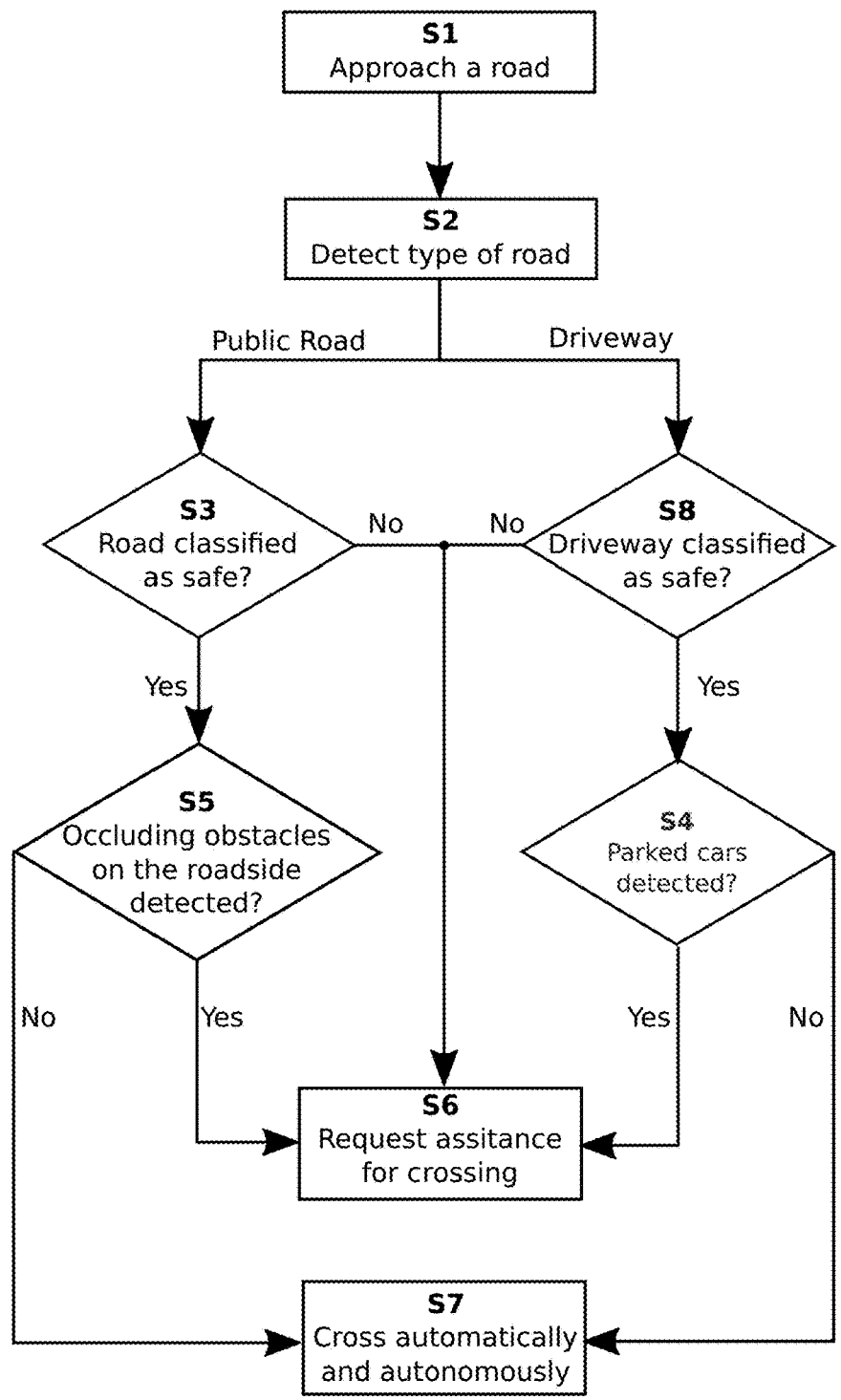
FIG. 2 shows a schematic flowchart of an autonomous road crossing method according to another embodiment.

In FIG. 2 another embodiment of an automatic and autonomous road crossing is depicted, comprising an additional step S8 compared to the method of FIG. 1. Thus in FIG. 1 and FIG. 2 (and throughout the description of the drawings) like reference signs denote like steps. Furthermore, some of the features and characteristics described above in conjunction with FIG. 1 are also used in the embodiment depicted in FIG. 2, e.g. steps S1, S2, S3, S4, S5, S6 and S7. Unlike the embodiment of FIG. 1, the embodiment of FIG. 2 comprises the additional step S8. For sake of brevity, with reference to FIG. 2 only the additional step S8 will be described in detail.

In some embodiments, as depicted in FIG. 2, the mobile robot can classify the driveways as safe or not safe. A driveway is classified as safe or easy to cross if it is safe to cross the road automatically and autonomously. In some embodiments, this information may be stored in a map the robot 10 has access to. The classification can be done based on historical data or statistical data. For example, if one or more incidents are reported from a driveway than this driveway can be marked as not safe. If, in step S8, a driveway is not classified as safe, the method may proceed to step S6, and assistance will be requested for crossing the driveway.

Figure 3A:
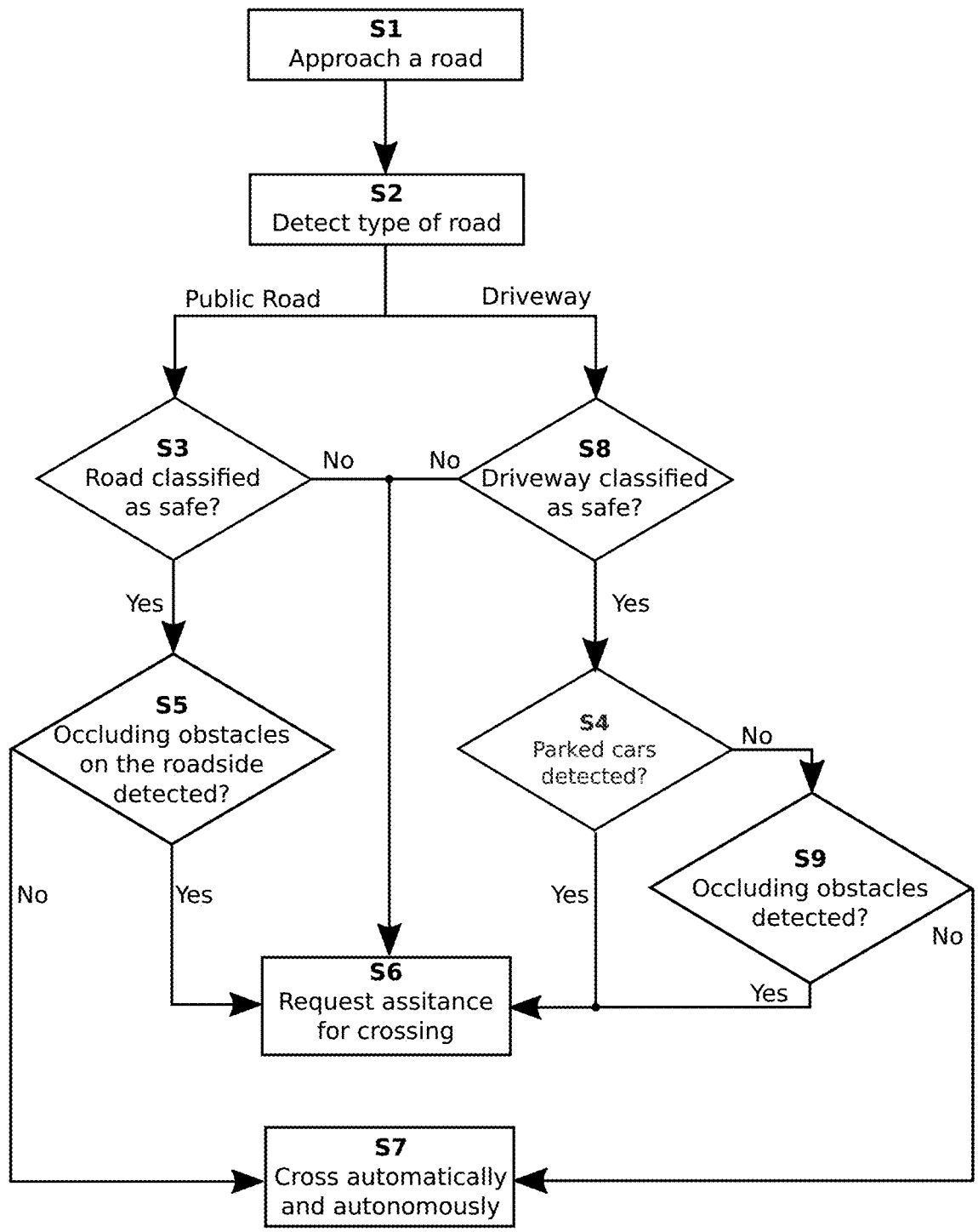
FIG. 3a shows a schematic flowchart of an autonomous road crossing method according to another embodiment.

In FIG. 3 another embodiment of an automatic and autonomous road crossing is depicted, comprising an additional step S9 compared to the method of FIG. 2. Thus in FIG. 2 and FIG. 3 (and throughout the description of the drawings) like reference signs denote like steps. Furthermore, some of the features and characteristics described above in conjunction with FIG. 2 and FIG. 1 are also used in the embodiment depicted in FIG. 3, e.g. steps S1, S2, S3, S4, S5, S6, S7 and S8. Unlike the embodiment of FIG. 1 and FIG. 2 , the embodiment of FIG. 3 comprises the additional step S9. For sake of brevity, with reference to FIG. 3 only the additional step S9 will be described in detail.

As discussed, in step S4 the mobile robot 10 can check if there are any parked cars detected on the driveway. If in step S4 it is determined that there are parked cars detected on the driveway, then the mobile robot 10 can request assistance for the road crossing. However, if in step S4 it can be determined that there are no parked cars detected on the driveway then the mobile robot can continue to step S9.

In step S9 it can be determined if there are any occluding obstacles detected that can prohibit the mobile robot 10 to "see" the driveway. As discussed, the occluding obstacle can comprise stationary obstacles such as: cars parked on the roadside, trees, traffic signs, buildings etc. Additionally, or alternatively the occluding obstacles can comprise moving obstacles or traffic participants, such as, pedestrians, cyclers, or other mobile robots etc. In general, any obstacle positioned between the mobile robot 10 and the driveway, may occlude the vision of the mobile robot 10 to the driveway. The mobile robot 10 can be configured to detect the occluding obstacles (or to detect if its vision to the driveway is occluded). If the mobile robot detects the presence of an occluding obstacle that occludes the mobile robots vision to the driveway, the mobile robot requests assistance for the road crossing (step S6). That is, since occluding obstacles are detected this means that the mobile robot cannot "see" part of the driveway. Thus, the mobile robot 10 cannot detect if there are cars parked toward the road crossing in the occluded part of the driveway. For this reason, it can be safer for the road crossing to be performed in operator based manner, i.e. assisted by a human operator wherein the human operator either takes the decision to cross the road and the mobile robot crosses the road autonomously or the operator takes the decision to cross the road and assists the mobiles robot driving while crossing the road. If otherwise, mobile robot 10 does not detect any occluding obstacles, i.e. its vision to the road is not occluded, the mobile robot 10 crosses the road automatically and autonomously. As there are no obstacles between the mobile robot and the road, the mobile robot can "see" the road (i.e. part of the road around the road crossing) and can detect if there are cars driving towards the road crossing or not. This can be used by the mobile robot to decide when to cross the road in an automatic way and further cross the road by driving autonomously.

Figure 3B:
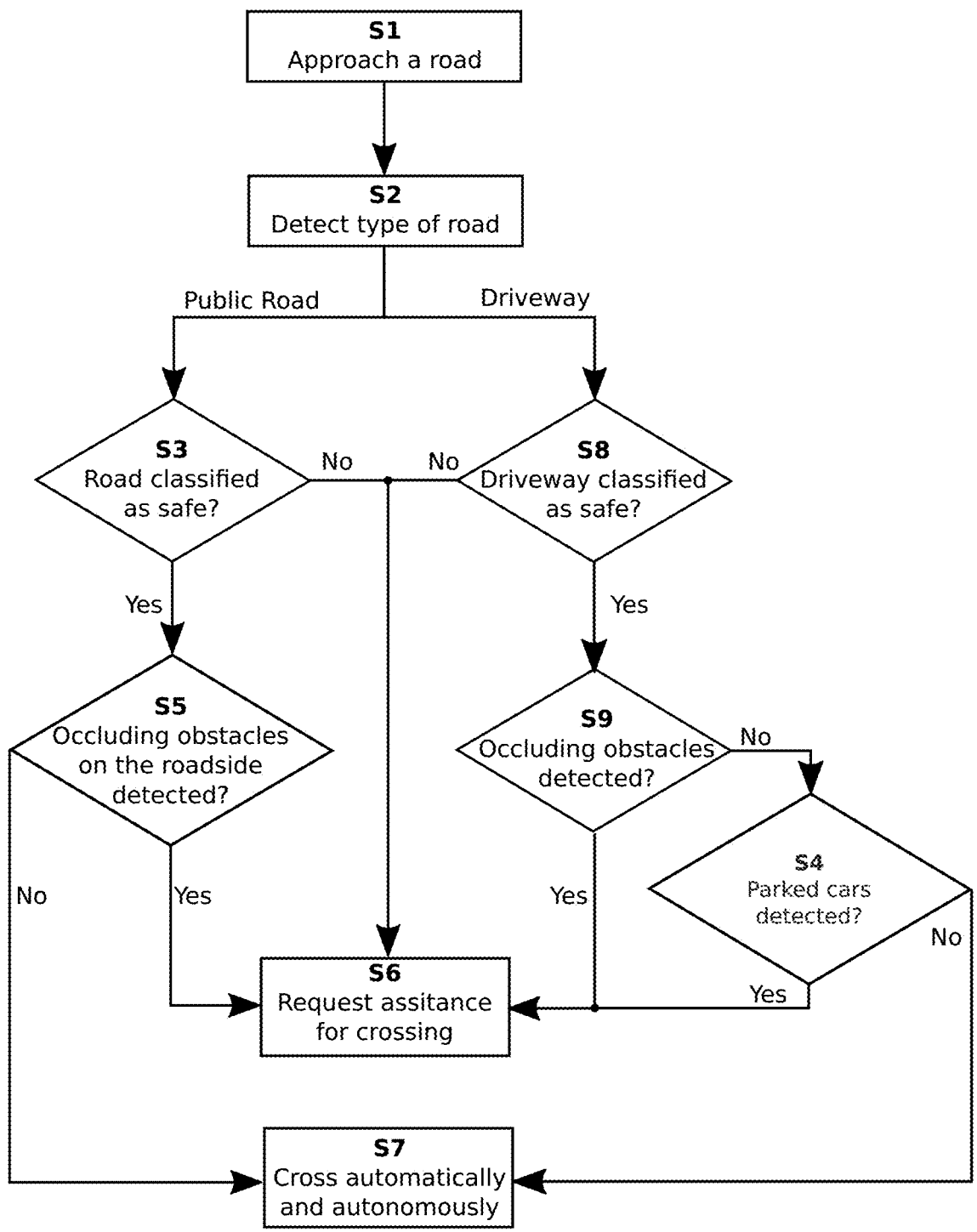
FIG. 3b shows a schematic flowchart of an autonomous road crossing method according to another embodiment.

In some embodiments as depicted in FIG. 3b, step S9 can be performed before step S4.

In some embodiments, not shown, step S4 and S9 can be performed simultaneously, i.e. without any dependence from each other. The road crossing can be determined automatically and autonomously (step S7) only if a parked car is not detected in the driveway and no occluding obstacle is detected. Otherwise the mobile robot can request assistance for the road crossing (step S6).

Referring to FIG. 4 a schematic representation of a scenario wherein an obstacle is positioned on the roadside is depicted. In FIG. 4 a mobile robot 10 is shown, wherein the mobile robot 10 is required to cross the road. In the scenario of FIG. 4 the road can be a public vehicle road. In the roadside, such as a parking place in the side of the road, or in the sidewalk, an occluding obstacle 21 is positioned. For example, a parked car 21 may be parked on the roadside. Or, at least one tree 21 and/or building 21 and/or traffic sign 21 and/or traffic participant 21 may be positioned between the mobile robot 10 and the road. In the road, a vehicle 20 can be driving in the direction depicted by the arrow 120.

As the mobile robot 20 requires to cross the road, it approaches the road wherein the mobile robot 10 is shown driving towards the road as indicated by the arrow 121. The map data or the historical data that the mobile robot 10 may comprise or have access to can indicate to the mobile robot 10 that the road ahead of the mobile robot 10 (i.e. the road that the mobile robot 10 is required to pass) can be a public road (i.e. traffic is expected on the road, cars can be driving on the road). Thus, the mobile robot 10 looks for moving objects, that is, the mobile robot 10 tries to detect moving objects, preferably fast-moving objects such as vehicles 20 on the road. It is advantageous for the mobile robot to detect the moving objects in its vicinity, such as moving cars on the road, as such detection can facilitate the decision whether to cross the road automatically and autonomously or to request assistance from a human operator. For example, if the mobile robot can detect a moving car on the road, then the mobile robot 10 will not cross the road in order to not obstruct the vehicles path, while the vehicle is moving. The mobile robot 20 may rather request for assistance from a human operator.

However, only looking for moving objects, such as moving vehicles on the road may not be enough. For example, a car may be parked on the roadside which can obstruct the view of the mobile robot 10 to the road. Or, a pedestrian or a group of pedestrians may be standing or walking on the sidewalk between the mobile robot 10 and the road. Such scenario is illustrated in FIG. 4. In the scenario of FIG. 4 if the mobile robot 20 can search for moving objects on the road it would not detect any. The reason for this is that a region of the road cannot be seen by the mobile robot 10 as the view is obstructed by the occluding obstacle 21. Thus, the region illustrated in FIG. 4 bounded by the dashed lines 111, i.e. the blind spot 110, is a region wherein the mobile robot 10 cannot have a clear view of the road. That is, the mobile robot 10 cannot know if in the blind spot 110 there is a car 20 or not driving in the road towards the road crossing. For example, in the scenario of FIG. 4, the mobile robot 10 cannot detect the vehicle 20 as it is within the blind spot region 110 of the mobile robot 10.

Thus, it can be advantageous that the mobile robot 10 can be configured to also detect occluding obstacles 21 such as the roadside parked cars 21. The presence of the roadside parked car 21, and in general of the occluding obstacles 21 between the mobile robot 10 and the road, can indicate to the mobile robot 10 that a blind spot 110 can exist, i.e. a region of the road that the mobile robot 10 cannot see, thus cannot detect if there are moving vehicles 20 or not. In some embodiments, if the mobile robot 10 can detect an occluding obstacle, e.g., a parked car 21, the mobile robot 10 can request for assistance for crossing the road. It will be understood that the parked car 21 is merely exemplary and that other objects, such as vans, trucks, containers, trees, traffic signs, buildings, etc., may also obstruct the robot's view onto the road. The view of the mobile robot onto the road may also be obstructed by other traffic participants, such as pedestrians, cyclers, or other mobile robots.

In other words, embodiments of the present technology relate to the decision of whether or not a robot 10 automatically and autonomously crosses a road, and optionally to the subsequent road crossing.

Generally, a robot 10 may travel outside, e.g., on sidewalks from an origin location to a destiny location. The robot 10 may be required to cross roads on its way. It will be understood that the instances when the robot 10 has to cross such roads may be generally more dangerous than the time the robot 10 is travelling on the sidewalk, as cars 20 moving on the roads are faster and can impact the robot 10 more seriously than any typical traffic participant moving on the sidewalk.

The present technology provides a method of determining whether such a road crossing is performed automatically and autonomously (i.e., without the control of a human operator), or manually (i.e., with the control of a human operator, operator based). It will be understood that this method is typically performed by a data processing system, which may be a part of the robot 10, or which may be communicatively connected to the robot 10.

When the robot 10 approaches the road to be crossed (step S1), in some embodiments, it may be determined whether the road to be crossed is a public road or a driveway (step S2). This determination may be made in a variety of ways: In some embodiments, this information (public road vs. driveway) may be stored on a map the robot 10 has access to, i.e., the road may be tagged as "public road" or "driveway". Additionally or alternatively, this determination may also be made by means of the topology (e.g., if a public map does not include the respective road, it is likely that it is a driveway).

In case the road to be crossed is a public road, the method may further determine whether the road is classified as a safe road, i.e., whether it is safe to cross the road automatically and autonomously (step S3). This may also be done if the road to be crossed is determined to be a driveway (step S8). In some embodiments, this information may be stored on a map the robot 10 has access to. The classification may be done based on, e.g., speed limits, traffic density, number of lanes, and accident statistics. E.g., a small road with only a few lanes, light traffic, and a low speed limit, is more likely to be classified as a "safe" road than a big road with many lanes dense traffic, and a high speed limit.

In case the road is determined to be an "unsafe" road in step S3 (or S8), the robot 10 requests assistance for the road crossing (step S6). The step of the robot 10 requesting assistance (step S6) may comprise different sub steps. Typically, the robot 10 comprises a communication device for communicating with an external entity. For example, a mobile communication device as used in a mobile phone may be used to communicate (e.g., to send and receive information) with an external entity. The communication device of the robot 10 may send a message to an external device indicating that the robot 10 requires assistance for the road crossing. This message may be sent, e.g., via the internet, to a remote operator terminal (e.g., a computer) operated by a human operator.

In a further step, sensor data (e.g., data obtained by cameras or other sensors) may be sent from the communication device of the robot to the remote operator terminal. This sensor data (e.g., images) may then be displayed on the remote operator terminal. That is, the human operator at the remote operator terminal may, e.g., see a live image of the surroundings of the robot. Further, the remote operator terminal may receive instructions from the human operator, e.g., by a remote operator interface device, such as, e.g., a mouse, a keyboard, a joystick, a touch panel, or a microphone. Such instructions could then be sent from the remote operator terminal to the robot 10, received by the communication device of the robot 10, and the robot 10 could react accordingly.

One non-limiting example of such an instruction could be: Cross the road now. In such an example, the robot 10 would just receive this instruction and then autonomously cross the road. Thus, this example may also be referred to as operator-triggered autonomous road crossing.

In another example, the instructions would be more detailed. E.g., the remote operator terminal would send instructions like accelerate, decelerate, go left, go right, to the robot 10, and more particularly to the communication device of the robot 10. That is, the whole process of crossing the road would be manually controlled. This is why this example may also be referred to as operator-controlled road crossing.

If however, in step S3, the road is determined to be a safe road, the method may continue with step S5, and the robot 10 would determine whether there are any occluding obstacles, such as parked cars, prohibiting the robot 10 to "see" the road. As already stated, the robot 10 may have access to a map, and the robot 10 may localize itself on the map (e.g., it may determine its position on the map), e.g., by means of the localization algorithm described in WO 2017/076929 A1. By localizing itself, the robot 10 also "knows" its position relative to the road to be crossed. Furthermore, when capturing an image of the surrounding of the robot 10, it is also clear where on this image the road to be crossed would be located—e.g. if considering an image captured by a front camera of the robot 10 situated as depicted in FIG. 4, the road would be located on the pixels corresponding to a horizontal angle of −90° to 90° (with 0° being the camera's principal angle, which coincides with arrow 121). The disclosed technology determines whether an occluding obstacle (such as a parking car) is present in this area (as is the case in FIG. 4), and how big this obstacle is. E.g., in the situation depicted in FIG. 4, there can be a parking car 21 present in the field of view where the robot 10 would expect the road to be. This obstacle also obscures a substantial part of the robot's view (different to, e.g., what would happen in case there was only a thin sign post). Thus, the robot 10 cannot "see" a substantial part of the road, and cannot detect whether there are any moving objects on this obscured part of the road.

If such an occluding obstacle exceeding a certain threshold is present, it may not be completely safe for the robot 10 to cross the road completely autonomously. Thus, if such an occluding obstacle is detected, the method may proceed with step S6 and request the operator's assistance (and the subsequent steps) as outlined above.

If, however, no such occluding obstacles are detected in step S5 (or if the size of any such obstacles is below a threshold, e.g., if only thin sign posts are detected), the present method may proceed with step S7. That is, the robot 10 may automatically (denoting that there is also no manual trigger for crossing the road) and autonomously cross the road without the interaction of any human operator.

As stated, in step S2, the discussed method determines which type of road is to be crossed. If in this step, it is determined that the type of road to be crossed is a driveway, the method may continue with step S4 or step S8. In step S8, it is determined whether the driveway is safe or nor. In case it is not safe, the mobile robot will require assistance. If, however, it is safe, the method will proceed with step S4-

In this step S4, the present technology detects the presence of parked cars. To do that, the robot 10 may, in one embodiment, capture an image and perform a pattern recognition algorithm (e.g., based on neural networks) based on the image.

If no car is detected in step S4, the method may continue with step S7, and the robot may automatically and autonomously cross the road, which is a driveway.

If, however, in step S4, there is detected a car in the driveway, the method may continue with step S6 and the subsequent steps of operator controlled driveway crossing.

In a further variant of the present technology, the robot 10 may also automatically and autonomously cross the driveway even if a parking car is detected in the driveway. This is based on the rationale that if a car is standing in a driveway, it is relatively unlikely that it will start to move while the robot 10 is crossing the driveway. That is, in some embodiments, the robot 10 may cross the driveway even when a car is detected in the driveway.

Figure 5:
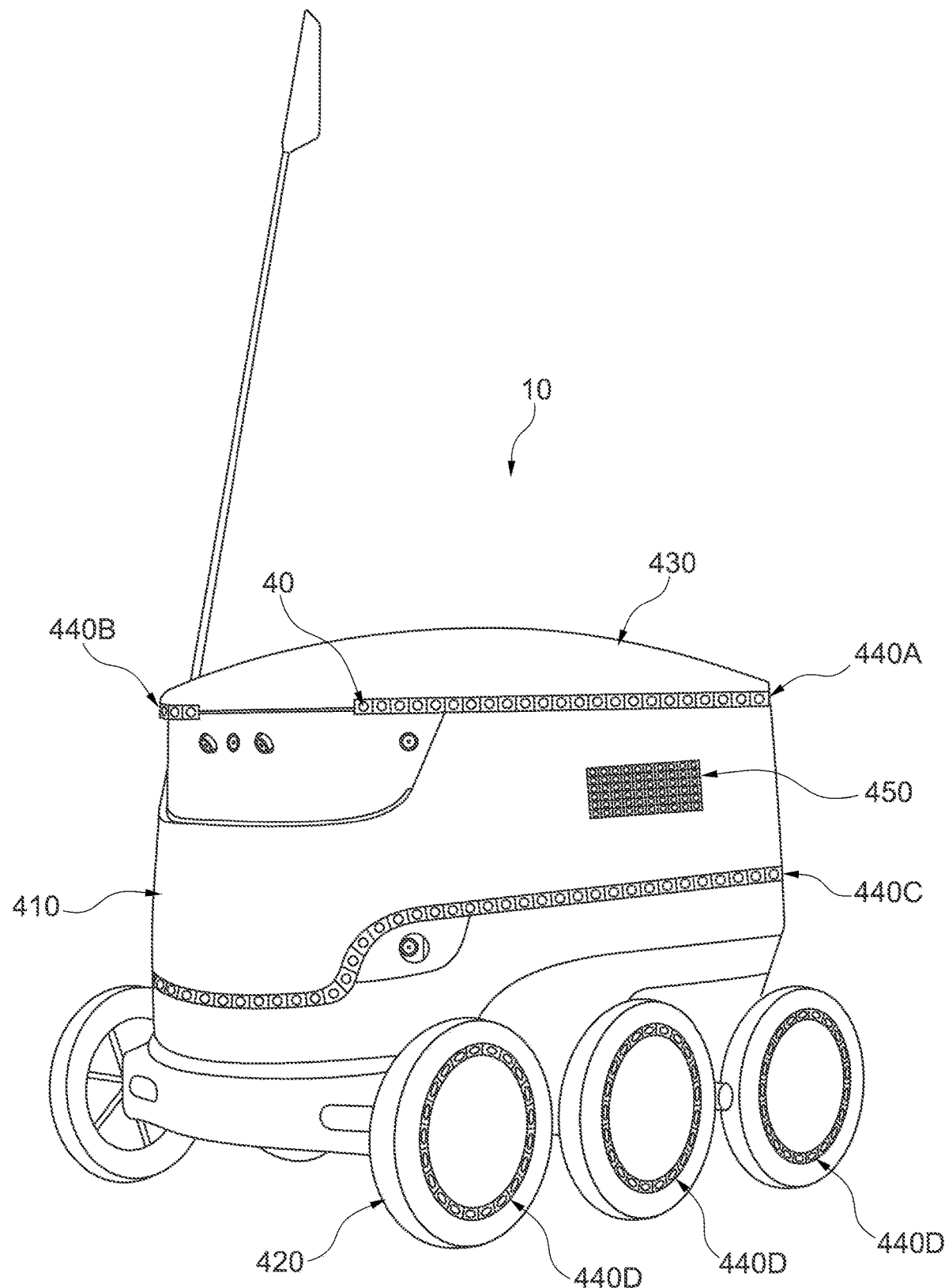
FIG. 5 shows a mobile robot comprising road crossing indicators.

Referring to FIG. 5, a mobile robot 10 comprising a plurality of road crossing indicators (440, 450) is depicted. The mobile robot 10 is a land-based robot. In some embodiments, the mobile robot 10 can be a delivery robot, i.e. the mobile robot 10 can be configured to deliver goods from a first location to at least one destiny location. The mobile robot can comprise a body 410. The body 410 encloses the inner part of the mobile robot. The body 410 can comprise an open top (not shown), e.g. the body encloses the inner parts of the mobile robot only on the lateral sides and on the base leaving the top opened. Thus, the mobile robot 10 can comprise a lid 430 configured to enclose the top of the mobile robot 10. The lid 430 can assume a closed position (as depicted in FIG. 5) wherein the top of the mobile robot 10 is enclosed and an open position (not shown) wherein the top of the mobile robot 10 is opened—i.e., the inner part of the mobile robot can be accessed from the top. In some embodiments, such as for example when the mobile robot 10 is configured as a delivery robot 10, the mobile robot can comprise a compartment (not shown). The compartment (or hollow) can be enclosed by the body on the lateral sides and/or on the base. The top of the compartment can be enclosed by the lid 430, when the lid 430 is in a closed position, or can be opened when the lid 430 is opened. In other words, the lid 430 allows the compartment to be accessed from the top when the lid is opened and enclosed when the lid 430 is closed. The mobile robot can also comprise wheels 420. In FIG. 5 the mobile robot 10 comprises 6 wheels 420.

The mobile robot 10 can be configured to usually drive (or travel) on the sidewalks (or bike lanes). However, it may also be required for the mobile robot, in order to arrive at a destination, that the mobile robot crosses roads. It can be understood that the instances when the mobile robot 10 crosses roads can be more dangerous and more prone to accidents than other instances when the mobile robot is travelling on the sidewalks. Thus, the mobile robot 10 can be configured to indicate when it will cross a road. In other words, the mobile robot 10 can be configured to indicate (or signal, or notify) that the mobile robot will cross the road some moments before starting the crossing of the road, such as 1 to 10 seconds before starting the crossing of the road. Additionally or alternatively, the mobile robot 10 can indicate that it is crossing the road while the mobile robot 10 is crossing the road. Thus, the mobile robot 10 can be configured to let other traffic participants know that it will cross the road. In this manner, the traffic participants and the robot can avoid collisions.

The mobile robot can comprise at least one road crossing indicator (440, 450). FIG. 5 demonstrates various arrangements of the road crossing indicators (440A, 440B, 440C, 440D, 450) positioned in various parts of the mobile robot 10. It should be understood that the depicted positions and arrangements of the road crossing indicators are for illustrative purposes only. Furthermore, it will be understood while a plurality of road crossing indicators is depicted in FIG. 5, one of them, e.g., only road crossing indicator 440A, 440B, 440C, 440D or 450 may be sufficient. Other arrangements, positions and combinations of arrangements and positions of the road crossing indicators can be used. Further, the mobile robot 10 can comprise one or any combination of the road crossing indicator arrangements depicted in FIG. 5 as well as other arrangements not depicted in FIG. 5 that do not change the general principle of the invention.

As depicted in FIG. 5, the mobile robot comprises a plurality of light sources 40 configured to indicate that the mobile robot 10 will cross a road. The light sources 40 can be configured such that when activated (or turned-on or when connected to an electrical energy source) emit light. In some embodiments, the light source 40 can be a light emitting diode (LED). The mobile robot 10 can comprise at least one light source 40. The light sources may be equipped with a cover (not shown). The cover may be configured to display a text and/or shape when lighted. For example, the cover may comprise part of the area (which can be shaped to display a text or shape) comprising a different color or different transparency compared to the rest of the cover.

In one arrangement 440A, the light sources 40 are arranged as a strip of lights 440A. In arrangement 440A the light sources are arranged in a linear manner, i.e. as a single row of lights. The strip of lights 440A is positioned between the lid 430 and the body 410 of the mobile robot 10. The strip 440A extends from the rear of the mobile robot 10 to the front of the mobile robot 10. The strip 440 is positioned on one of the sides of the mobile robot 10. Similarly, on the opposite side the mobile robot 10 can comprise the strip of lights 440B. Both arrangements 440A and 440B, as depicted in FIG. 5, are positioned between the lid 430 and the body 410. They can be two separate pieces, i.e. separated in the front of the mobile robot 10 (as shown in FIG. 5) and the back of the mobile robot or can be a single piece starting from one side in the front, circulating around the mobile robot and ending on the other side on the front of the mobile robot 10, or they can be a single circular piece circulating around the whole periphery of the mobile robot 10.

In another arrangement 440C, the light sources 40 are arranged as a strip of lights, i.e. as a single row. The light sources 40, arranged according to arrangement 440C, are positioned on the body of the mobile robot 10. Moreover, the light sources 40, arranged according to arrangement 440C are positioned around the whole body of the mobile robot 10.

In yet another arrangement 440D, the lights 40 are configured as a circle and are positioned on the wheels of the mobile robot 10. The light sources 40 can be positioned on any of the wheels 420 of the mobile robot 10.

In another arrangement 450, the light sources are dispersed on an area thus forming a display area 450. Contrary to arrangements 440A, 440B, 440C and 440C which comprise a single row of lights 40 (arranged in linear or curved or circular shapes) the display area 450 comprises a plurality (i.e. more than one) rows, such as 2 to 20 rows. The display area 450 can be formed by dispersing the lights 40 randomly in the area 450 or following a certain pattern (such as in a rectangular grid manner). The display area 450 can be also formed by stacking a plurality of single row light arrangements in the vicinity of one another. In some embodiments, the display area 450 can comprise a constant density of lights 40 (e.g. as depicted in FIG. 5) or a non-constant density (for example the lights can be arranged according to a certain shape, such as an arrow).

The light sources 40 can be arranged in different manners (as exemplified in FIG. 5) and can thus allow for the creation of different shapes (one dimensional and/or two-dimensional shapes) and/or text. By controlling the manner in which the lights 40 are turned-on and off animations of the displayed text and/or shapes can be created. This will be described with reference to FIG. 6 and FIG. 7.

Figure 6:
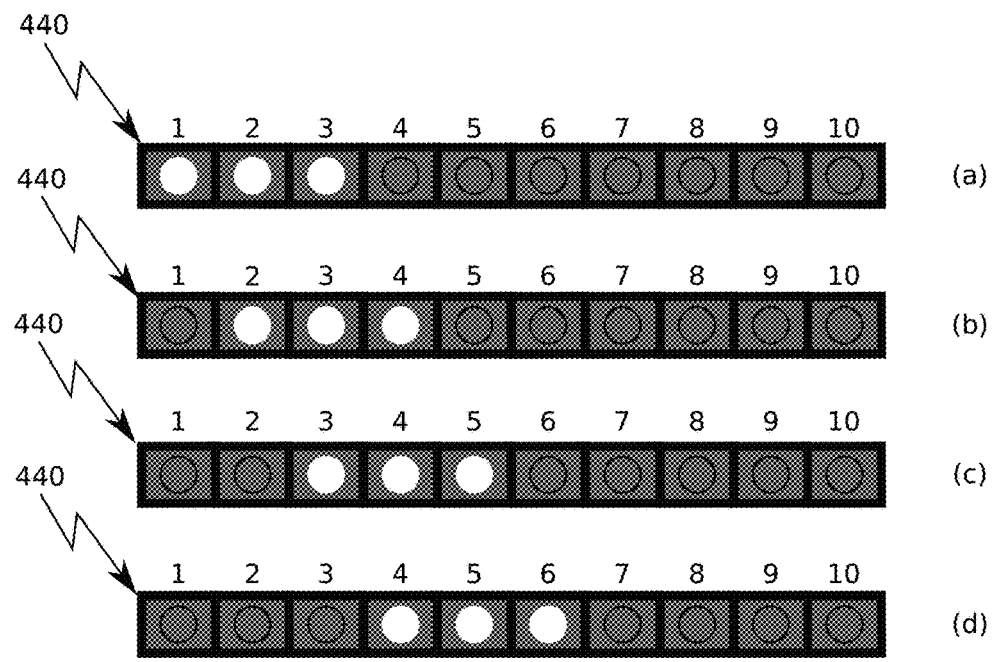
FIG. 6 schematically demonstrates the creation of shapes and animation on a plurality of light sources arranged in a single-row manner.

In FIG. 6, a single-row arrangement 440, or strip of lights 440, of the traffic lights is shown. In such arrangements, the lights 40 can have neighboring lights on only two opposing sides (e.g. either on the left or the right or both but not on the top and bottom side). Examples of the single row arrangement 440 are the arrangements 440A, 440B, 440C, 440D, provided in FIG. 5. Each of FIGS. 5(*a*), 5(*b*), 5(*c*) and 5(*d*) depicts the strip of lights 440 in consecutive moments in time, which moments can comprise a time delay between 0.5 to 10 seconds. For example, assuming a time delay of 1 second between the consecutive time moments, then FIG. 6(*a*) depicts the strip of lights 440 in time moment t, FIG. 6(*b*) depicts the strip of lights 440 in time moment t+1 second, FIG. 6(*c*) depicts the strip of lights 440 in time moment t+2 seconds and FIG. 6(*d*) depicts the strip of lights 440 in time moment t+3 seconds.

By controlling the activation of the lights 40 on the strip of lights 440, different shapes can be created. For example, a "dot" can be created by activating one light 40 and deactivating neighboring lights 40. A segment can be created by activating by turning-on consecutive lights 40 (such as 3 light sources 40) and keeping neighboring lights 40 off. A circle can be created by turning on all the lights 40 comprised by the strip of lights 440 and bending the strip of lights 440 in a circular shape.

Furthermore, by controlling the sequence of activation of the lights 40 on the strip of lights 440, animations of the shapes created by the lights 40 on the strip of light 440 can be created. For example, in FIG. 6 a strip of lights 440 is depicted comprising 10 lights which are tagged with the numerals 1 to 10 for reference purposes in this document. At the first time moment, FIG. 6(*a*), lights 1, 2 and 3 are turned-on while the other lights 4 to 10 are off. At the second time moment, FIG. 6(*b*), light 1 is turned off, light 4 is turned on while the others are left unchanged. At the third time moment depicted in FIG. 6(*c*) light 2 is toggled, light 5 is toggled while other light sources are left unchanged. In the forth time moment, FIG. 6(*d*), only lights 4, 5 and 6 are on while others are off. Controlling the lights in such a succession manner created the animation of the line 1-2-3 progressing in the direction as defined by increasing numbering of the lights, that is, the line 1-2-3 progressed to position 4-5-6. Similarly, step-by-step the line progressed to position 8-9-10 wherein after that moment the animation can start again with the line in position 1-2-3. Note that a position of line given in the form 1-2-3 means comprising the lights 1, 2 and 3 on while comprising the neighboring lights of.

In another embodiment, an animation of multiple lines on a single strip of light 440 can be created. For example, the strip of lights 440 can comprise at the first time moment, FIG. 6(*a*) lights 1, 2, 3, 6, 7, 8 on while the other lights off. On the second time moment, FIG. 6(*b*) lights 2, 3, 4, 7, 8, 9 can be turned on while the other lights are off. Thus, the animation of multiple lines can be created.

Figure 7:
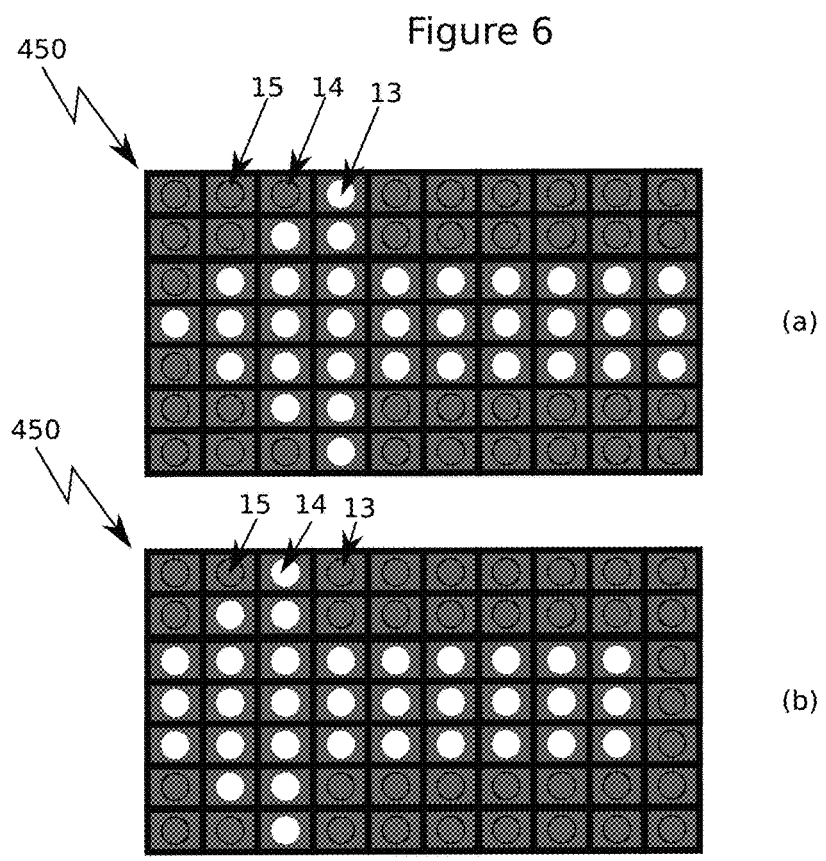
FIG. 7 schematically demonstrates the creation of shapes and animations on a displaying area.

Referring now to FIG. 7, a display area 450 is depicted in two consecutive moments in time, FIG. 7(*a*) and FIG. 7(*b*). They can comprise a time delay between 0.5 and 10 seconds. For example, if the time delay is 1 seconds then FIG. 7(*a*) depicts the display area 450 at time moment t while FIG. 7(*b*) depicts the display are at time moment t+1 second. The display area can comprise a plurality of lights 40 arranged in a multiple row manner, that is, any light 40 can comprise neighboring lights in any direction (note the difference with the strip of lights 440 wherein each light can comprise neighboring lights in only two opposing directions).

By controlling the activation of the light sources 40 on the display area 450, different shapes can be created. For example, in FIG. 7, only some of the lights 40 are turned on such that an arrow shape can be displayed on the display area.

Furthermore, by controlling the sequence of activating and deactivating the lights 40 on the display area 450 animations of the displayed shapes and/or text can be created. For example, in FIGS. 6(*a*) and 6(*b*) the arrow is animated moving in the direction as pointed by the arrow. To illustrate how the animation is achieved, lights 13, 14 and 15 are taken as an example. It FIG. 7(*a*), a first moment in time, lights 14 and 15 are off and light 13 is on. In FIG. 7(*b*), a second moment in time, light 13 is tuned off, light 14 is turned on and light 15 is kept off. Thus, the animation of the "dot" moving from position of the light 13 to position of the light 14 can be created. Similarly, by controlling the light sources 40 the animation of the displayed arrow can be created.

In some embodiments, the robot 10 may indicate its "intention" to cross a road, i.e., that fact that it will cross a road, by the discussed lights. In some such embodiments, the signaling is done such that the lights that are switched on are moved from the back to the front, which corresponds to FIG. 6 when light 1 is at the back and light 10 is at the front. The front of the robot 10 herein denotes the section of the robot 10 first contacting the road that is crossed, while the back is the section contacting the road to be crossed last. Such a signal may be a particularly intuitive way to signal that the robot 10 will cross the road to other traffic participants.

Figure 8:
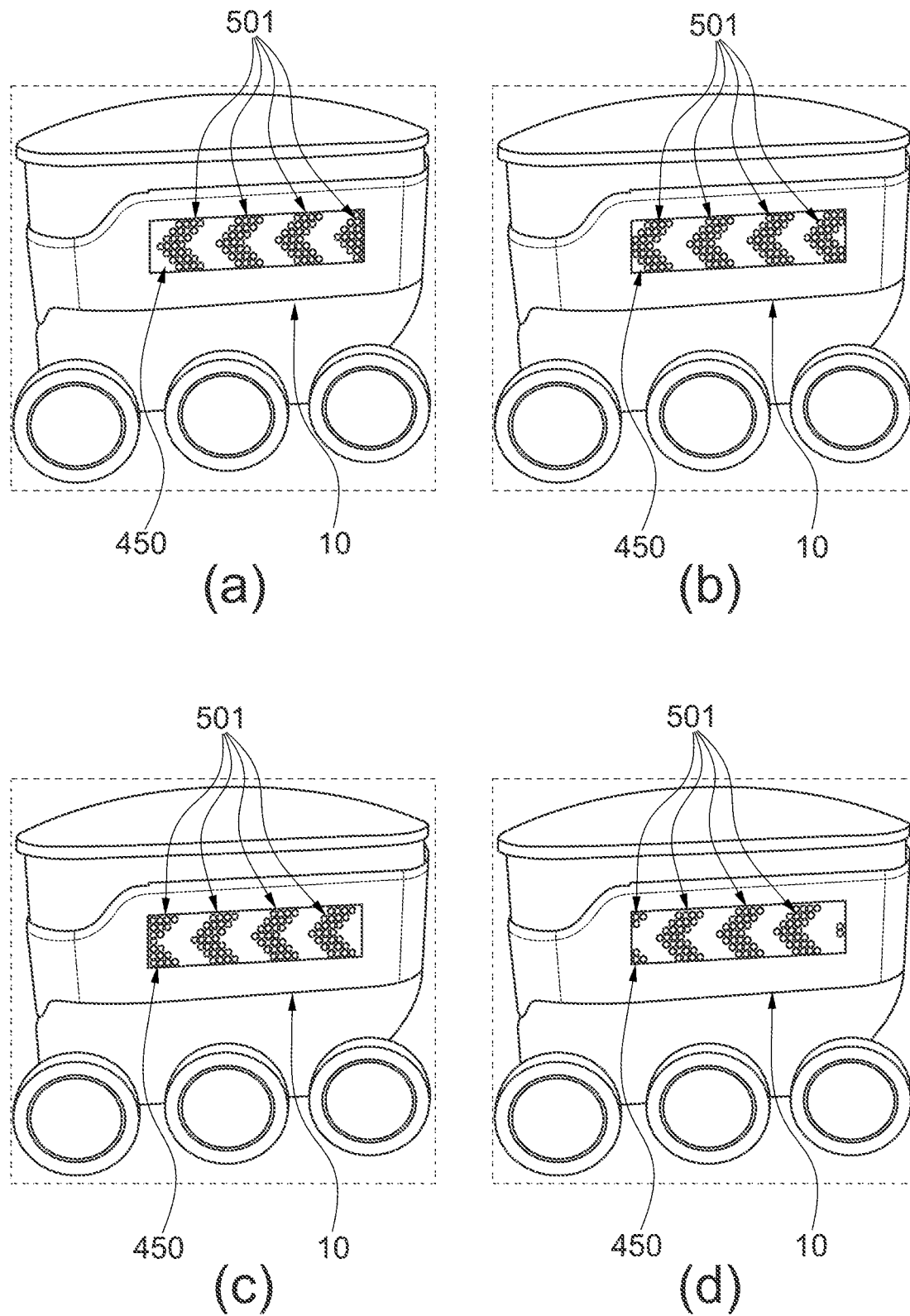
FIG. 8 depicts an exemplary animation of a chevron sign on a displaying area of the mobile robot.

FIG. 8 depicts an exemplary animation of a chevron sign being displayed on a displaying area of a mobile robot. To depict an animation, it can be understood, that at least two figures, taken in different instances in time, can be required. Thus, FIG. 8 comprises four figures, referred as FIG. 8a, FIG. 8b, FIG. 8c and FIG. 8d—wherein each of these figures depicts an image of the animation of the chevron in a different instance of time. The figures can be ordered according to the time they depict as follows: FIG. 8a can be the earliest, followed by FIG. 8b, which in turn can be followed by FIG. 8c which can be followed by FIG. 8d. Then, the animation can cycle back to FIG. 8a and so on. Thus, in a preferred embodiment as depicted in FIG. 8, the chevron sign can be animated to "move" towards the front of the robot. Note that FIGS. 7a, 7b, 7c and 7d do not necessarily represent consecutive (or neighboring) changes (or frames) of the animation. For example, there can one or more intermediate changes, or transition states, between FIGS. 8a and 7b. However, for sake of brevity only four moments in time of the animation are depicted in FIG. 8 and will be discussed in the following.

Thus, a mobile robot 20 can comprise a displaying area 450 (refer to FIG. 5). In the depicted embodiment, the displaying area 450 comprises a plurality of light sources, e.g. LEDs (i.e. light emitting diodes), that can be arranged to form a rectangular displaying area 450. However, the light sources can be arranged to form other shapes of the displaying area 450. By controlling the light sources of the displaying area 450, such as, by keeping some of them turned-on and the others turned-off, different shapes can be realized in the displaying area 450. In the depicted embodiment in FIG. 8, the displaying area 450 can be configured to display at least one chevron sign 501, which can also be referred as chevron 501. More specifically, in the depicted embodiment of FIG. 8, at least two chevrons 501 and at most three chevrons 501 can be fully displayed and at least one chevron 501 and at most two chevrons 501 can be partially displayed in the displaying area 450. The chevrons 501 can be separated by each other by keeping a plurality of light sources that are positioned between them, turned-off. Note that, in some embodiments, such as the one depicted in FIG. 8, the turned-off light sources provided between the chevrons 501 to keep the chevrons 501 spaced apart, can also comprise a chevron shape.

In some embodiments, the displaying area 450 can be configured to maintain its state for a predefined time. Said state of the displaying area 450 can refer to the state of the light sources the displaying area 450 can comprise, i.e. a state of the displaying area 450 can define which of the light sources of the displaying area are turned-on and which are turned-off. That is, a state of the displaying area 450 can define a unique pattern of the light sources comprised by the displaying area as regard the light source's state of being on or off. For example, FIG. 8a can depict a state of the displaying area 450. The state of the displaying area 450 depicted in FIG. 8a is different from the state of the displaying area 450 depicted in FIG. 8b, since there exists at least one light source of the displaying area 450 which can be turned-off in one of the states and turned-on in the other state. So, the displaying area 450 can be in a state for a predefined time. The time during which the displaying area can maintain (or be in) a state can range from 100 ms to 1 hour. In some instances, the displaying area can preserve its state for even longer times than 1 hour, such as, when the mobile robot is driving forward and the displaying area 450 can be indicating the mobile robot driving forward (for example, with an arrow or chevron sign). In this example, the displaying area 450 can be in a state (i.e. the state depicting the mobile robot moving forward) through the whole driving forward time of the mobile robot.

In some embodiment, the displaying area 450 can be configured to display an animation. In the embodiment depicted in FIG. 8, the displaying area 450 can be configured to display an animation of at least one chevron sign 501. As discussed, the animation is depicted in four different time moments or in four different states of the displaying area 450, wherein each of the images depicts a particular state of the displaying area 450. The chevron 501 can be created by turning-on a plurality of light sources of the displaying area 450 such that a chevron shape can be created. An animation of the at least one chevron sign 501 can be created by changing the states of the displaying area 450, preferably with a frequency of 0.5-100 Hz. In FIG. 8, the animation can depict the chevron signs 501 moving toward the front of the mobile robot 20. It can be noticed, that in FIG. 8b the chevrons 501 are nearer to the front of the mobile robot compared to the state in FIG. 8a. In FIG. 8c the chevrons 501 are nearer to the front of the mobile robot 20 compared to the state in FIG. 8b. In FIG. 8d the chevrons 501 are nearer to the front of the mobile robot 20 compared to the state in FIG. 8c. Also note, that in FIGS. 8b, 8c and 8d the nearest chevron 501 to the front of the mobile robot 20, "disappears" towards the border of the displaying area 450. It can also be noticed that the nearest chevron 501 to the rear of the mobile robot 20, which is partially displayed, appears increasingly more in the displaying area 450 till it become fully visible. From the state depicted in FIG. 8d the displaying area can cycle back to state of the displaying area 450 depicted in FIG. 8a. Some intermediate transition states can happen between the cycling back to state of FIG. 8a. In other words, the animation cycles on the depicted states, e.g. state of FIG. 8a, state of FIG. 8b, state of FIG. 8c, state of FIG. 8d, state of FIG. 8a, state of FIG. 8b and so on. This can create the animation of the chevrons 501 moving toward the front of the mobile robot.

To create animations, the light sources comprised by the displaying area 450 can be toggled (switched on or off) in a predefined manner, such as, periodically. For example, to create the animation of the chevron signs 501 moving toward the front of the mobile robot 10, at least one neighboring light source of each of the boarder light sources that can advance the chevron nearer to the front of the mobile robot 10 can be switched-on. Furthermore, to keep the size of the chevron 501 constant (neglecting the usually short time between the transition of the states), respective light sources of the chevron that are nearer to the rear of the mobile robot 10 can be turned-off. A detailed description of an animation procedure is depicted in FIG. 7 and its respective description. FIG. 7 depicts an animation of an arrow sign in a displaying area 450, however the person skilled in the art will understand that a similar procedure can be configured to create the animation of the chevrons signs 501.

In a similar manner, the chevrons can be animated to move towards the rear of the mobile robot 10 or in other directions. Furthermore, the direction of movement of the mobile robot 10 can be indicated by the animated movement of the chevron signs 501. For example, the animated movement of the chevron signs 501 toward the front of the mobile robot 10, as depicted in FIG. 8, can indicate a forward movement of the mobile robot 10. Thus, when the mobile robot 10 can be driving forward, an animation of the chevron signs 501 pointing and/or moving toward the front of the mobile robot 10 can be displayed in the displaying area 450. Similarly, when the mobile robot 10 can be driving backwards, an animation of the chevron signs 501 pointing and/or moving toward the rear of the mobile robot 10 can be displayed in the displaying area 450. Similarly, when the mobile robot 10 can be stationary, e.g. while determining whether to cross a road or not, an animation of the chevrons signs 501 pointing and/or moving toward the ground (i.e. downwards) can be displayed in the displaying area 450.

Figure 9:
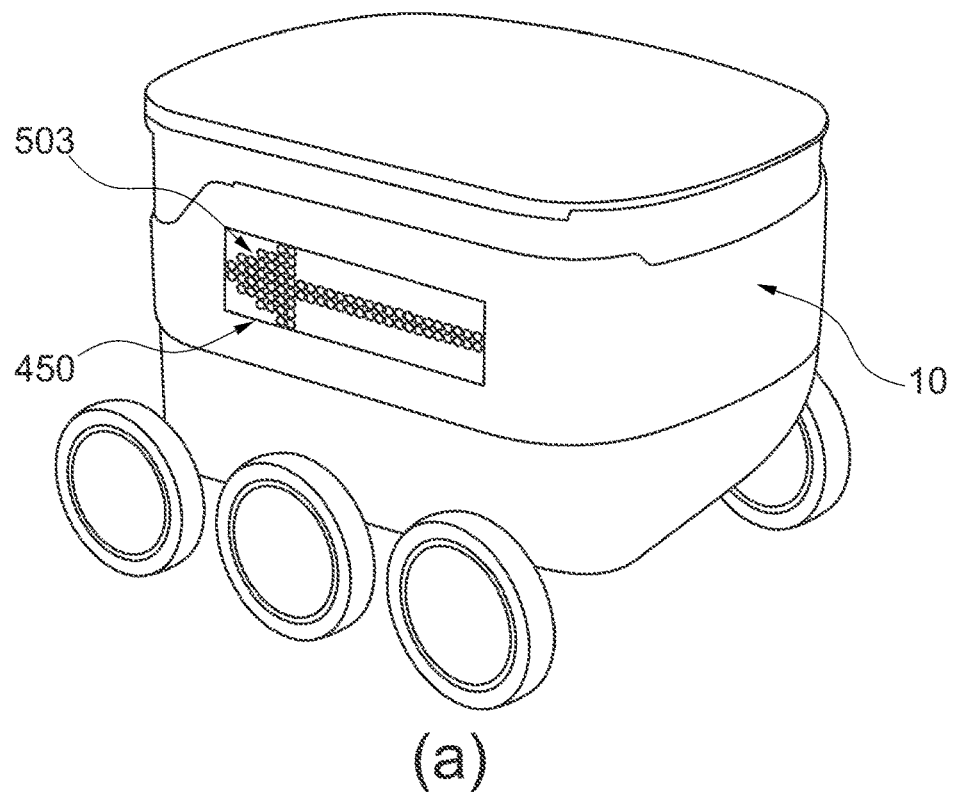
FIG. 9 depicts an exemplary animation of an arrow sign on a displaying area of the mobile robot.
Figure 9:
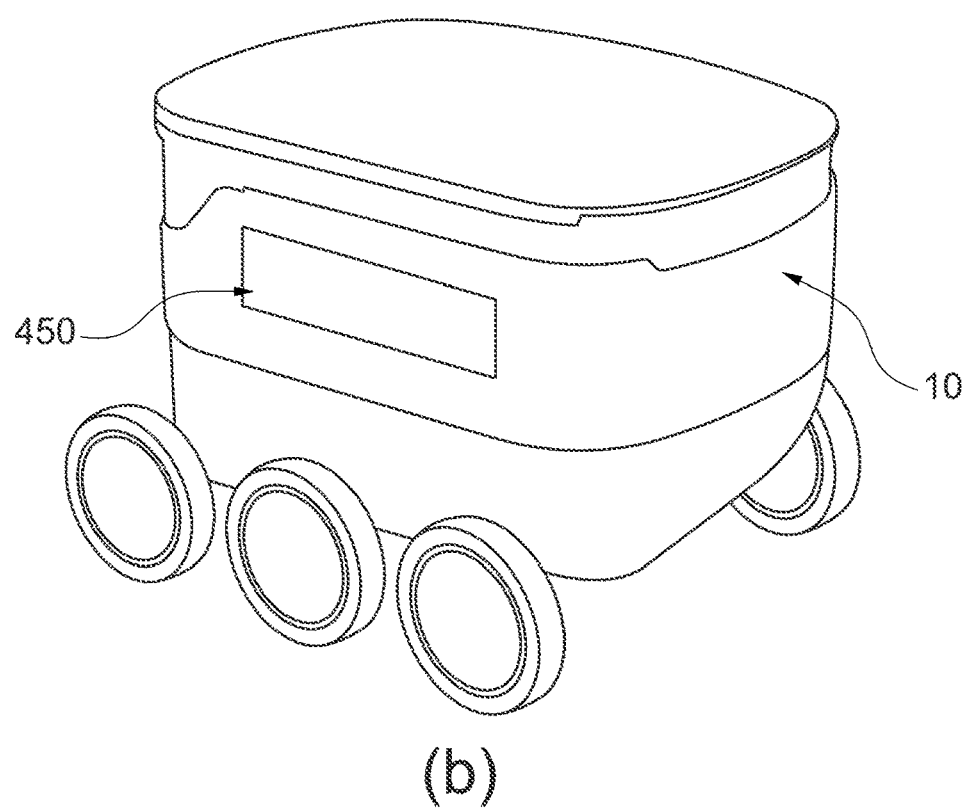

FIG. 9 depicts an exemplary embodiment of an animation of an arrow sign in a displaying area of a mobile robot. That is, a mobile robot 10 can comprise a displaying area 450 (refer to FIG. 5). The displaying area 450 can display at least one arrow sign 503. In FIG. 9, the displaying area 450 displays only one arrow sign 450 pointing in the direction towards the front of the mobile robot 10.

The arrow sign 503, can be created by switching-on a plurality of light sources comprised by the displaying area 450 such that an arrow shape can be created by the increased visibility of the switched-on light sources as compared to the rest of the light sources comprised by the displaying area 450 which can be turned-off. Similarly, the arrow shape can be created by switching-on a plurality of light sources in the displaying area 450 such that an arrow shape can be created by low-visibility of the switched-off light sources as compared to the surrounding switched-on light sources. In FIG. 9, the arrow sign is created by the increased visibility of a plurality of switched-on light sources of the displaying area 450.

The arrow sign 503 can indicate the direction of movement of the mobile robot 10. That is, the arrow sign 503 can be displayed in the displaying area 450 to indicate a direction of movement of the mobile robot 10. For example, when the mobile robot 10 is moving forward or when the mobile robot is about to start moving forward (such as when, e.g., crossing a road), an arrow sign 503 pointing towards the front of the mobile robot 10 can be displayed in the displaying area 450. Similarly, when the mobile robot 10 is moving backward an arrow sign 503 pointing towards the rear of the mobile robot 10 can be displayed in the displaying area 450. Similarly, when the mobile robot 10 is stationary, an arrow sign 503 pointing toward the ground (i.e. downwards) can be displayed in the displaying area 450.

In addition, an animation of the arrow sign 503 can be created by toggling at least one light source, preferably predefined light sources for each step of the animation, in a predefined manner, such as, periodically. In FIGS. 8*a* and 8*b*, the arrow sign 503 can be animated to blink. That is, the light sources forming the arrow sign 503 can be toggled in predefined and/or adjustable duty cycles such that the arrow sign 503 can be made blinking. In other words, the animation comprises two states: in one state an arrow sign 503 can be displayed in the displaying area 450 (as depicted in FIG. 9*a*) and in the other state the arrow sign 503 is not displayed in the displaying area 450 (as depicted in FIG. 9*b*). The blinking animation of the arrow sign 503 can be advantageous as it can attract more the attention of the other traffic participants and it can also be more energy efficient compared to the case wherein the arrow sign 503 is kept on for the whole period of the duty cycle.

Similarly, to the animation of the chevron signs 501 in FIG. 8, the arrow sign 503 can also be animated to move in a predefined direction, such as, towards the front, rear of the mobile robot or towards the ground.

Figure 10:
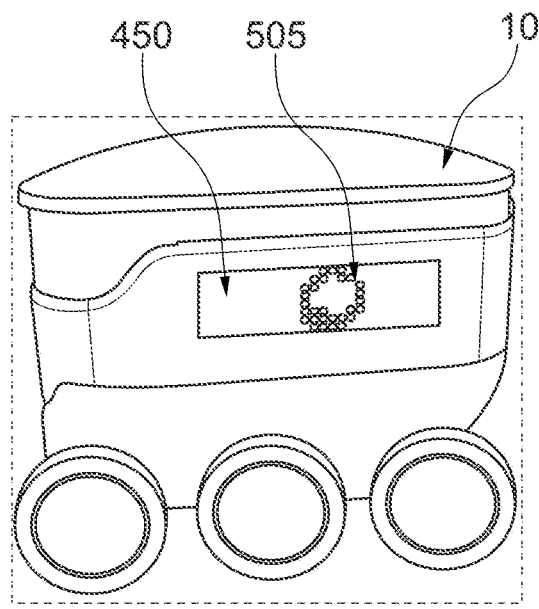
FIG. 10 depicts an exemplary animation of a throbber sign on a displaying area of the mobile robot.
Figure 10:
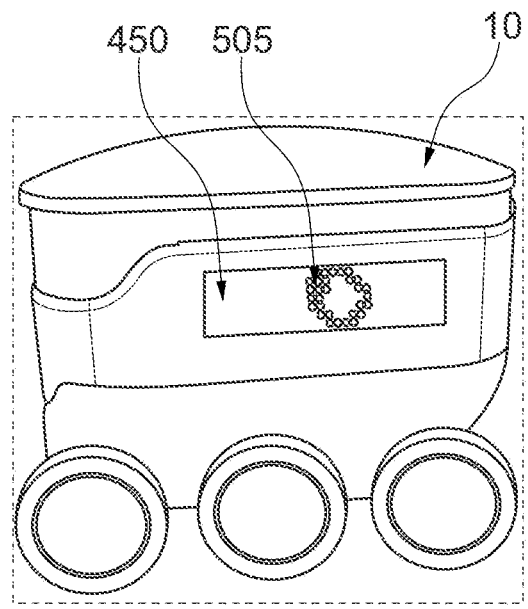
Figure 10:
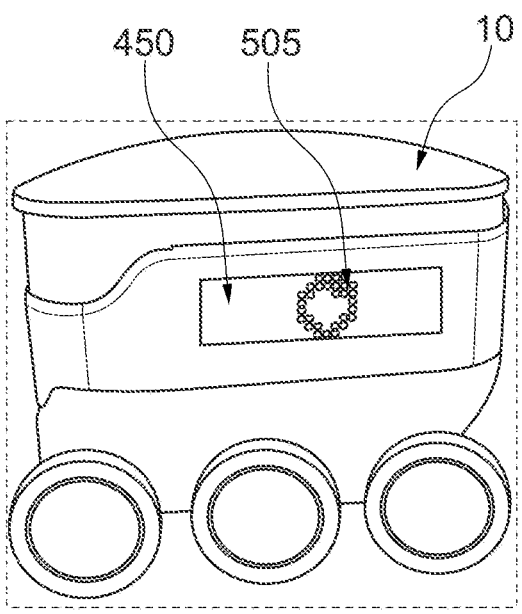
Figure 10:
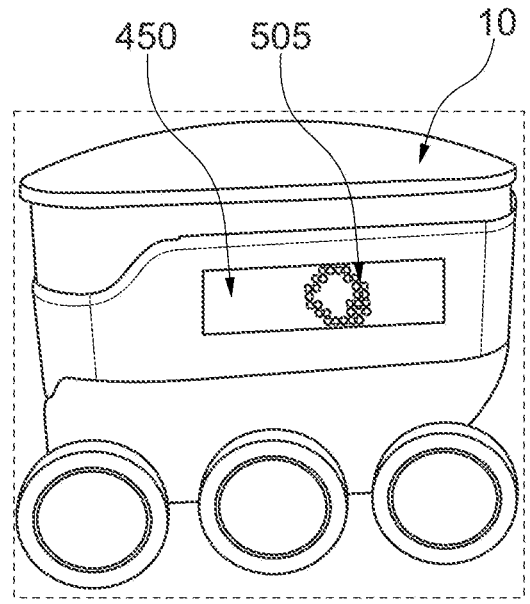

FIG. 10 depicts an animation of a throbber sign on a displaying area of the mobile robot. That is a mobile robot 10 can comprise a displaying area 450. The displaying area 450 can be configured to display a throbber sign 505.

The throbber sign 505 can be displayed in the displaying area 450 in a static manner, i.e. without animation. Alternatively, the throbber sign 505 can also be animated, e.g. making the throbber sign 505 circulate. FIGS. 9*a*, 9*b*, 9*c*, and 9*d* depict four different states of a circulating animation of the throbber sign 505. As it can be noticed from FIG. 10*a* to FIG. 10*b* the "head" of the throbber sign 505 advances in a clockwise manner, with the "tail" of the throbber sign following. The throbber sign 505 can be animated in a clockwise or counter-clockwise direction of rotation.

The throbber sign 505 can indicate a waiting state of the mobile robot 10. For example, the mobile robot 10 can be waiting stationary to cross a road while displaying in the displaying area 450 the throbber sign 505 statically or animated.

Figure 11:
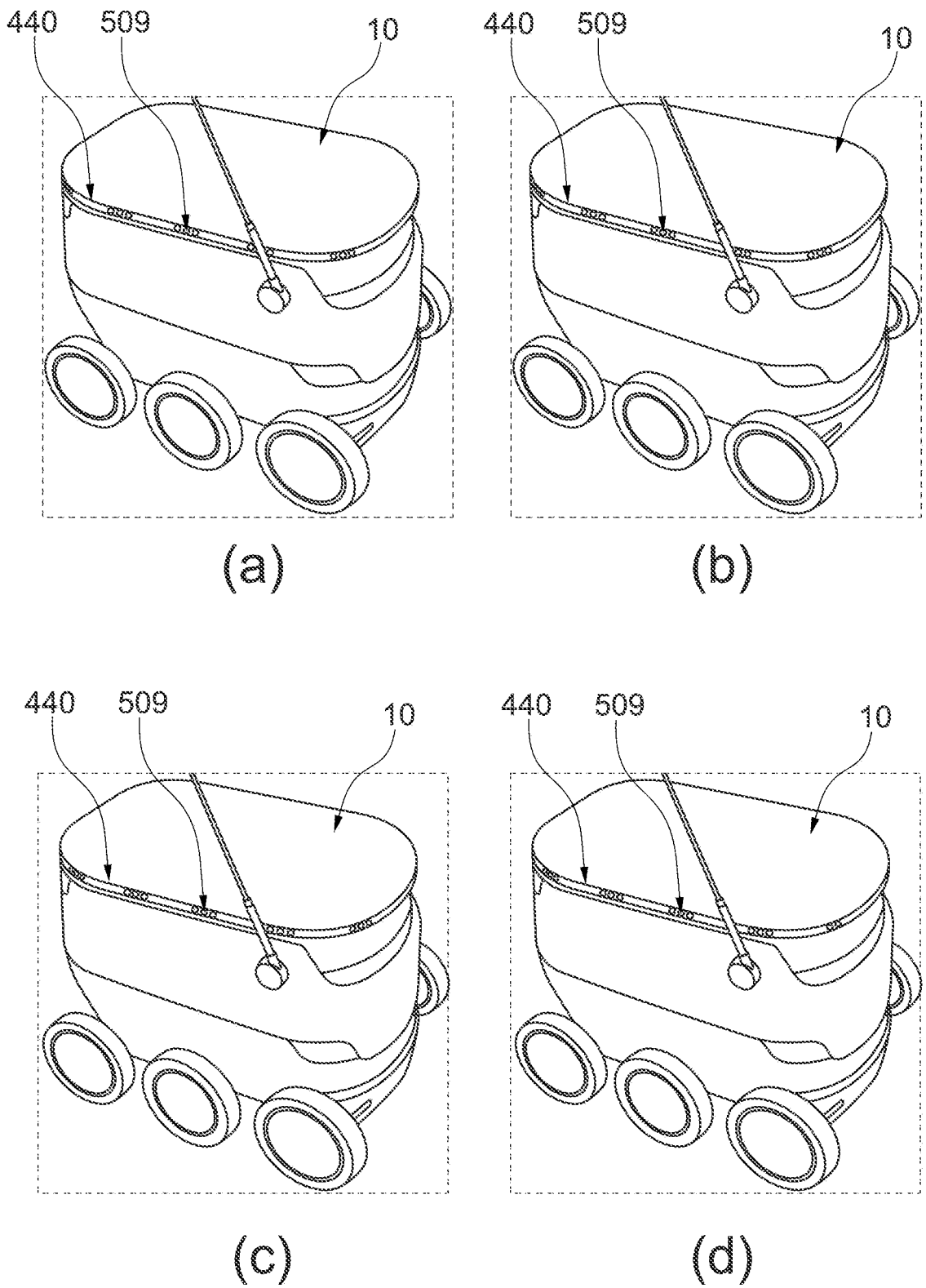
FIG. 11 depicts an exemplary animation of a segments on a strip of lights of the mobile robot.

FIG. 11 depicts an animation of segments on a strip of lights. That is, a mobile robot 10 can comprise a strip of light 440, which can be wrapped around the mobile robot 10 (refer to FIG. 5). The strip of lights 440 can facilitate the display or animation of one-dimensional shapes such as, dots or lines or segments 509.

A segment 509 can be created by switching-on at least one light source in the strip-of light while switching-of the neighboring light sources. In FIG. 9, the segments 509 are created by switching-on three light sources of the strip of light 440 and having a plurality of light sources switched-off between the segments 509. In general, at least one light source can be switched-on to create a segment 509 and at least one light source can be switched-off to define the end of a segment 509.

The segments 509 can be animated. In FIG. 6 a detailed description of an animation procedure of one-dimensional shapes is provided. FIGS. 10*a*, 10*b*, 10*c* and 10*d* provide four different states of an animation of the segment 509 on the strip of lights 440. The segments 509 can be animated to move toward the front of the mobile robot, as depicted in FIG. 11. The segments 509 can also be animated to move toward the rear of the mobile robot 10.

The animation of the segments 509 can be used to indicate mobile robot's direction of movement. For example, the segments 509 animated to move towards the front of the mobile robot 10 can indicate a forward movement of the mobile robot 10. That is, the animation of the segments 509 moving towards the front of the mobile robot can be displayed in the strip of lights 440 while the mobile robot 10 can be moving forward. Similarly, the segments 509 animated to move towards the rear of the mobile robot 10 can indicate a backward movement of the mobile robot 10. Similarly, the segments 509 displayed in the strip of lights 440 staying still can indicate a stationary state of the mobile robot 10.

Figure 12:
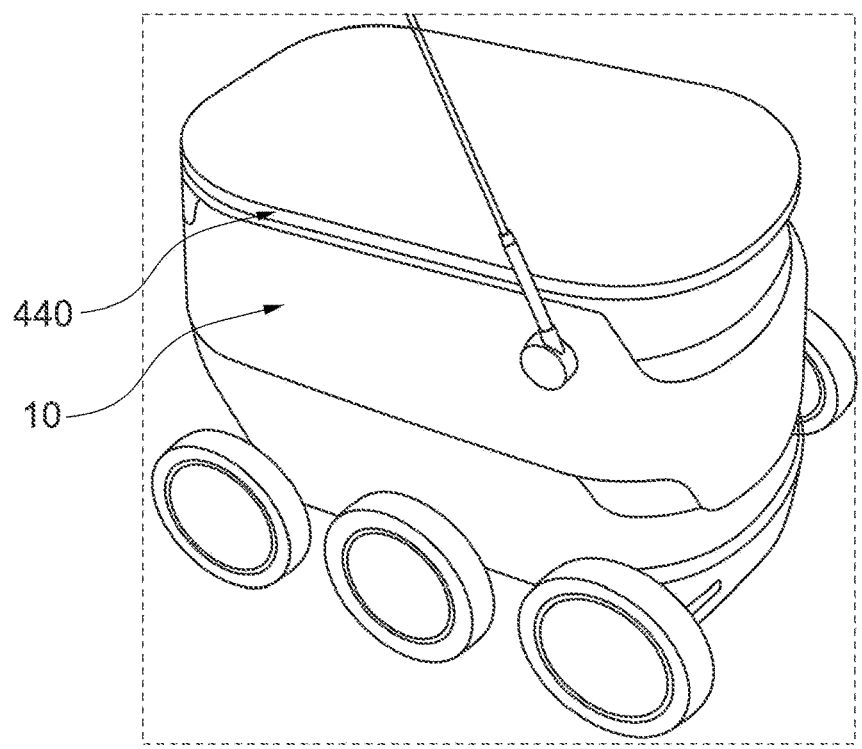
FIG. 12 depicts another exemplary animation of a segment on a strip of lights of the mobile robot.
Figure 12:
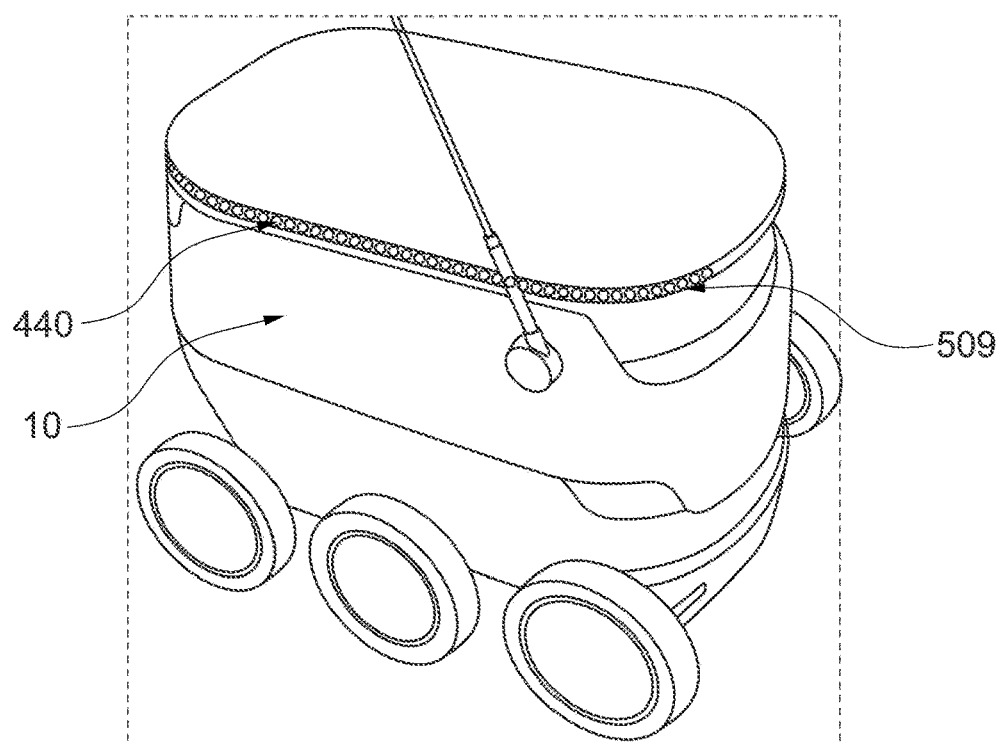

The at least one segment 509 that can also be displayed blinking according to a predefined duty cycle in the strip go lights 440 as depicted in FIG. 12.

It will be understood that the embodiment discussed in conjunction with FIGS. 4 to 11 may be independent from the determination of how the road is crossed described in conjunction with FIGS. 1 to 3. However, in some embodiments, these two embodiments, i.e., the determination of the road crossing as an automatic and autonomous crossing or an operator-based crossing and the indication of the robot crossing the road, may also be used together. E.g., the robot may decide whether it crosses the road automatically and autonomously or operator based, and the robot may also signal its intention to cross the road.

While in the above, preferred embodiments have been described with reference to the accompanying drawings, the skilled person will understand that this embodiment was provided for illustrative purpose only and should by no means be construed to limit the scope of the present invention, which is defined by the claims.

Whenever a relative term, such as "about", "substantially" or "approximately" is used in this specification, such a term should also be construed to also include the exact term. That is, e.g., "substantially straight" should be construed to also include "(exactly) straight".

Whenever steps were recited in the above or also in the appended claims, it should be noted that the order in which the steps are recited in this text may be accidental. That is, unless otherwise specified or unless clear to the skilled person, the order in which steps are recited may be accidental. That is, when the present document states, e.g., that a method comprises steps (A) and (B), this does not necessarily mean that step (A) precedes step (B), but it is also possible that step (A) is performed (at least partly) simultaneously with step (B) or that step (B) precedes step (A). Furthermore, when a step (X) is said to precede another step (Z), this does not imply that there is no step between steps (X) and (Z). That is, step (X) preceding step (Z) encompasses the situation that step (X) is performed directly before step (Z), but also the situation that (X) is performed before one or more steps (Y1), . . . , followed by step (Z). Corresponding considerations apply when terms like "after" or "before" are used.

The invention claimed is:

1. A mobile robot comprising:
   (A) a body having at least one item space;
   (B) a lid constructed and adapted to assume at least an open position and a closed position, wherein the lid is to fit on top of the body in the closed position so as to cover the item space, and the lid is to be lifted to the open position, so as to allow access to the item space;
   (C) at least four wheels;
   (D) a plurality of light sources arranged as at least one row of lights,
   wherein the plurality of light sources comprises a first group of light sources arranged on a first lateral side of the mobile robot and a second group of light sources arranged on a second lateral side of the mobile robot,
   wherein the mobile robot has a front and a rear, and the first lateral side and the second lateral side are sides of the mobile robot extending along the body, between the front and the rear, said second lateral side being opposite to said first lateral side; and
   (E) a controller configured to control the plurality of light sources, and wherein the plurality of light sources is controllable by the controller to display animation of text and/or shapes and/or patterns,
   wherein the shapes and/or patterns are used to provide visual information about movement and/or status of the mobile robot.

2. The mobile robot of claim 1, wherein said animation indicates movement and/or status information about the mobile robot.

3. The mobile robot of claim 1, further comprising light sources on said wheels.

4. The mobile robot of claim 3, wherein the light sources on said wheels are arranged in a circular shape.

5. The mobile robot of claim 1, configured to utilize the plurality of light sources to increase saliency of the mobile robot at a road crossing.

6. The mobile robot of claim 1, configured to emit light with the plurality of light sources prior to and/or during road crossing.

7. The mobile robot of claim 1, configured to emit light patterns with the plurality of light sources prior to and/or during road crossing.

8. The mobile robot of claim 1, configured to utilize the plurality of light sources to indicate a behavior of the mobile robot at a road crossing.

9. The mobile robot of claim 1, configured to utilize the plurality of light sources to indicate that the mobile robot is crossing a road.

10. The mobile robot of claim 1, wherein said plurality of light sources comprises at least one light-emitting diode (LED).

11. The mobile robot of claim 1 wherein said plurality of light sources is positioned below the lid and above the wheels.

12. The mobile robot of claim 1, wherein said plurality of light sources is covered.

13. The mobile robot of claim 1, wherein the plurality of light sources is on an outside of the mobile robot.

14. The mobile robot of claim 1, wherein the at least one row of lights is arranged in a linear or curved or circular shape.

15. The mobile robot of claim 1, wherein the plurality of light sources is positioned between the lid and the body of the mobile robot.

16. The mobile robot of claim 1, wherein the plurality of light sources is arranged around an outer perimeter of the lid.

17. The mobile robot of claim 16, wherein said plurality of light sources comprises a plurality of light-emitting diodes (LEDs) positioned around the outer perimeter of the lid.

18. The mobile robot of claim 16, wherein said plurality of light sources is arranged as at least one strip of lights around the outer perimeter of the lid.

19. The mobile robot of claim 1, wherein the plurality of light sources is arranged below an outer perimeter of the lid.

20. The mobile robot of claim 19, wherein said plurality of light sources comprises a plurality of light-emitting diodes (LEDs) positioned below the outer perimeter of the lid.

21. The mobile robot of claim 19, wherein said plurality of light sources is arranged as at least one strip of lights below the outer perimeter of the lid.

22. The mobile robot of claim 1, wherein the plurality of light sources extends from the rear of the mobile robot to the front of the mobile robot.

23. The mobile robot of claim 1, further comprising: a third group of light sources arranged on the front of the mobile robot.

24. The mobile robot of claim 1, further comprising: a third group of light sources arranged on the rear of the mobile robot.

25. The mobile robot of claim 1, wherein the first group of light sources and the second group of light sources comprise a single piece.

26. The mobile robot of claim 1, wherein the first group of light sources and the second group of light sources are two distinct pieces.

27. The mobile robot of claim 1, wherein the plurality of light sources forms a display area.

28. The mobile robot of claim 27, wherein the display area comprises a plurality of rows of lights.

29. The mobile robot of claim 28, wherein the display area comprises 2 to 20 rows of lights.

30. The mobile robot of claim 1, further comprising a controller configured to control the plurality of light sources, wherein the light sources are controllable by the controller to display animation of text and/or shapes and/or patterns.

31. A mobile robot comprising:
(A) a body having at least one item space;
(B) a lid constructed and adapted to assume at least an open position and a closed position, wherein the lid is to fit on top of the body in the closed position so as to cover the item space, and the lid is to be lifted to the open position, to allow access to the item space;
(C) at least four wheels; and
(D) a plurality of light sources arranged as at least one row of lights,
wherein the plurality of light sources comprises a first group of light sources arranged on a first lateral side of the mobile robot and a second group of light sources arranged on a second lateral side of the mobile robot,
wherein the mobile robot has a front and a rear, and the first lateral side and the second lateral side are sides of the mobile robot extending along the body, between the front and the rear, said second lateral side being opposite to said first lateral side; and
(E) a controller configured to control the plurality of light sources, and wherein the light sources are controllable by the controller to display animation of text and/or shapes and/or patterns,
wherein said animation indicates movement and/or status information about the mobile robot.

* * * * *